(12) United States Patent
Koseki et al.

(10) Patent No.: US 11,226,295 B2
(45) Date of Patent: Jan. 18, 2022

(54) CERAMIC BODY DEFECT INSPECTING APPARATUS AND DEFECT INSPECTING METHOD

(71) Applicant: NGK Insulators, Ltd., Nagoya (JP)

(72) Inventors: Anna Koseki, Tsushima (JP); Akihiro Mizutani, Ichinomiya (JP); Takafumi Terahai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 117 days.

(21) Appl. No.: 16/406,338

(22) Filed: May 8, 2019

(65) Prior Publication Data

US 2019/0265172 A1 Aug. 29, 2019

Related U.S. Application Data

(63) Continuation of application No. PCT/JP2017/040724, filed on Nov. 13, 2017.

(30) Foreign Application Priority Data

Nov. 14, 2016 (JP) .............................. JP2016-221566

(51) Int. Cl.
*G06K 9/00* (2006.01)
*G01N 21/956* (2006.01)
(Continued)

(52) U.S. Cl.
CPC ....... *G01N 21/95692* (2013.01); *F01N 3/022* (2013.01); *F01N 11/00* (2013.01);
(Continued)

(58) Field of Classification Search
None
See application file for complete search history.

(56) References Cited

U.S. PATENT DOCUMENTS 5,420,482 A * 5/1995 Phares ................. H05B 47/155
315/292
7,283,224 B1 10/2007 Smithgall
(Continued)

FOREIGN PATENT DOCUMENTS

EP 2 216 643 A1 8/2010
JP H02-124504 U 10/1990
(Continued)

OTHER PUBLICATIONS

International Preliminary Report on Patentability (Chapter 1) (Application No. PCT/JP2017/040724) dated May 23, 2019 (with English translation).

(Continued)

*Primary Examiner* — Feng Niu
(74) *Attorney, Agent, or Firm* — Burr & Brown, PLLC

(57) ABSTRACT

A plurality of illumination elements configured to irradiate an inspection target region with illumination light obliquely at an identical angle in respective directions different from each other and equiangularly spaced from each other around an image capturing part are sequentially turned on and off. The image capturing part generates a plurality of pieces of captured image data by capturing an image of the target region in a normal direction when each of the plurality of illumination elements is turned on. A determination image generation part generates minimum luminance image data in which a minimum value among luminance values of the plurality of pieces of captured image data at an identical pixel position is set as a luminance value at the pixel position, and then generates determination image data based on the minimum luminance image data. A defect determination part determines existence of a defect based on the determination image data.

20 Claims, 35 Drawing Sheets

(51) Int. Cl.
*G01N 21/88* (2006.01)
*G01N 21/95* (2006.01)
*F01N 3/022* (2006.01)
*F01N 11/00* (2006.01)
*G06T 5/50* (2006.01)
*G06T 7/11* (2017.01)
*G06T 7/194* (2017.01)
*G06T 7/136* (2017.01)
*G06K 9/34* (2006.01)
*G06T 7/00* (2017.01)
*G06T 7/174* (2017.01)

(52) U.S. Cl.
CPC ......... *G01N 21/8806* (2013.01); *G01N 21/95* (2013.01); *G01N 21/9515* (2013.01); *G06K 9/34* (2013.01); *G06T 5/50* (2013.01); *G06T 7/0002* (2013.01); *G06T 7/11* (2017.01); *G06T 7/136* (2017.01); *G06T 7/174* (2017.01); *G06T 7/194* (2017.01); *G06T 2207/10152* (2013.01); *G06T 2207/20212* (2013.01); *G06T 2207/20221* (2013.01); *Y02T 10/40* (2013.01)

(56) References Cited

U.S. PATENT DOCUMENTS

| | | | | |
|---|---|---|---|---|
| 7,520,918 | B2* | 4/2009 | Zoeller, III | B01D 46/2418 95/273 |
| 8,285,027 | B2* | 10/2012 | Zoeller, III | G01N 21/95692 382/141 |
| 8,537,215 | B2* | 9/2013 | Booth | G01N 21/952 348/125 |
| 8,547,545 | B2* | 10/2013 | Sasazawa | G01N 21/8851 356/237.2 |
| 9,683,944 | B2* | 6/2017 | Moroli | G01N 21/8806 |
| 10,217,012 | B2* | 2/2019 | Hasegawa | G06K 9/4604 |
| 10,352,869 | B2* | 7/2019 | Hayashi | G01N 21/8806 |
| 10,613,037 | B2* | 4/2020 | Nagata | G01N 21/95684 |
| 10,769,772 | B2* | 9/2020 | Madara | G06T 7/11 |
| 2003/0174320 | A1* | 9/2003 | Yokoyama | G01N 21/8806 356/237.6 |
| 2006/0151926 | A1 | 7/2006 | Zoeller, III | |
| 2009/0116727 | A1* | 5/2009 | Jin | G01N 21/9503 382/149 |
| 2010/0238281 | A1 | 9/2010 | Akao et al. | |
| 2011/0116704 | A1* | 5/2011 | Zoeller, III | G01N 21/95692 382/141 |
| 2011/0128370 | A1 | 6/2011 | Booth et al. | |
| 2012/0081701 | A1* | 4/2012 | Sasazawa | G01N 21/95 356/237.2 |
| 2013/0258320 | A1* | 10/2013 | Funaki | G01N 21/95 356/73 |
| 2016/0103079 | A1* | 4/2016 | Moroli | G01N 21/8901 356/237.2 |
| 2016/0210524 | A1 | 7/2016 | Hasegawa | |
| 2017/0089841 | A1* | 3/2017 | Uemura | G01N 21/8806 |
| 2017/0108449 | A1* | 4/2017 | Wingfield | G01N 21/8806 |
| 2017/0219495 | A1* | 8/2017 | Nagata | G01N 21/88 |
| 2017/0315062 | A1* | 11/2017 | Matsuda | G01N 21/8851 |

FOREIGN PATENT DOCUMENTS

| | | |
|---|---|---|
| JP | H07-181011 A1 | 7/1995 |
| JP | H09-079990 A1 | 3/1997 |
| JP | 2000-230817 A1 | 8/2000 |
| JP | 2002-310935 A1 | 10/2002 |
| JP | 2008-139052 A1 | 6/2008 |
| JP | 2010-249798 A1 | 11/2010 |
| JP | 2012-047673 A1 | 3/2012 |
| JP | 2013-024560 A1 | 2/2013 |
| JP | 2013-152128 A1 | 8/2013 |
| JP | 2014-009970 A1 | 1/2014 |
| JP | 2015-068765 A1 | 4/2015 |
| WO | 2009/069377 A1 | 6/2009 |

OTHER PUBLICATIONS

International Search Report and Written Opinion (Application No. PCT/JP2017/040724) dated Feb. 6, 2018.
Japanese Office Action (Application No. 2018-516104) dated Mar. 19, 2019.
Japanese Office Action (Application No. 2019-094698) dated Jun. 16, 2020 (with English translation).

* cited by examiner

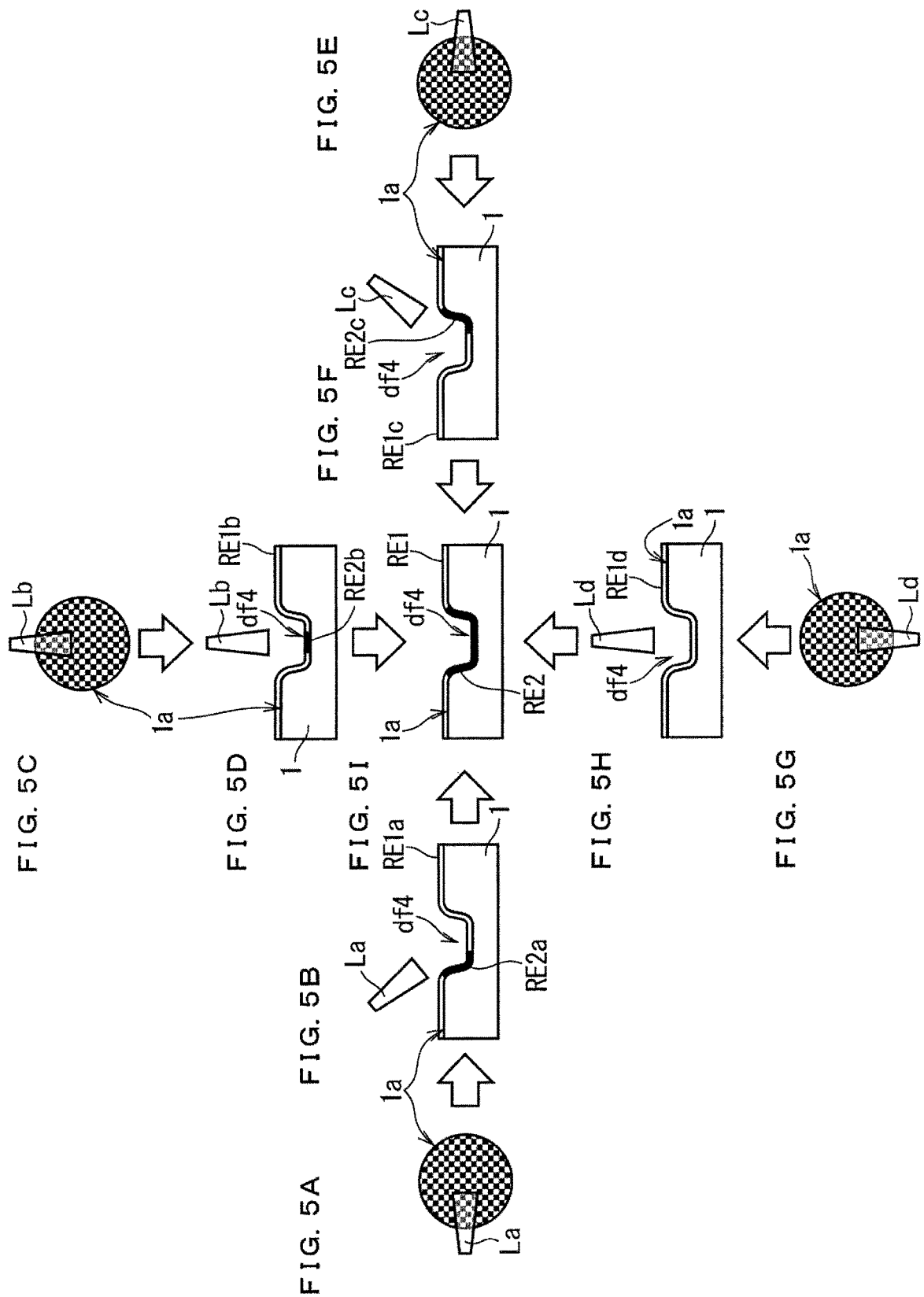

FIG. 15

| SHAPE | | SURFACE IRREGULARITY | CRACK | SCOOP AND CHIP |
|---|---|---|---|---|
| FIRST DETERMINATION PROCESSING | FIRST ILLUMINATION TURNED ON | D1, ns, A | D1, df1, B | D1, df3, C |
| | FIRST DETERMINATION IMAGE | THa, A' | THa, df1, B' | THa, df3, C' |
| | DETERMINATION | OK | OK | NG |
| SECOND DETERMINATION PROCESSING | SECOND ILLUMINATION TURNED ON | D2, ns | D2, df1, D | D2, df3 |
| | SECOND DETERMINATION IMAGE | | THb, D' | |
| | DETERMINATION | OK | NG | OK |
| COMPREHENSIVE DETERMINATION | | OK | NG | NG |

FIG. 22
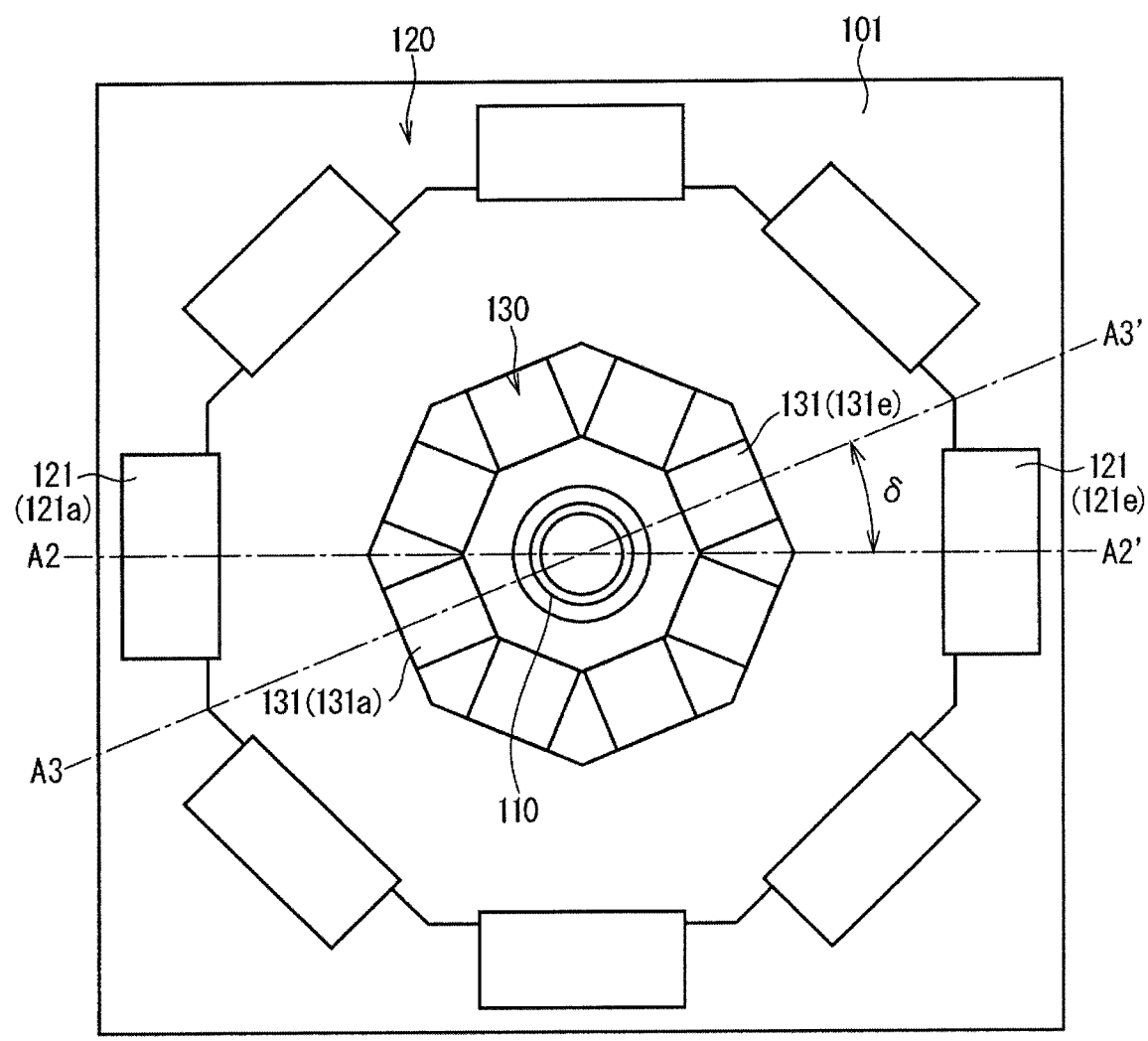
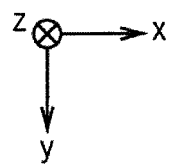

FIG. 25A
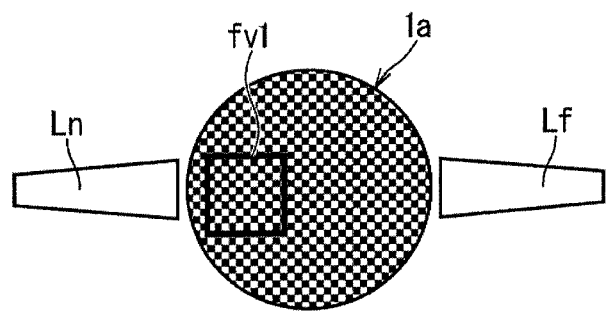
FIG. 25B
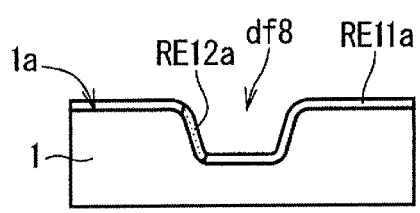
FIG. 25C
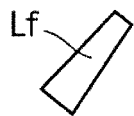
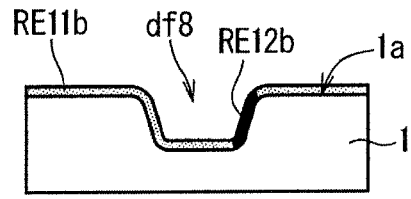

CERAMIC BODY DEFECT INSPECTING APPARATUS AND DEFECT INSPECTING METHOD

TECHNICAL FIELD

The present invention relates to an apparatus and method that inspect existence of a defect on an outer surface of a ceramic body, and particularly relates to an apparatus and a method that inspect an end face of a honeycomb structural body.

BACKGROUND ART

A honeycomb structural body that is a ceramic porous body (ceramic body) is widely used as a filter that collects particulate matter contained in exhaust gas from an internal combustion, a boiler, or the like, or as a catalyst carrier of an exhaust gas cleaning catalyst. The honeycomb structural body includes a plurality of cells, partitioned by partition walls, along the axial direction of the structural body respectively, and surround by a tubular outer surface (outer wall). The ceramic honeycomb structural body is excellent in thermal resistance, thermal shock resistance, and oxidation resistance, and thus widely used for the above-mentioned applications and the like.

In some honeycomb structural bodies, cell openings at both end faces are alternately (in a checkerboard pattern) sealed (also referred to as sealing) (sealed honeycomb structural bodies). Such a sealed honeycomb structural body is used for, for example, DPF (diesel particulate filter).

A ceramic honeycomb structural body is typically manufactured by shaping, through extrusion molding, clay-like raw earth obtained by kneading powder of ceramic (for example, cordierite, SiC, or alumina) as a constituent material thereof with, for example, an organic binder and water, and by firing a honeycomb shaped body thus obtained. When sealing is desired to be added, it may be implemented, for example, in a manner that an end part of a honeycomb fired body in which a cell not to be sealed has been masked in advance is immersed in a slurry filler to fill an opened cell with the filler and then the honeycomb fired body is fired again (refer to Patent Document 1, for example). Alternatively, a honeycomb shaped body without sealing is filled with the filler as described above and then is fired, thereafter to obtain a sealed honeycomb structural body.

A honeycomb structural body manufactured by such a method is inspected to check that no defect such as a crack, a chip, or a scoop exists on a side surface, an end face having an opening, and an internal partition wall, and then shipped as a product.

Patent Document 1 discloses, as a method of inspecting a sealed part of a sealed honeycomb structural body, a method of image capturing for a cell from one end face side while emitting light thereto on the other end face side, and detecting any defect at the sealed part based on the grayscale (luminance) of light obtained by performing image processing on a captured image thus obtained.

In another publicly known method (refer to Patent Document 2, for example), a telecentric optical system and a camera having an optical axis aligned with that of the optical system are disposed on the one end part side of the honeycomb structural body in a direction tilted by a predetermined angle relative to the axis line direction of the honeycomb structural body, and the grayscale of an image formed by light obliquely incident on a partition wall is identified to perform crack detection at the partition wall.

When the above-described defect inspection by using the grayscale appearing in a captured image is performed on an end face of a honeycomb structural body, a defect such as a crack, a chip, or a scoop occurring at the periphery of a cell opening is required to be reliably distinguished from the cell opening itself. In addition, in a case of a sealed honeycomb structural body, in particular, normal irregularities (irregularities that cause no problem in terms of product specifications) existing at a sealed part and a rib part are required not to be falsely detected as a crack, a chip, a scoop, and the like.

For example, it is known that, when oblique illumination as disclosed in Patent Document 2 is used in defect inspection, a defect part such as a chip or a scoop is likely to be a dark part (shadow), but a shadow is also likely to occur at a normal irregular part, and thus the normal irregular part is highly likely to be falsely detected as a defect at defect detection based on existence of the dark part.

PRIOR ART DOCUMENTS

Patent Documents

Patent Document 1: Japanese Patent Application Laid-Open No. 2010-249798
Patent Document 2: Japanese Patent Application Laid-Open No. 2008-139052

SUMMARY

The present invention relates to an apparatus and method that inspect existence of a defect on an outer surface of a ceramic body, and particularly relates to an apparatus and a method that inspect an end face of a honeycomb structural body.

According to the present invention, an apparatus configured to inspect existence of a defect on an outer surface of a ceramic body includes: a table on which a ceramic body as an inspection target is to be placed; an image capturing part configured to capture an image of an inspection target region as at least part of an inspection target surface of the ceramic body placed on the table in a normal direction of the inspection target region; one or more illumination parts including a four or more illumination elements configured to irradiate the inspection target region with illumination light obliquely at an identical irradiation angle in respective irradiation directions different from each other and equiangularly spaced from each other around the image capturing part; a determination image generation part configured to generate determination image data for determining existence of a defect in the inspection target region based on captured image data acquired by the image capturing part; and a defect determination part configured to determine existence of a defect in the inspection target region based on the determination image data. The plurality of illumination elements are sequentially turned on and off. The image capturing part generates a plurality of pieces of captured image data by capturing an image of the inspection target region when each of the plurality of illumination elements is turned on. The determination image generation part: generates minimum luminance image data in which a minimum value among luminance values of the plurality of pieces of captured image data at an identical pixel position is set as a luminance value at the pixel position and then generates the determination image data based on the minimum luminance image data; or generates maximum luminance image data in which a maximum value among luminance values of the plurality of pieces of captured image data at an identical pixel position is set as a luminance value at the pixel position, and generates the determination image data based on the maximum luminance image data.

According to the present invention, a defect existing on an outer surface of a ceramic body and needed to be detected can be reliably detected without falsely detecting an irregularity of a normal ceramic surface as a defect.

Preferably, the one or more illumination parts include: a low-angle illumination part including, as the plurality of illumination elements, a plurality of low-angle illumination elements each configured to irradiate the inspection target region with illumination light at an irradiation angle of 5° to 30° inclusive; an intermediate-angle illumination part including, as the plurality of illumination elements, a plurality of intermediate-angle illumination elements each configured to irradiate the inspection target region with illumination light at an irradiation angle of 30° to 60° inclusive; and a high-angle illumination part including, as the plurality of illumination elements, a plurality of high-angle illumination elements each configured to irradiate the inspection target region with illumination light at an irradiation angle of 60° to 85° inclusive.

Accordingly, inspection can be accurately performed even for a large inspection target region as compared to a case of two illumination parts.

It is therefore an object of the present invention to provide an inspecting method and an inspecting apparatus that reliably detect a defect on an outer surface of a ceramic body, such as an end face of a honeycomb structural body, and reliably prevent false detection of a normal surface irregularity as a defect.

BRIEF DESCRIPTION OF DRAWINGS

FIGS. 5A to 5I are diagrams schematically illustrating a situation when the end face 1a of the honeycomb structural body 1 is irradiated with illumination light in several directions.

FIG. 15 illustrates a list of determination examples through the first determination processing and the second determination processing for the normal surface irregularity ns of the ceramic surface 6, a crack df1, and a scoop df3, and comprehensive determination contents based on the determination examples.

FIG. 22 is a diagram illustrating a modification of the arrangement and configurations of a first illumination part 120 and a second illumination part 130.

FIGS. 25A to 25C are diagrams for description of the influence of difference in the distance from an illumination element to an irradiated position.

DESCRIPTION OF EMBODIMENTS

First Embodiment

<Honeycomb Structural Body>

Figure 1:
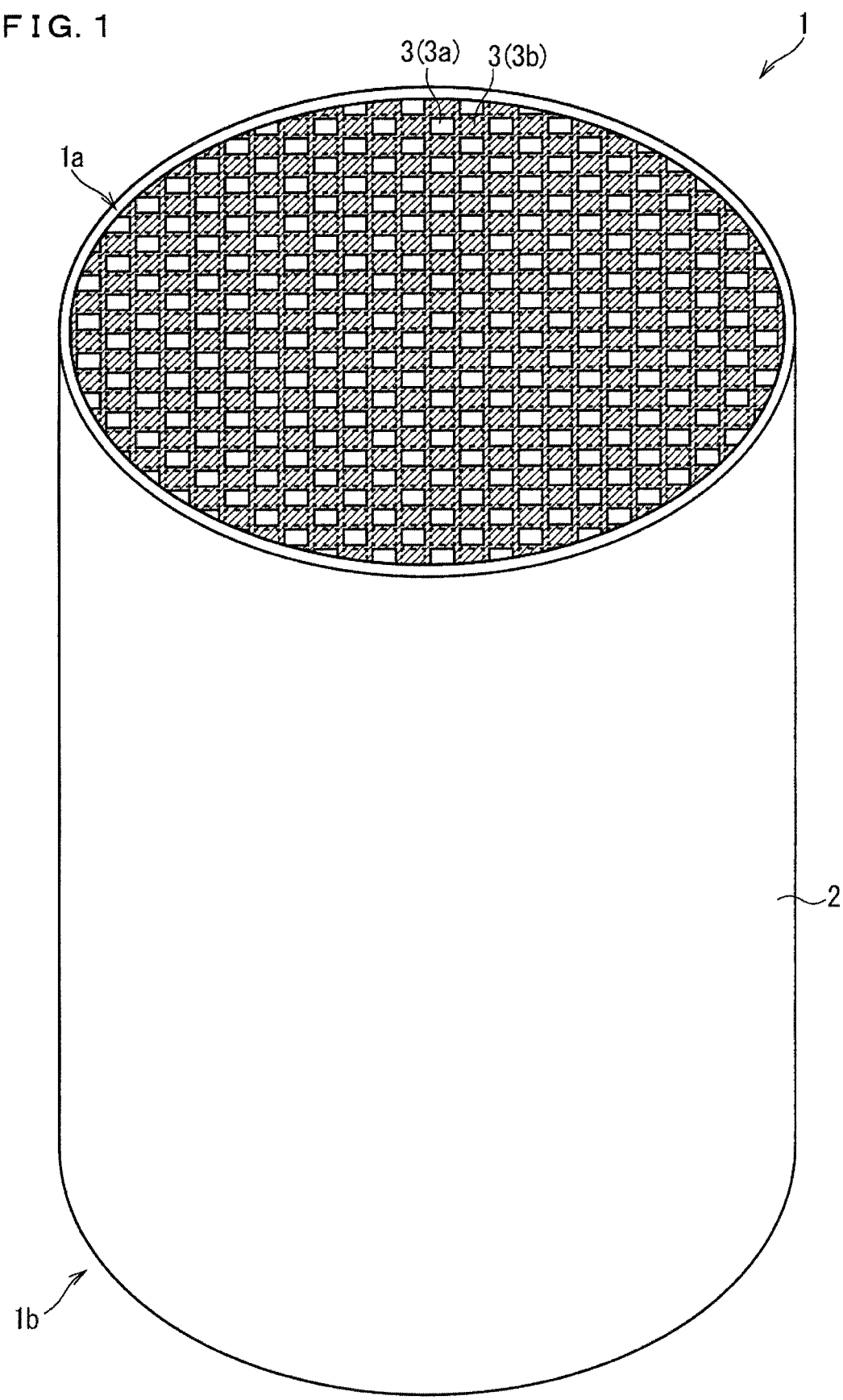
FIG. 1 is an external perspective view of a honeycomb structural body 1.
Figure 2A:
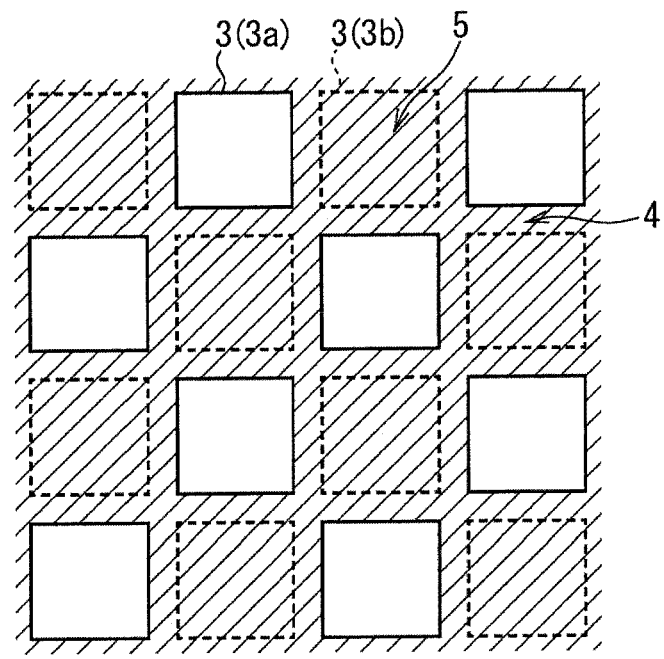
FIGS. 2A and 2B are partially enlarged schematic diagrams of one end face 1a of the honeycomb structural body 1.
Figure 2B:
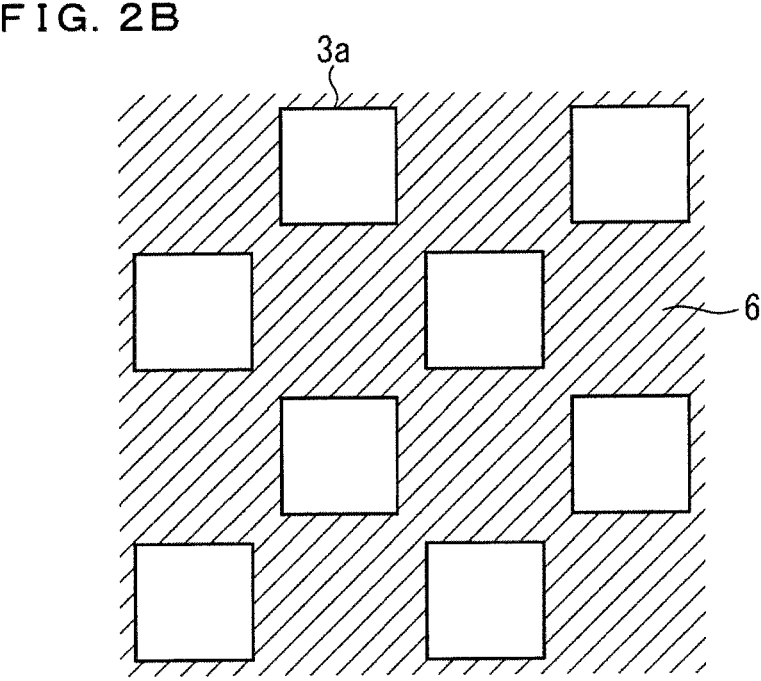

The following first describes a honeycomb structural body having an end face as a defect inspection target in the present embodiment. FIG. 1 is an external perspective view of a honeycomb structural body 1. FIGS. 2A and 2B are partially enlarged schematic diagrams of one end face 1a of the honeycomb structural body 1.

The honeycomb structural body 1 is a ceramic structural body (ceramic body) having a cylindrical shape and including inside what is called a honeycomb structure. The honeycomb structural body 1 includes a plurality of quadrangular prism-shaped (square in section) cells 3 in the inside surrounded by an outer wall 2 forming the cylindrical shape. Each cell 3 is partitioned by a partition 4 (refer to FIG. 2A) and extends in the direction (axial direction) of the central axis of the honeycomb structural body 1. However, the cell 3 may have a beveled prism shape in which the longitudinal direction thereof is tilted relative to the central axis of the honeycomb structural body 1. In any case, the cells 3 are arranged in a two-dimensional square lattice pattern on the end face 1a of the honeycomb structural body 1. In the present specification, sections of the honeycomb structural body 1 and the cell 3 are sections orthogonal to the central axis of the honeycomb structural body 1 unless otherwise stated.

For example, the outer wall 2 has a thickness of 100 µm to 1500 µm approximately, the partition 4 has a thickness of 150 µm to 400 µm approximately, and the pitch of the partition 4, which defines the size of the cell 3, is 1.0 mm to 2.5 mm approximately. The length in the axial direction is 100 mm to 300 mm approximately, and the radius of a section orthogonal to the axial direction (cross-sectional radius) is 100 mm to 200 mm approximately.

More specifically, the cells 3 include a first cell 3a having an opening at the end face 1a, and a second cell 3b provided with a seal 5 (having an opening blocked by the seal 5) on the end face 1a. The first cell 3a and the second cell 3b are arranged alternately (in a checkerboard pattern). At the other end face 1b, the first cell 3a is sealed, and the second cell 3b is opened. In the following description, the opening of the first cell 3a at the end face 1a is also simply referred to as the first cell 3a.

The honeycomb structural body 1 is a fired body of ceramic (for example, cordierite, SiC, or alumina). In general, the honeycomb structural body 1 is obtained by shaping, through extrusion molding, clay-like raw earth obtained by kneading ceramic powder as a constituent material of the honeycomb structural body 1 with, for example, organic binder and water, firing a honeycomb shaped body (ceramic shaped body) thus obtained to temporarily produce a honeycomb fired body without sealing, and then performing sealing treatment on the honeycomb fired body to form the seal 5 on the target cell 3. The seal 5 is formed by, for example, masking an end part of the cell 3 (directed to the first cell 3a) to be provided with no seal 5, then filling the opened cell with the filler through immersion of an end part of the honeycomb fired body in slurry filler containing the same ceramic powder as that used to form the honeycomb fired body, and subsequently firing the honeycomb fired body again.

In FIGS. 1 and 2A, for understanding, a ceramic part of the end face 1a is hatched and the sealed second cell 3b (more specifically, the partition 4 partitioning the second cell 3b) is illustrated with a dashed line. However, the sealed second cell 3b is not visually recognized from the outside at the end face 1a (with no defect) in reality. In the actual end face 1a, as illustrated in FIG. 2B, it is visually recognized that the first cells 3a are arranged in a square lattice pattern on a ceramic surface 6 hatched in the figure.

Figure 3A:
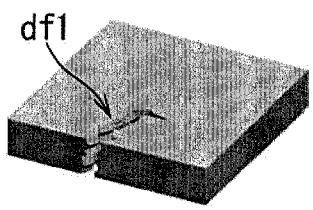
FIGS. 3A to 3D are perspective views schematically illustrating a defect that potentially occurs to the end face 1a and a normal surface irregularity ns that exists on a normal ceramic surface 6 and causes no problem in terms of product specifications.
Figure 3B:
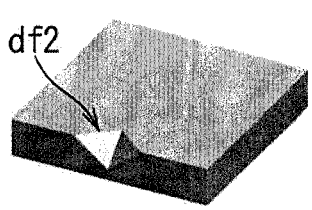
Figure 3C:
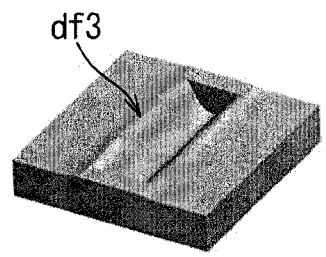
Figure 3D:
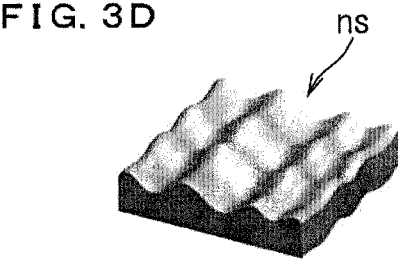
Figure 4:
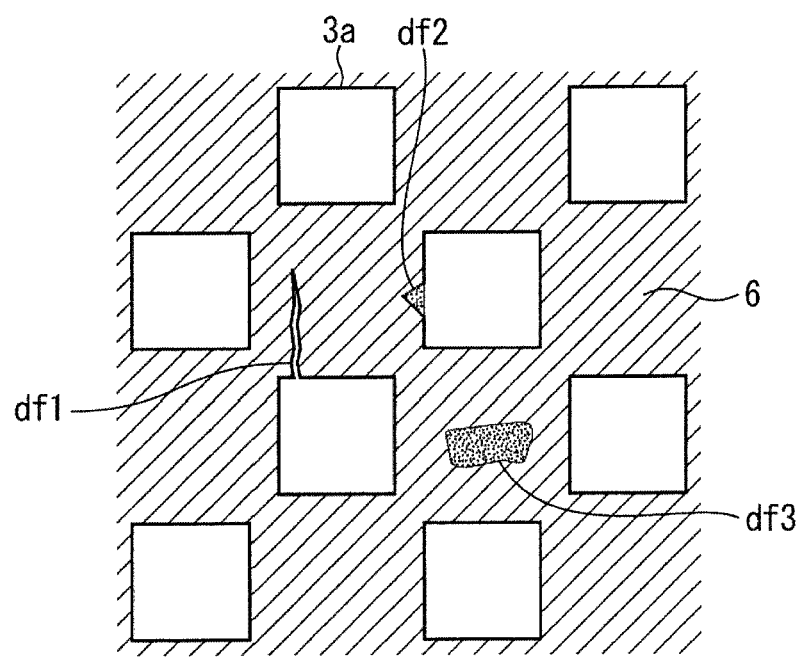
FIG. 4 is a top view exemplarily illustrating a situation in which a defect is formed at the ceramic surface 6.

FIGS. 3A to 3D and FIG. 4 are diagrams for description of a defect that potentially occurs to the end face 1a of the honeycomb structural body 1 formed as described above. A crack df1, a chip df2, and a scoop df3, which are each a recess on the end face 1a, are exemplarily illustrated as defects that potentially occur to the end face 1a of the honeycomb structural body 1. FIGS. 3A to 3D are perspective views schematically illustrating these defects and normal surface irregularities ns that exist on the normal ceramic surface 6 (without a defect) and cause no problem in terms of product specifications, and FIG. 4 is a top view exemplarily illustrating these defects formed on the ceramic surface 6.

The crack df1 illustrated in FIG. 3A is a crack (rift) formed on the ceramic surface 6 along with, for example, contraction of the honeycomb fired body at firing. The crack df1 formed has a width of 100 µm to 300 µm approximately and a depth of 160 µm to 1000 µm approximately. The crack df1 is likely to be formed from the opening (in other words, an end part of the partition 4) of the first cell 3a on the ceramic surface 6 as illustrated in FIG. 4, and is sometimes formed from one first cell 3a to another first cell 3a.

The chip df2 illustrated in FIG. 3B is, for example, a pit formed when part of the ceramic surface 6 lacks (falls) at firing or after firing. The chip df2 formed has a width of 380 µm to 500 µm approximately and a depth of 200 µm to 1000 µm approximately.

The scoop df3 illustrated in FIG. 3C is a concave formed due to a factor such as local anomalous deformation of the ceramic surface 6 at firing. The scoop df3 formed has a width of 700 µm to 1500 µm approximately and a depth of 350 µm to 2000 µm approximately.

FIG. 4 exemplarily illustrates a case in which the chip df2 is formed continuously with the first cell 3a at the end face 1a, and the scoop df3 is formed at a part (part at which the seal 5 is provided) of the ceramic surface 6 separated from the first cell 3a, but the actual formation aspect of the chip df2 and the scoop df3 is not limited thereto. For example, the scoop df3 is formed continuously with the first cell 3a in some cases.

Generally speaking, although the crack df1, the chip df2, and the scoop df3 are concave portions, the crack df1 has a large ratio of the depth relative to the width as compared to the chip df2 and the scoop df3. The chip df2 and the scoop df3 have different formation factors but have approximately equal sizes and do not need to be distinguished from each other at defect inspection to be described later. It is rather important that, the normal ceramic surface 6 (without a defect), which has the surface irregularities ns as illustrated in FIG. 3D at a convex portion interval of 50 µm to 500 µm approximately at a depth of 40 µm to 300 µm approximately, are not wrongly detected as the chip df2 and the scoop df3, since such normal surface irregularities ns cause no problem in terms of product specifications.

Details of inspection of such a defect that occurs to the end face 1a will be described below.

<Basic Concept of Defect Inspection>

The following first describes the basic concept of defect inspection performed in the present embodiment. The defect inspection performed in the present embodiment targets on the end face 1a of the honeycomb structural body 1 having the above-described configuration, and schematically, is inspection of existence of a defect by using the fact that, when the end face 1a is irradiated with illumination light in an oblique direction while a defect exists at the end face 1a, a shadow region (region in which luminance is small as compared to circumference) is formed at the existence position, and has characteristics on the scheme of the irradiation with illumination light and the scheme of generation of an image for determination.

FIGS. 5A to 5I are diagrams schematically illustrating situations when the end face 1a of the honeycomb structural body 1 is irradiated with illumination light in several directions.

FIG. 5A is a schematic top view when the end face 1a is irradiated with illumination light La in an oblique direction in a state in which the honeycomb structural body 1 is disposed so that the end face 1a is substantially horizontal, and FIG. 5B is a schematic sectional view of a section including the irradiation direction of the illumination light La. In this case, if a defect (concave portion) df4 as illustrated in FIG. 5B exists on the end face 1a, most of the end face 1a and the defect df4 becomes an irradiated region RE1a irradiated with the illumination light La, but the vicinity of a slant face on the left side in the defect df4 becomes a shadow region RE2a in which the illumination light La is not incident, depending on the shape (width and depth) of the defect df4 and the irradiation angle (angle of the irradiation direction with respect to a horizontal plane) of the illumination light La.

Similarly, FIG. 5C is a schematic top view when the end face 1a of the honeycomb structural body 1 is irradiated with illumination light Lb, and FIG. 5D is a schematic sectional view including the irradiation direction of the illumination light Lb, in which the honeycomb structural body 1 is disposed in the same manner as that of FIGS. 5A and 5B, respectively. FIG. 5E is a schematic top view when the end face 1a is irradiated with illumination light Lc, and FIG. 5F is a schematic sectional view including the irradiation direction of the illumination light Lc. FIG. 5G is a schematic top view when the end face 1a is irradiated with illumination light Ld, and FIG. 5H is a schematic sectional view including the irradiation direction of the illumination light Ld. However, the illumination light La, Lb, Lc, and Ld have irradiation angles equal to each other, have irradiation directions at an angle of 90° with respect to each other in a horizontal plane, and have irradiation ranges identical to each other.

At irradiation with the illumination light Lb, similarly to the case of irradiation with the illumination light La, while most of the end face 1a and the defect df4 becomes an irradiated region RE1b irradiated with the illumination light Lb, a shadow region RE2b in which the illumination light Lb is not incident comes to exist at a part of the defect df4 on the back side in the drawing plane, which is not explicitly illustrated in the figure.

At irradiation with the illumination light Lc, while most of the end face 1a and the defect df4 becomes an irradiated region RE1c irradiated with the illumination light Lc, the vicinity of a slant face of the defect df4 on the right side in the drawing plane becomes a shadow region RE2c in which the illumination light Lc is not incident.

At irradiation with the illumination light Ld, while most of the end face 1a and the defect df4 becomes an irradiated region RE1d irradiated with the illumination light Ld, a shadow region in which the illumination light Ld is not incident comes to exist at the vicinity of a slant face of the defect df4 on the front side in the drawing plane, which is not explicitly illustrated in the figure.

As just described, when the end face 1a at which the defect df4 exists is irradiated with illumination light in oblique directions different from each other, the positions and shapes of respective shadow regions formed for the defect df4 are different from each other, and do not correspond to the entire defect df4 in any case.

However, in another viewpoint, the fact that the positions and shapes of respective shadow regions are different suggests that the shadow regions provide information on mutually different parts of the defect df4. Based on this viewpoint, shadow regions formed in the cases of FIGS. 5B, 5D, 5F, and 5H are virtually superimposed with each other to obtain FIG. 5I. In this case, the irradiated region RE1 is only a part other than the defect df4, and the defect df4 is a shadow region RE2 as a whole. In other words, the shadow region RE2 is formed in a size close to the actual size of the defect.

This means that, when an image of the end face 1a is subsequently captured while being obliquely irradiated with illumination light in directions different from each other as illustrated in FIGS. 5A, 5C, 5E, and 5G, a synthesized image is generated by synthesizing the captured images so that shadow regions are superimposed on each other, and existence of a defect is determined based on the synthesized image, the certainty of the determination is increased as compared to a case in which the determination is performed by simply using images obtained in irradiation with illumination light in an oblique direction.

FIGS. 5A to 5I exemplarily illustrate aspects in which irradiation with illumination light is made in four directions at an angle of 90° with respect to each other in a horizontal plane, but this is exemplary, and the irradiation with illumination light may be performed in a larger number of directions.

To be sure, in an aspect in which a plurality of illumination light beams are simultaneously emitted in directions different from each other, such as an aspect in which, for example, the illumination light La and the illumination light Lc emitted from positions facing each other are simultaneously emitted, a place that is otherwise a shadow region when irradiated with one of the illumination light beams is irradiated with the other illumination light so that no shadow region is formed, and thus the aspect does not achieve an effect of increasing the reliability of defect determination based on a shadow region. In other words, in the present embodiment, it is technically meaningful to emit illumination light individually in a plurality of directions different from each other to obtain each image.

FIGS. 6A to 6D are diagrams for description of influence of difference in the irradiation angle of illumination light on defect detection. Typically, when a region in which an irregularity exists is obliquely irradiated with illumination light, a shadow region is less likely to be formed as the irradiation angle is larger and the depth of the irregularity is smaller.

Figure 6A:
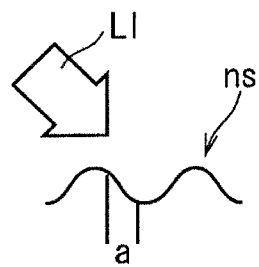
FIGS. 6A to 6D are diagrams for description of the influence of difference in the irradiation angle of illumination light on defect detection.
Figure 6C:
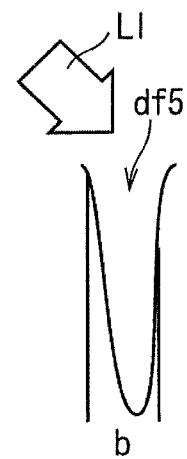
Figure 6B:
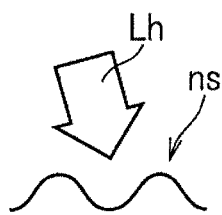

For example, even when irradiation on the surface irregularities ns as a normal irregular part existing on the ceramic surface 6 with illumination light L1 having a relatively small irradiation angle allows part a thereof to serve as a shadow region as illustrated in FIG. 6A, no shadow region is formed in some cases when the same surface irregularities ns as those in FIG. 6A are irradiated with illumination light Lh having an irradiation angle larger than that of the illumination light L1 as illustrated in FIG. 6B.

Figure 6D:

FIGS. 6C and 6D illustrate situations when a part having a crack df5 of a width equivalent to the convex portion interval of the surface irregularities ns existing on the ceramic surface 6 and of a depth larger than the irregularity depth of the surface irregularities ns is irradiated with the illumination light L1 and the illumination light Lh, respectively.

In such a case, as illustrated in FIG. 6C, a part b as a part of the crack df5 is a shadow region at irradiation with the illumination light L1, and additionally, a part c as a part of the crack df5 is a shadow region at irradiation with the illumination light Lh in some cases as illustrated in FIG. 6D although it is narrower than the region b.

If defect determination is performed based on an image of the end face 1a obtained through irradiation with the illumination light L1, it is potentially wrongly determined that a defect exists at the position of a shadow region formed at the normal surface irregularities ns. Thus, irradiation with illumination light having a relatively large irradiation angle, such as the illumination light Lh, is preferable to reliably detect the crack df5 only and avoid false detection of the surface irregularities ns as a defect.

However, a chip and a scoop as defects each having a depth smaller and a width larger than those of a crack tend to be unlikely to be detected with a large irradiation angle. Thus, in the present embodiment, reliable determination is achieved by selectively using the irradiation angle of illumination light and determining existence of a defect based on a threshold determined in advance in accordance with characteristics of a dark part appearing in an image of the end face 1a for each angle.

<Defect Inspecting Apparatus and Processing for Defect Inspection>

The following describes a defect inspecting apparatus configured to actually perform defect inspection based on the above-described concept, and a specific procedure of processing for defect inspection performed by the defect inspecting apparatus. The defect inspecting apparatus according to the present embodiment is roughly classified into two configuration aspects, and the contents of the processing for defect inspection are different in accordance with the configuration aspect of the defect inspecting apparatus. The following sequentially describes each aspect.

(First Configuration Aspect)

[Defect Inspecting Apparatus]

Figure 7:
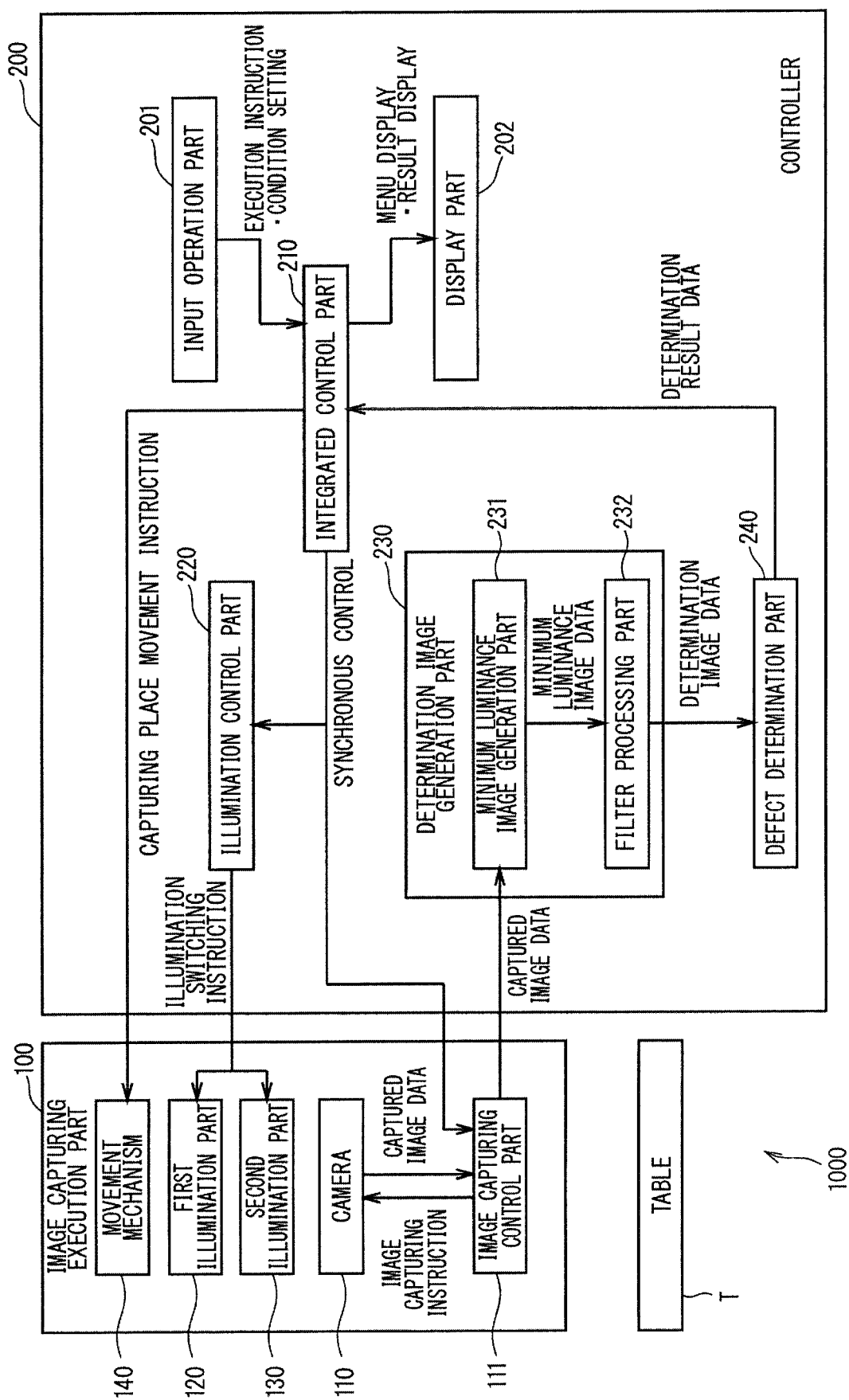
FIG. 7 is a block diagram illustrating the configuration of a defect inspecting apparatus 1000 according to a first configuration aspect.

FIG. 7 is a block diagram illustrating the configuration of a defect inspecting apparatus 1000 according to a first configuration aspect of the present embodiment. The defect inspecting apparatus 1000 mainly includes a table T on which the honeycomb structural body 1 as an inspection target is to be placed, an image capturing execution part 100 configured to perform image capturing while irradiating the honeycomb structural body 1 placed on the table T with illumination light, and a controller 200 configured to perform control of the image capturing execution part 100 and defect determination based on a captured image obtained by the image capturing execution part 100.

The image capturing execution part 100 mainly includes a camera (for example, CCD camera) 110 to capture an image of the honeycomb structural body 1 placed on the table T, an image capturing control part 111 as a control part (camera driver) to control image capturing by the camera 110, a first illumination part 120 and a second illumination part 130 each configured to irradiate the honeycomb structural body 1 with illumination light, and a movement mechanism 140 configured to move the image capturing execution part 100 relative to the honeycomb structural body 1 placed on the table T.

Figure 8:
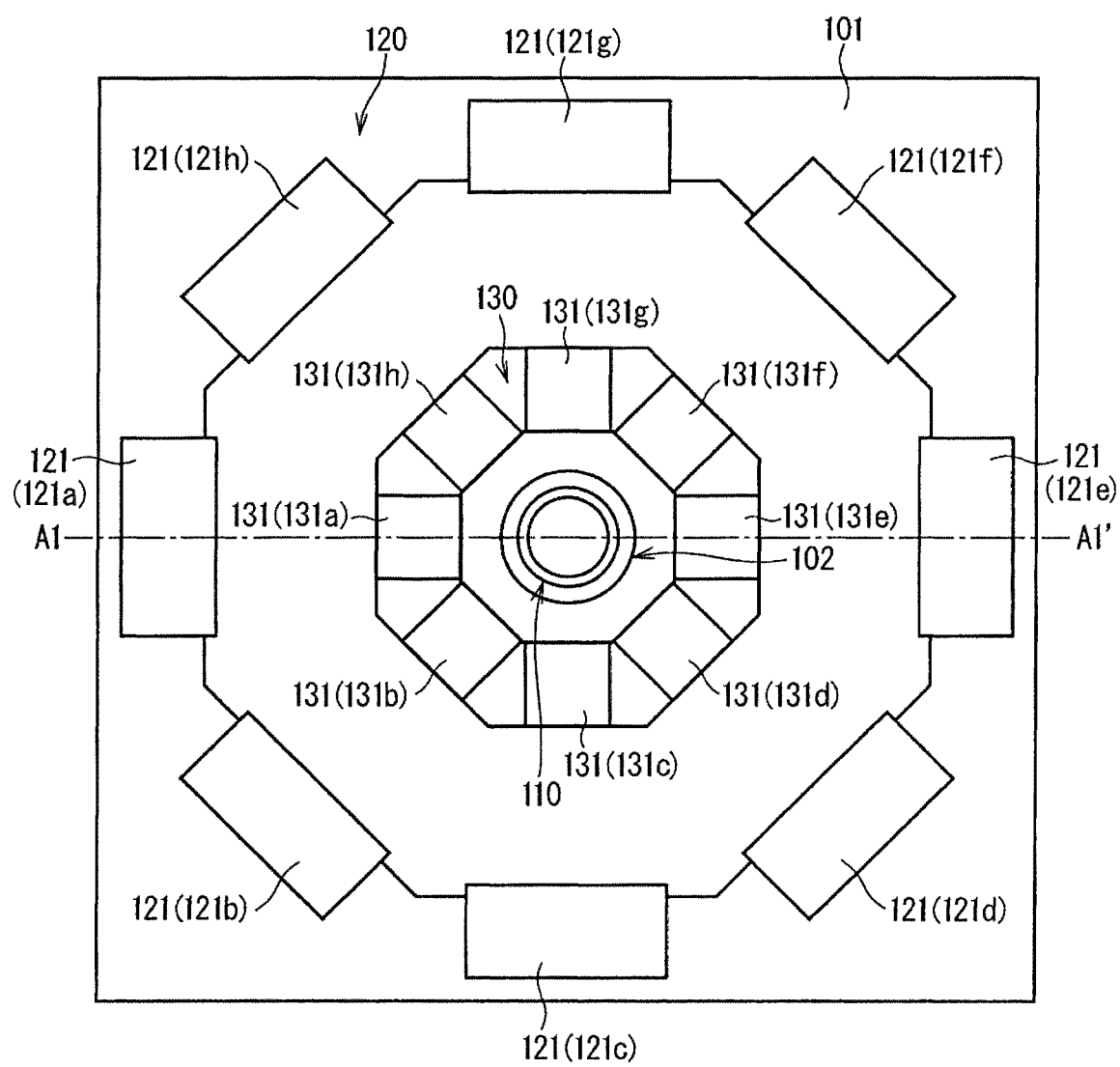
FIG. 8 is a lower surface diagram of a main part of an image capturing execution part 100.
Figure 9:
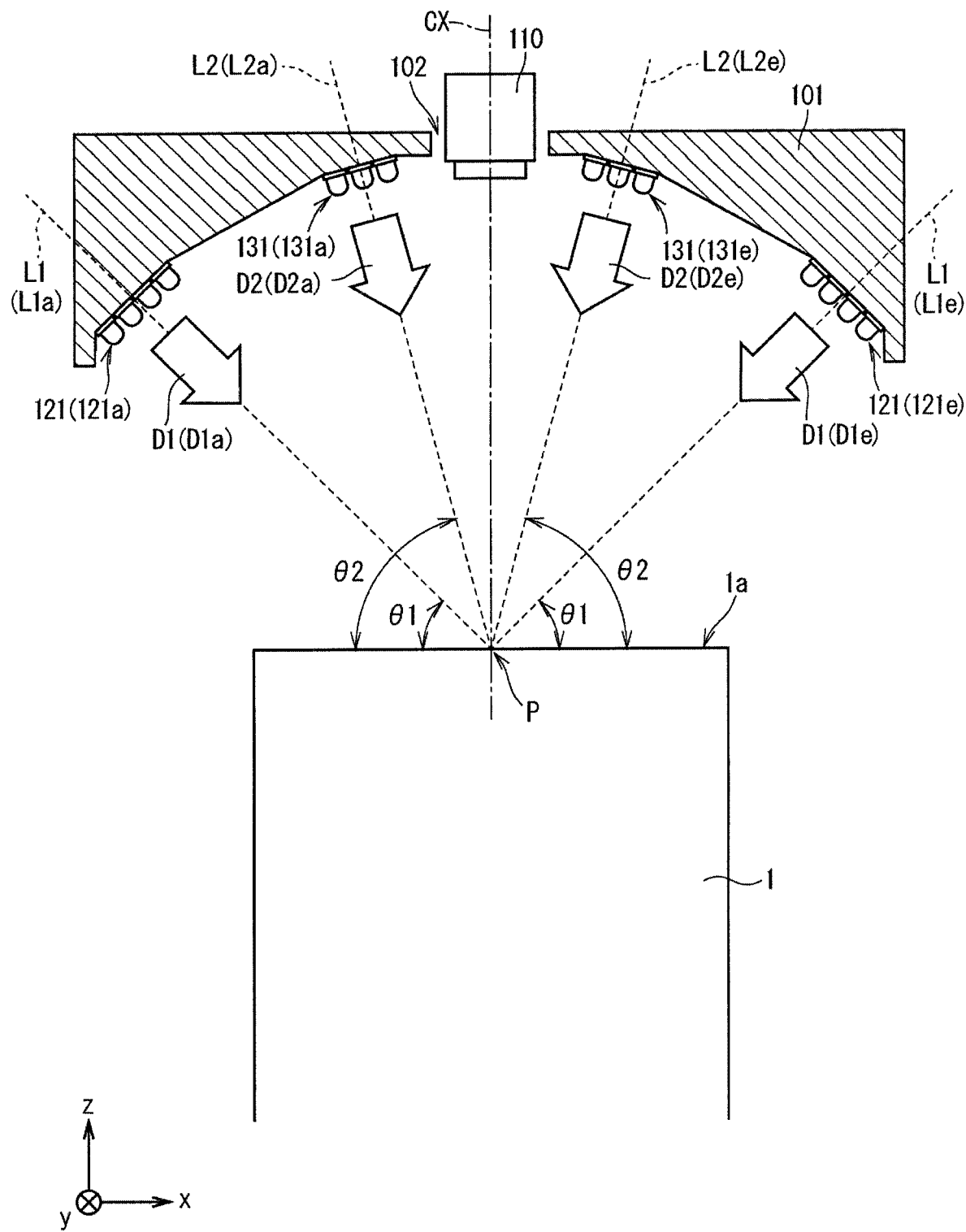
FIG. 9 is a cross-sectional view taken along line A1-A1' in FIG. 8.

FIG. 8 is a lower surface diagram of a main part of the image capturing execution part 100 (diagram in which the image capturing execution part 100 is viewed upward from below in the vertical direction), and FIG. 9 is a cross-sectional view taken along line A1-A1' in FIG. 8. The A1-A1' section in FIG. 8 is a vertical section including an optical axis CX of the camera 110, and is a symmetric plane of a first illumination element 121a, a first illumination element 121e, a second illumination element 131a, and a second illumination element 131e to be described later.

However, to facilitate understanding, FIG. 9 additionally illustrates the honeycomb structural body 1 placed on the table T which itself is not illustrated in FIG. 9. FIGS. 8 and 9 include right-handed xyz coordinates having a z axial direction along the vertical direction. In FIG. 8, an x axial direction is along the right-left direction in the drawing plane, and a y axial direction is along the up-down direction in the drawing plane. Accordingly, FIG. 9, which illustrates the A1-A1' section in FIG. 8, is a zx cross-sectional view.

At inspection, the honeycomb structural body 1 is placed on the table T (not illustrated) so that the end face 1a as an inspection target surface is a horizontal upper surface as illustrated in FIG. 9. In the image capturing execution part 100, in order to have a capturing target in the vertically downward direction, the camera 110 is provided in a posture in which the lens thereof points vertically downward and the optical axis CX thereof is aligned with the vertical direction. Accordingly, the camera 110 can perform image capturing in a predetermined range centered at an intersection point P between the optical axis CX and the end face 1a.

Such configuration that the end face 1a is a horizontal upper surface and the optical axis CX of the camera 110 is aligned with the vertical direction implies that the camera 110 captures an image of the end face 1a as an inspection target surface in the normal direction of the end face 1a.

The image capturing control part 111 is attached to the camera 110, and provides a capturing instruction to the camera 110 and forwards, to the controller 200, captured image data generated through image capturing by the camera 110.

As illustrated in FIG. 8, in the image capturing execution part 100, the first illumination part 120 and the second illumination part 130 are provided surrounding the camera 110 disposed in such a manner. The first illumination part 120 and the second illumination part 130 are both disposed on a lower surface of a support body 101 constituting the image capturing execution part 100, and at least at image capturing, the camera 110 is inserted into an opening 102 provided to the support body 101.

More specifically, the first illumination part 120 includes eight first illumination elements 121 (121a, 121b, 121c, 121d, 121e, 121f, 121g, and 121h) as illustrated in FIG. 8. These eight first illumination elements 121 each have a longitudinal direction along the horizontal direction and are arranged to separate from each other by 45° in a horizontal plane and each attached in a tilt posture to the support body

101 like the first illumination elements 121*a* and 121*e* exemplarily illustrated in FIG. 9. More specifically, each first illumination element 121 has an irradiation direction D1 at a predetermined angle θ1 relative to the horizontal plane, and the intersection point between an optical axis L1 thereof and the end face 1*a* coincides with the intersection point P between the optical axis CX of the camera 110 and the end face 1*a*. Accordingly, the eight first illumination elements 121 can irradiate substantially identical regions centered at the intersection point P with illumination light at the same irradiation angle θ1 in mutually different directions at an angle of 45° with respect to each other in the horizontal plane.

FIG. 9 exemplarily illustrates a situation in which the irradiation direction D1 (D1*a* or D1*e*) of each of the two first illumination elements 121*a* and 121*e* arranged opposite to each other among the eight first illumination elements 121 has the predetermined angle θ1 relative to the horizontal plane, and the intersection point between the optical axis L1 (L1*a* or L1*e*) and the end face 1*a* coincides with the intersection point P between the optical axis CX of the camera 110 and the end face 1*a*.

The second illumination part 130 includes eight second illumination elements 131 (131*a*, 131*b*, 131*c*, 131*d*, 131*e*, 131*f*, 131*g*, and 131*h*) as illustrated in FIG. 8. These eight second illumination elements 131 each have a longitudinal direction along the horizontal direction and are arranged to separate from each other by 45° in a horizontal plane and each attached in a tilt posture to the support body 101 like the second illumination elements 131*a* and 131*e* exemplarily illustrated in FIG. 9. More specifically, each second illumination element 131 has an irradiation direction D2 and has a predetermined angle θ2 larger than the angle θ1 relative to the horizontal plane, and the intersection point between an optical axis L2 and the end face 1*a* also coincides with the intersection point P between the camera 110 and the end face 1*a*. Accordingly, the eight second illumination elements 131 can irradiate substantially identical regions centered at the intersection point P with illumination light at the same irradiation angle θ2 in mutually different directions at an angle of 45° with respect to each other in the horizontal plane.

FIG. 9 exemplarily illustrates a situation in which the irradiation direction D2 (D2*a* or D2*e*) of each of the two second illumination elements 131*a* and 131*e* arranged opposite to each other among the eight second illumination elements 131 has the predetermined angle θ2 relative to the horizontal plane, and the intersection point between the optical axis L2 (L2*a* or L2*e*) and the end face 1*a* coincides with the intersection point P between the camera 110 and the end face 1*a*.

The irradiation angle θ1 of each first illumination element 121 is preferably 30° to 60°, and is, for example, 45°. The irradiation angle θ2 of each second illumination element 131 is preferably 60° to 85°, and is, for example, 75°. When the irradiation angle θ1 of the first illumination element 121 is smaller than 30°, the size of a shadow region occurring at the normal surface irregularity ns of the ceramic surface 6 increases and the surface irregularity ns is highly likely to be falsely detected as a defect, which is not preferable. When the irradiation angle θ2 of each second illumination element 131 is larger than 85°, a shadow region is unlikely to be formed at a defect, and the defect is highly potentially not detected, which is not preferable. The difference between θ1 and θ2 is preferably 15° at smallest to more reliably detect various kinds of defects having shapes different from each other.

It is preferable to use bar illumination in which a large number of LED elements are arrayed in a rectangular shape as each of the first illumination element 121 and the second illumination element 131. The wavelength of each illumination light is not particularly limited, but white light or single-color light may be used and the wavelength of illumination light may differ between the first illumination element 121 and the second illumination element 131. Each LED element may have a directivity angle half width of 5° to 30° approximately.

However, the number of first illumination elements 121 provided to the first illumination part 120 is not limited to eight, but typically, m (m≥4) first illumination elements 121 of the same performance, each having the irradiation angle θ1 may be provided at positions equiangularly spaced from each other around the camera 110 in the horizontal plane.

Similarly, the number of second illumination elements 131 provided to the second illumination part 130 is not limited to eight, but typically, n (n≥4) second illumination elements 131 of the same performance, each having the irradiation angle θ2 may be provided at positions equiangularly spaced from each other around the camera 110 in the horizontal plane. In this configuration aspect, m≠n may hold.

Such configuration that the plurality of first illumination elements 121 provided to the first illumination part 120 and the plurality of second illumination elements 131 provided to the second illumination part 130 are separated from each other in the respective horizontal plane, while the honeycomb structural body 1 is placed on the table T so that the end face 1*a* as an inspection target surface is in a horizontal posture, implies that the plurality of first illumination elements 121 and the plurality of second illumination elements 131 are separated from each other in different planes parallel to the end face 1*a* as an inspection target surface.

The movement mechanism 140 is provided to move the camera 110 and the support body 101 to which the first illumination part 120 and the second illumination part 130 are attached. In the case that the capturing range of the camera 110 is smaller than the area of the end face 1*a* of the honeycomb structural body 1 due to the resolution of the camera 110 or the like, the movement mechanism 140 moves the camera 110 and the support body 101 to the next capturing place each time image capturing at a capturing place ends.

The defect inspecting apparatus 1000 may be configured such that the camera 110 and the support body 101 are fixedly provided and the table T moves.

The controller 200 is implemented by a computer such as a general-purpose personal computer. The controller 200 includes an input operation part 201 constituted by a mouse, a keyboard, and the like, through which inputting of an instruction for execution of defect inspection and condition setting is performed by a worker, and a display part 202 such as a display configured to perform menu display for defect inspection, display of inspection result, and the like.

In addition, the controller 200 includes, as functional components implemented through an execution of an operation program, stored in a storage part (not illustrated) such as a hard disk provided to the computer, by a control part (not illustrated) provided to the computer including a CPU, a ROM, and a RAM, an integrated control part 210 configured to collectively control operation of the entire defect inspecting apparatus 1000, an illumination control part 220 configured to control switching operation to turn on and off (ON/OFF) illumination at the first illumination part 120 and the second illumination part 130, a determination image generation part 230 configured to generate determination image data used for determination of existence of a defect based on captured image data generated by image capturing through the camera 110, and a defect determination part 240 configured to determine the existence of a defect based on the determination image data.

The integrated control part 210 controls the illumination control part 220 and the image capturing control part 111 provided to the image capturing execution part 100 in synchronization, in response to an execution instruction for inspection from the input operation part 201, in order to execute image capturing for defect inspection image data of the end face 1a being irradiated with illumination light.

Specifically, when a predetermined control signal is provided from the integrated control part 210 to the illumination control part 220, the illumination control part 220 sequentially turns on and off the m first illumination elements provided to the first illumination part 120 and the n second illumination elements provided to the second illumination part 130 at a predetermined timing for a turn-on time in response to the signal.

On the other hand, from the integrated control part 210 to the image capturing control part 111, a control signal for subsequently performing image capturing through the camera 110 in synchronization with the sequential turning-on of the m first illumination elements 121 and the n second illumination elements 131 is provided. The image capturing control part 111 controls the camera 110 to perform image capturing at a predetermined timing in response to the control signal.

The integrated control part 210 performs instruction for moving the image capturing execution part 100 to the next capturing place at the time when image capturing at a certain capturing place ends. In addition, the integrated control part 210 performs processing for displaying a determination result data generated by the defect determination part 240 on the display part 202.

The determination image generation part 230 acquires captured image data generated by image capturing through the camera 110, directly or indirectly (through the integrated control part 210) from the image capturing control part 111, and generates determination image data. The determination image generation part 230 includes a minimum luminance image generation part 231 and a filter processing part 232 as functional components for performing the generation of the determination image data.

As described above, the first illumination part 120 is provided with the m (for example, eight) first illumination elements 121, and image capturing is subsequently performed each time the first illumination elements 121 are sequentially turned on. Thus, m pieces of captured image data (first captured image data) are obtained through illumination emitted to the end face 1a of the honeycomb structural body 1 at the irradiation angle θ1. Similarly, the second illumination part 130 is provided with the n (for example, eight) second illumination elements 131, and image capturing is subsequently performed each time the second illumination elements 131 are sequentially turned on. Thus, n pieces of captured image data (second captured image data) are obtained through illumination emitted to the end face 1a of the honeycomb structural body 1 at the irradiation angle θ2.

The m pieces of first captured image data and the n pieces of second captured image data are subjected to luminance correction as preprocessing and used to minimum luminance image generation at the minimum luminance image generation part 231. Various kinds of methods may be applied to the luminance correction, and for example, luminance correction processing performed in a second embodiment to be described later may be applied to the luminance correction. The luminance correction processing may be performed by any of the camera 110, the image capturing control part 111, and the minimum luminance image generation part 231, as long as a function to perform the processing is provided thereto. Alternatively, like a defect inspecting apparatus 3000 according to the second embodiment to be described later, a processing part configured to perform the luminance correction processing may be provided.

The minimum luminance image generation part 231 performs processing of generating first minimum luminance image data from the m pieces of first captured image data and generating second minimum luminance image data from the n pieces of second captured image data.

The first minimum luminance image data is image data in which $B_{1(x,y)}$ is given in an expression below when $B_{1(x,y)}$ represents the luminance value at a pixel (x, y) and $B_{1(x,y)i}$ represents the luminance value at an individual pixel (x, y) of the i-th first captured image data:

$$B_{1(x,y)} = \mathrm{Min}\{B_{1(x,y)1}, B_{1(x,y)2}, \ldots B_{1(x,y)m}\} \qquad (1)$$

In other words, the first minimum luminance image data is image data in which the minimum value $\mathrm{Min}\{B_{1(x,y)1}, B_{1(x,y)2}, \ldots, B_{1(x,y)m}\}$ of the luminance value at each pixel (x, y) in the m pieces of first captured image data is the luminance value at the pixel (x, y).

Similarly, the second minimum luminance image data is image data in which $B_{2(x,y)}$ is given in an expression below when $B_{2(x,y)}$ represents the luminance value at a pixel (x, y) and $B_{2(x,y)j}$ represents the luminance value at an individual pixel (x, y) of the j-th second captured image data:

$$B_{2(x,y)} = \mathrm{Min}\{B_{2(x,y)1}, B_{2(x,y)2}, \ldots B_{2(x,y)n}\} \qquad (2)$$

In other words, the second minimum luminance image data is image data in which the minimum value $\mathrm{Min}\{B_{2(x,y)1}, B_{2(x,y)2}, \ldots, B_{2(x,y)n}\}$ of the luminance value at each pixel (x, y) in the n pieces of second captured image data is the luminance value at the pixel (x, y).

When the m pieces of first captured image data and the n pieces of second captured image data include a shadow region corresponding to a defect, the first minimum luminance image data and the second minimum luminance image data express an image in which a shadow region in each piece of captured image data is virtually superimposed as conceptually illustrated as an example in FIGS. 5A to 5I. This means that a shadow region (region in which the luminance value is low) attributable to a defect is enhanced in the first minimum luminance image data and the second minimum luminance image data.

On the other hand, even when the first captured image data or the second captured image data obtained by performing image capturing under first illumination element or second illumination element emitting light in a certain direction includes a shadow region attributable to the normal surface irregularity ns existing on the ceramic surface 6, in the first captured image data or the second captured image data obtained by performing image capturing while irradiating the same place with light in different directions from the first illumination element or the second illumination element, chips and scoops are enhanced as compared to the shadow region corresponding to the surface irregularity ns, because the area of the surface irregularity ns is relatively small. In the first place, the shadow region corresponding to the surface irregularity ns is unlikely to be formed under the second illumination element at a large irradiation angle.

In the defect inspecting apparatus 1000, the certainty of detection of a defect at the end face 1a of the honeycomb structural body 1 is increased by using the first minimum luminance image data and the second minimum luminance image data having such characteristics in defect existence determination.

The filter processing part 232 subjects the first minimum luminance image data and the second minimum luminance image data generated by the minimum luminance image generation part 231 to various kinds of filter processing, and generates data that is more appropriate for defect existence determination. The filter processing includes the well-known image processing technologies of binarization processing, closing processing (expansion-contraction processing), and labeling processing.

The filter processing part 232 generates first determination image data by subjecting the first minimum luminance image data to the filter processing, and generates second determination image data by subjecting the second minimum luminance image data to the filter processing.

Schematically, the filter processing part 232 performs the binarization processing to each of the first minimum luminance image data and the second minimum luminance image data in which each pixel has a gradation value, based on a predetermined luminance threshold, and removes a minute dark pixel region as a noise component by subjecting a pixel region (region in which dark pixels are continuous) that has become a dark pixel of luminance 0 as a result of the binarization to the closing processing, and performs labeling on the remaining dark pixel region through the labeling processing, thereby generating the first determination image data and the second determination image data.

In addition, the filter processing part 232 performs opening mask processing of excluding the first cell 3a, which is always a shadow region in an image expressed by each of the first determination image data and the second determination image data, from defect determination targets.

The defect determination part 240 determines existence of a defect based on the first determination image data and the second determination image data. Schematically, when a dark pixel region exists in an area equal to or larger than a predetermined threshold in a determination image expressed by each of the first determination image data and the second determination image data, or in a determination image obtained by subjecting the first determination image data and the second determination image data to the opening mask processing, the defect determination part 240 determines that a defect exists at the existence position of the dark pixel region.

[Image Capturing Processing]

Figure 10:
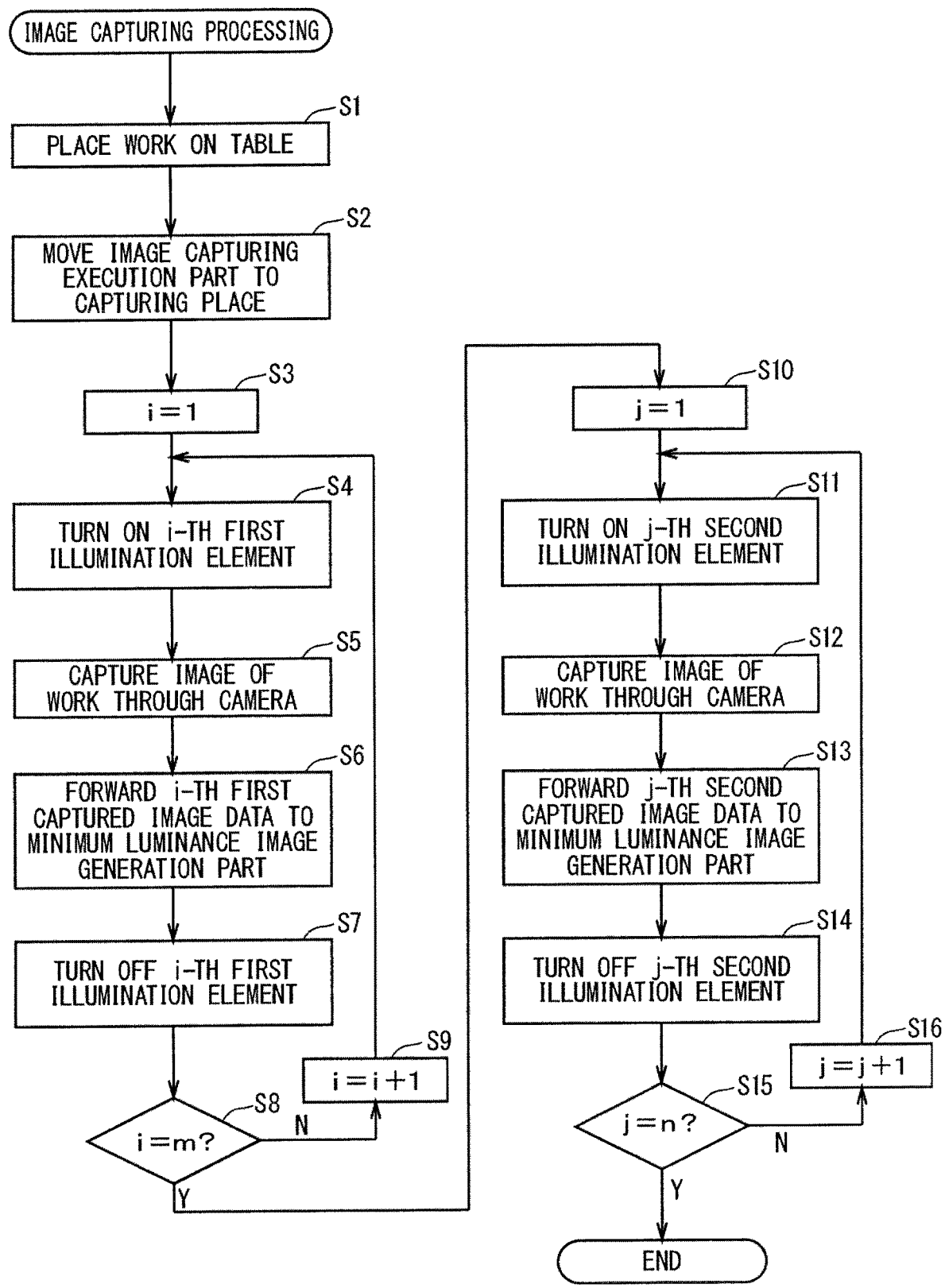
FIG. 10 is a diagram illustrating the procedure of image capturing processing performed by the defect inspecting apparatus 1000 for defect inspection.

FIG. 10 is a diagram illustrating the procedure of image capturing processing performed for defect inspection in the defect inspecting apparatus 1000 having the above-described configuration. In FIG. 10 and description related to the figure, the honeycomb structural body 1 as a defect inspection target is also referred to as a "work", and the end face 1a as an inspection target surface of the honeycomb structural body 1 is also referred to as a "work end face".

First, the work is placed on the table T in a posture in which the end face thereof is an upper surface by a worker or predetermined conveyance means (placement means) (step S1). After the work placement, when an execution instruction of a defect inspection is provided through the input operation part 201, the movement mechanism 140 is driven to move the image capturing execution part 100 (more specifically, the camera 110 and the support body 101 supporting the first illumination part 120 and the second illumination part 130) to a capturing place (step S2). When the capturing range of the camera 110 is smaller than the area of the work end face 1a, inspection is performed a plurality of times, and thus the inspection target region or the capturing place in one inspection processing is a predetermined part of the end face 1a.

In this case, the work may be positioned when placing on the table T, or the posture of the camera 110 may be adjusted in the horizontal plane, so that the cells 3 of the work (the first cells 3a in appearance) are arrayed in the longitudinal and transverse axial directions in the capturing range of the camera 110, which is defined in a rectangular shape. However, even when the array direction of the cells 3 is slightly tilted relative to the longitudinal and transverse axial directions in the capturing range of the camera 110, the determination processing can be performed with no problem by performing correction with the tilt taken into account as necessary at the determination processing.

A sensor configured to sense that the work is placed on the table T may be provided, and the integrated control part 210 may emit, in response to a sensing signal from the sensor, a predetermined control signal for sequentially executing the image capturing processing and the following determination processing to each component of the defect inspecting apparatus 1000.

After the image capturing execution part 100 is disposed at the capturing place, the initial value of i=1 is set (step S3), and sequential image capturing is performed by the camera 110 while sequentially turning on the m first illumination elements 121 belonging to the first illumination part 120.

Specifically, the i-th first illumination element 121 belonging to the first illumination part 120 is turned on (step S4), and the camera 110 captures an image of the work in such a turn-on state (step S5). The i-th first captured image data obtained through the image capturing is forwarded from the image capturing control part 111 to the minimum luminance image generation part 231 (step S6), and subjected to determination processing to be described later. Upon completion of the image capturing and the forwarding, the i-th first illumination element 121 being turned on is turned off (step S7). Alternatively, the i-th first illumination element 121 may be turned off immediately after the completion of the image capturing. Alternatively, all pieces of first captured image data may be forwarded to the minimum luminance image generation part 231 upon completion of image capturing performed while the m-th first illumination element 121 is turned on.

When i=m does not hold (NO at step S8), in other words, when there is any first illumination element 121 yet to be turned on, i=i+1 is set (step S9), step S4 and the following processing are repeated.

When i=m holds (YES at step S8), in other words, when all of the m first illumination elements 121 are sequentially turned on and image capturing through the camera 110 is subsequently performed in each turn-on state, the initial value of j=1 is set (step S10), sequential image capturing is performed by the camera 110 while the n second illumination elements 131 belonging to the second illumination part 130 are sequentially turned on.

Specifically, the j-th second illumination element 131 belonging to the second illumination part 130 is turned on (step S11), and the camera 110 captures an image of the work in such a turn-on state (step S12). The j-th second captured image data obtained through the image capturing is forwarded from the image capturing control part 111 to the minimum luminance image generation part 231 (step S13), and subjected to determination processing to be described later. Upon completion of the image capturing and the forwarding, the j-th second illumination element 131 being turned on is turned off (step S14). Alternatively, the j-th second illumination element 131 may be turned off immediately after the completion of the image capturing.

When j=n does not hold (NO at step S15), in other words, when there is any second illumination element yet to be turned on, j=j+1 is set (step S16), and step S11 and the following processing are repeated.

When j=n holds (YES at step S16), in other words, when all of the n second illumination elements 131 are sequentially turned on and image capturing through the camera 110 is subsequently performed in each turn-on state, the image capturing processing ends.

When the capturing range of the camera 110 is smaller than the area of the work end face, the image capturing execution part 100 is moved to the next capturing place to repeat the processing at step S3 and later.

[Determination Processing]

The following describes determination processing for existence of a defect performed by the defect inspecting apparatus 1000. The defect inspecting apparatus 1000 performs first determination processing based on the m pieces of first captured image data, and second determination processing based on the n pieces of second captured image data. In the present configuration aspect, not both of the first determination processing and the second determination processing need to be performed after completion of the image capturing processing, but the first determination processing may be performed at a timing when all pieces of first captured image data are generated through the image capturing processing, and the second determination processing may be performed at a timing when all pieces of second captured image data are generated.

Figure 11:
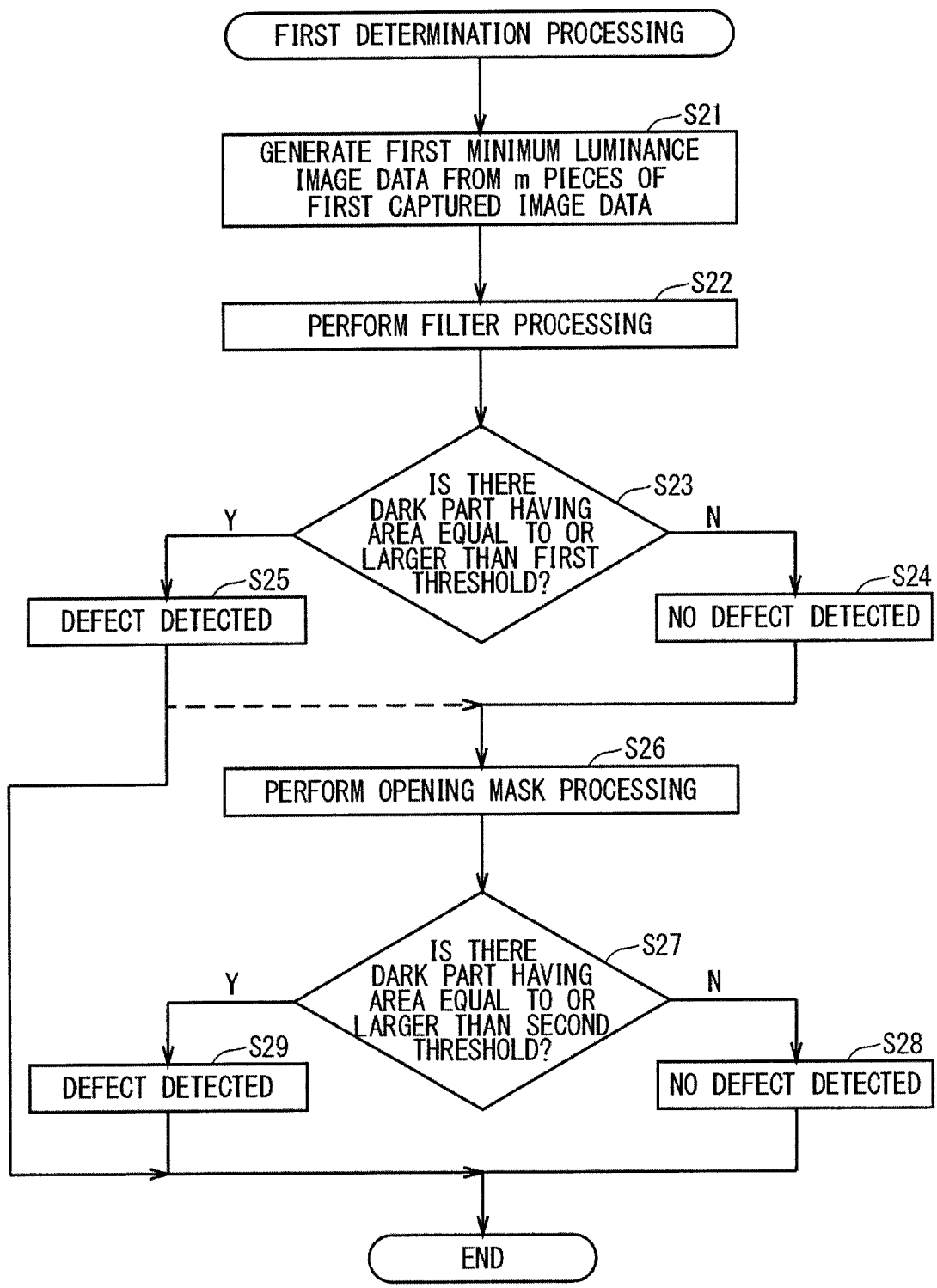
FIG. 11 is a diagram illustrating the procedure of first determination processing.

FIG. 11 is a diagram illustrating the procedure of the first determination processing. In the first determination processing, first, the minimum luminance image generation part 231 generates, based on the above-described Expression (1), the first minimum luminance image data from the m pieces of first captured image data forwarded from the image capturing control part 111 (step S21).

The first minimum luminance image data generated by the minimum luminance image generation part 231 is subjected to the filter processing at the filter processing part 232 (step S22).

Specifically, first, the well-known binarization processing in which a pixel (x, y) is set to be a bright pixel of luminance 1 when the luminance value $B_{1(x,y)}$ at the pixel (x, y) is equal to or larger than a predetermined luminance threshold, and a pixel (x, y) is set to be a dark pixel of luminance 0 when the luminance value $B_{1(x,y)}$ is smaller than the predetermined luminance threshold is performed. The pixel set to be a bright pixel at this stage is excluded from targets of the following determination processing. Hereinafter, a region in which dark pixels are continuous is also referred to as a dark part or a dark region.

Subsequently, the well-known closing processing (expansion-contraction processing) is performed for the dark part, so that a dark part discretely existing as a noise component in image data after the binarization processing and having a small region area (including a small number of pixels) is excluded from targets of the following determination processing.

As described above, image data as a processing target includes a dark part attributable to the normal surface irregularities ns that exist on the ceramic surface 6 and cause no problem in terms of product specifications in some cases. Such a dark part has a relatively small region area, and is thus mostly excluded from targets of the determination processing through the closing processing.

Lastly, to identify any dark part remaining after the closing processing, the well-known labeling processing of associating all dark parts with identification information for uniquely identifying each dark part is performed.

Figure 12A:
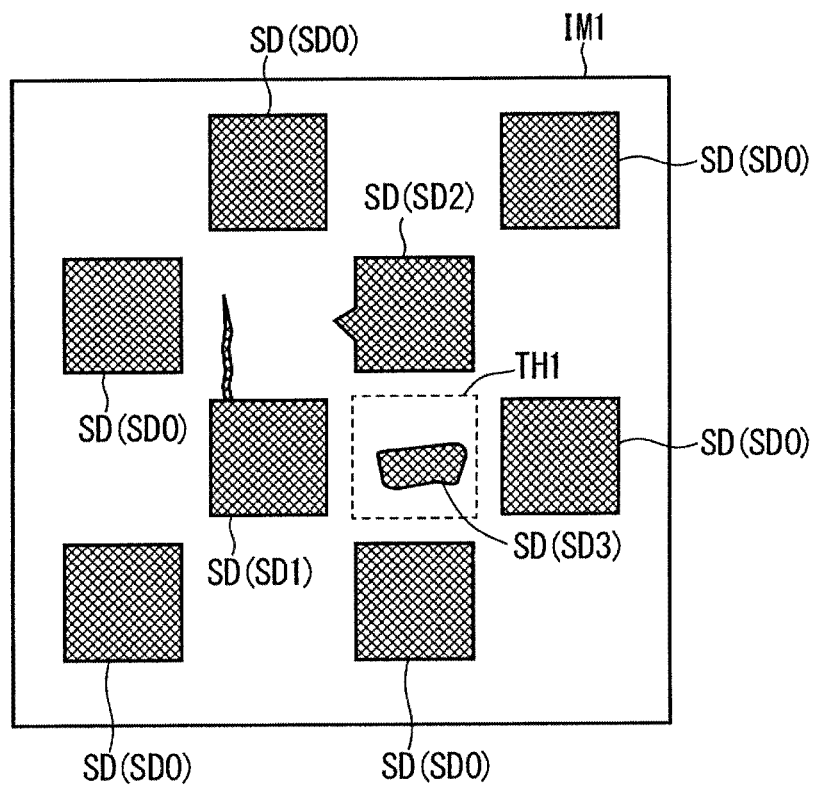
FIGS. 12A and 12B are diagrams for description of the first half of the first determination processing.
Figure 12B:
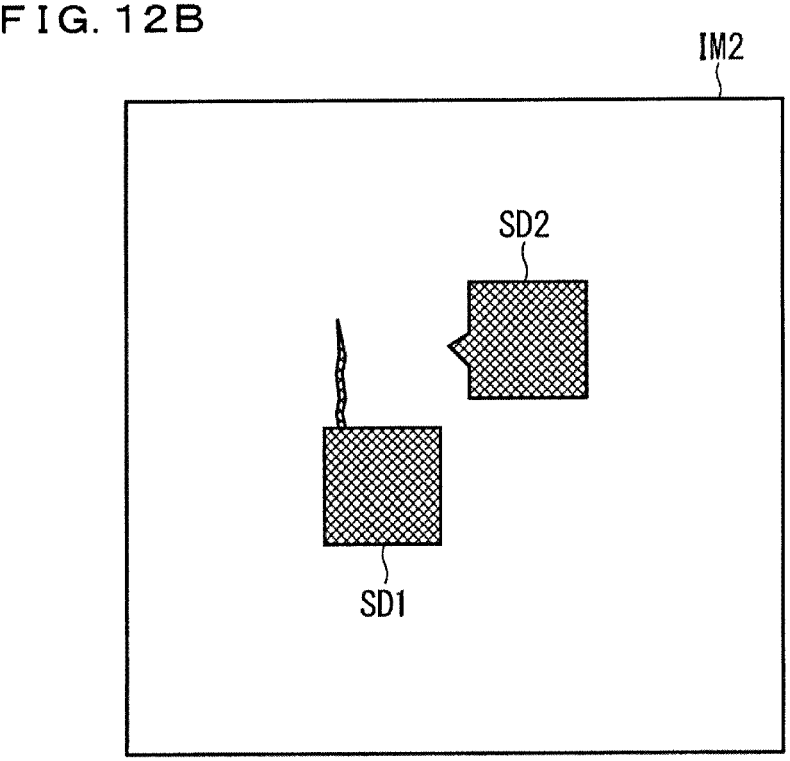
Figure 13A:
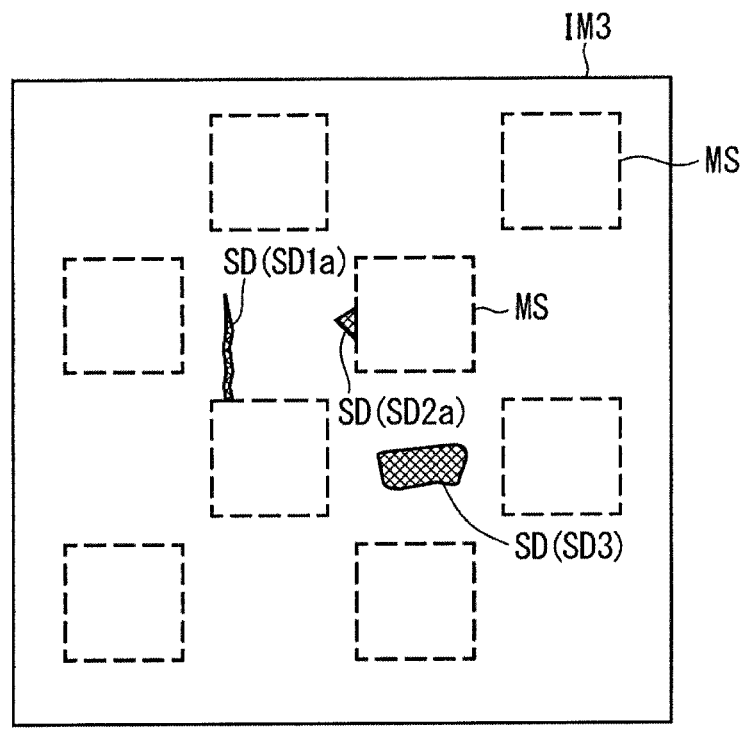
FIGS. 13A and 13B are diagrams for description of the second half of the first determination processing.
Figure 13B:
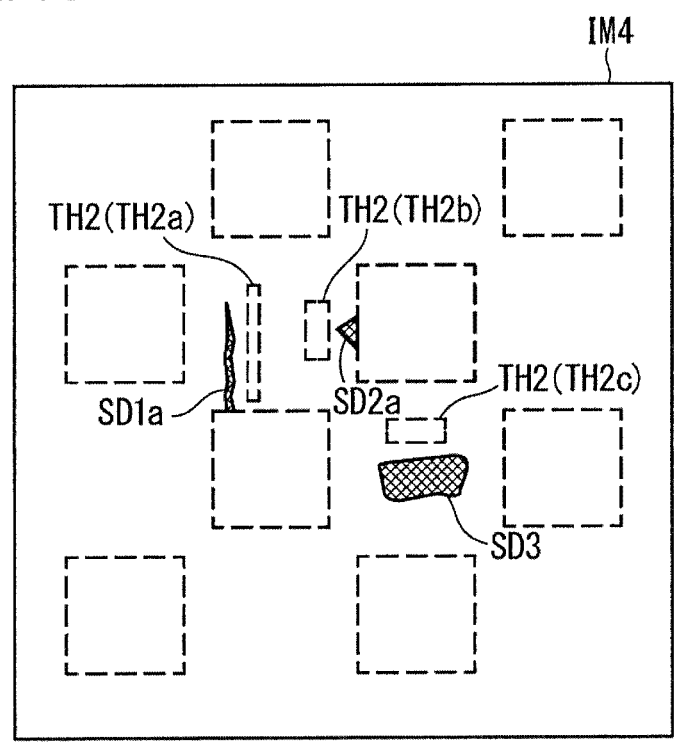

The first determination image data obtained through the filter processing described above is subjected to the determination by the defect determination part 240. FIGS. 12A and 12B are diagrams for description of the first half of the first determination processing. FIGS. 13A and 13B are diagrams for description of the second half of the first determination processing.

FIG. 12A exemplarily illustrates a first determination image IM1 expressed by the first determination image data. The first determination image IM1 illustrated in FIG. 12A corresponds to the ceramic surface 6 exemplarily illustrated in FIG. 4. In FIGS. 12A and 12B, a dark part SD is cross-hatched.

There are several kinds of the dark part SD existing in the first determination image IM1, which is illustrated in FIG. 12A. Specifically, there are a total of nine dark parts SD of six square dark parts SD0, dark parts SD1 and SD2 in each of which a square dark part is continuous with a dark part attributable to the crack df1 or the chip df2 exemplarily illustrated in FIG. 4, and a dark part SD3 existing independently from a square dark part and attributable to the scoop df3 exemplarily illustrated in FIG. 4. These nine dark parts SD are associated with identification information through the labeling processing in advance.

The reason why the dark parts SD0 exist in the first determination image IM1 is that the first determination image data is data attributable to the m pieces of first captured image data captured with the first cells 3a opened at the end face 1a being included in the capturing range. Thus, the dark parts SD0 exist in a lattice pattern even in the first determination image data targeted for the ceramic surface 6 without any defect.

After the first determination image data is generated, the defect determination part 240 performs the determination processing for existence of a defect on the first determination image data.

Specifically, first, the first determination image data is checked by a predetermined first threshold (first dark part threshold), so as to determine whether any of the labeled dark parts SD included in the first determination image data occupies an area (more specifically, the number of included pixels corresponding to the area) equal to or larger than the first threshold (step S23). This determination based on the first threshold is performed in order to detect a defect such as the crack df1 or the chip df2, which is continuous with the first cell 3a as exemplarily illustrated in FIG. 4.

Thus, the first threshold is set to be slightly larger than the area (the number of pixels) of the opening of the first cell 3a. Accordingly, it is possible to reliably extract a dark part SD attributable to the first cell 3a, the opening of which is continuous with a defect, while preventing false determination of a normal dark part SD0 attributable to the normal first cell 3a, the opening of which is discontinuous with a defect, as a defect existence place.

To facilitate understanding, in FIG. 12A, a first threshold region TH1 having an area corresponding to the first threshold is exemplarily illustrated as a square region with dotted lines. However, the first threshold region TH1 is not limited to a square region, as a matter of course. FIG. 12B exemplarily illustrates an extraction image IM2 obtained by extracting only any dark part SD having an area equal to or larger than the first threshold from the first determination image IM1.

Only the dark parts SD1 and SD2 each having an area large than the first threshold region TH1 (naturally than the dark parts SD0), which are caused by existence of a defect continuous with the first cell 3a, exist in the extraction image IM2 illustrated in FIG. 12B, and the dark parts SD0 are excluded. The dark part SD3 corresponding to the scoop df3 is also excluded in the extraction image IM2, which is because the area of the dark part SD3 is smaller than the first threshold region TH1.

Even if any dark part attributable to the normal surface irregularity ns existing on the ceramic surface 6 remains at this stage, such dark part is smaller than the first threshold and thus reliably excluded from extraction targets, and accordingly, the surface irregularity ns is not falsely detected as a defect.

When no dark part SD (such as the dark parts SD1 and SD2) having an area equal to or larger than the first threshold exists (NO at step S23), at least it can be said that a defect continuous with the first cell 3a is not detected (step S24). On the other hand, when such a dark part SD exists (YES at step S23), it is determined that this form of defect exists on the ceramic surface 6 (step S25).

The first determination image data for which no defect is detected as a result of the comparison with the first threshold is subjected to the opening mask processing performed by the filter processing part 232 (step S26). In the case that a defect is detected in the first determination image data, the first determination processing could be ended as it is because it has been confirmed that a defect exists on the ceramic surface 6 as an inspection target. Alternatively, the first determination image data may be a target of the following defect determination processing, and in this case, the first determination image data is subjected to the opening mask processing performed by the filter processing part 232, similarly to a case in which no defect is detected.

The opening mask processing is processing of excluding all rectangular dark parts each corresponding to the first cell 3a in the first determination image data from targets of the determination processing. The arrangement position (arrangement interval) and size (and shape in a case of the first cell 3a near the outer wall 2) of the first cell 3a existing at the end face 1a of the honeycomb structural body 1 are known. The filter processing part 232 performs, based on those information input in advance, for example, pattern matching, cell region expansion-contraction processing, and binarization processing using a maximum luminance value image, thereby to exclude, from targets of the determination processing, a dark part determined to have the same shape as that of the first cell 3a at the end face 1a. This corresponds to processing of virtually providing a mask to a rectangular dark part.

FIG. 13A illustrates a mask-processed image IM3 obtained by virtually providing a mask MS to a rectangular region existing in the first determination image IM1 expressed by the first determination image data. In the opening mask processing, the mask MS is virtually provided to all rectangular dark parts SD existing in the first determination image IM1 whether or not each part has a part corresponding to a defect continuous with the first cell 3a. Thus, only a dark part SD1a that is part of the dark part SD1 in the first determination image IM1 and corresponds to the crack df1 exemplarily illustrated in FIG. 4, a dark part SD2a that is part of the dark part SD2 and corresponds to the chip df2, and the dark part SD3 corresponding to the scoop df3 remain as the dark parts SD in the mask-processed image IM3.

Then, the first determination image data after the opening mask processing is checked by a predetermined second threshold (second dark part threshold) to determine whether any of the dark parts SD remaining after the opening mask processing occupies an area (more specifically, the number of included pixels corresponding to the area) equal to or larger than the second threshold (step S27). This determination based on the second threshold is performed in order to mainly detect a defect existing independently from the first cell 3a, which has not been detected through the above-described determination based on the first threshold. Thus, the second threshold is set to be a value sufficiently small as compared to the first threshold. For example, the second threshold is preferably set to be slightly larger than the convex portion interval of the normal surface irregularities ns of the ceramic surface 6. However, since any rectangular dark part is masked, the detection target also includes a dark part corresponding to a defect continuous with the first cell 3a and existing continuously with a rectangular dark part. Such a defect has already been detected through the determination based on the first threshold as described above, but the duplicate detection causes no problem.

To facilitate understanding, in FIG. 13B, a second threshold region TH2 having an area corresponding to the second threshold is exemplarily illustrated with dotted lines. More specifically, three second threshold regions TH2 (TH2a, TH2b, and TH2c) having mutually different shapes are illustrated.

When no dark part SD having an area equal to or larger than the second threshold exists in the first determination image data after the opening mask processing (NO at step S27), it can be said that no defect existing independently from the first cell 3a is detected (step S28). On the other hand, when such a dark part SD exists (YES at step S27), it is determined that a certain kinds of defect exists (step S29). More specifically, when no defect is detected through the comparison with the first threshold but a defect is detected through the comparison with the second threshold, this indicates that a defect independent from the first cell 3a exists. When a defect is detected through the comparison with the first threshold and a defect is detected through the comparison with the second threshold, it is not necessarily specified that a defect independent from the first cell 3a exists.

Figure 14:
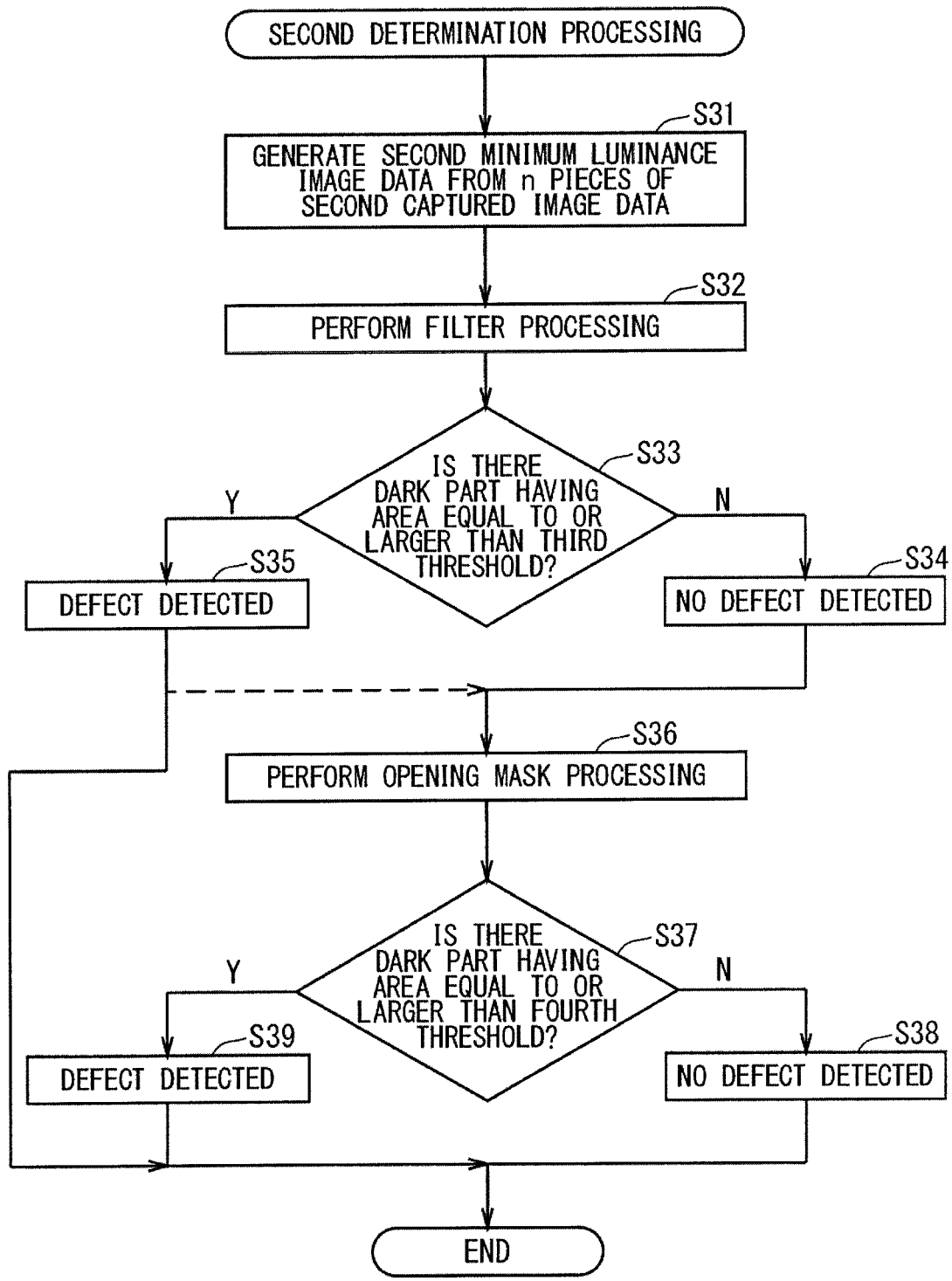
FIG. 14 is a diagram illustrating the procedure of a second determination processing.

FIG. 14 is a diagram illustrating the procedure of the second determination processing performed subsequently from the first determination processing. In the second determination processing, similarly to the first determination processing, the second minimum luminance image data is generated from the n pieces of second captured image data based on the above-described Expression (2) (step S31), the second minimum luminance image data is subjected to the filter processing at the filter processing part 232 (step S32), and the resultant second determination image data is subjected to the determination by the defect determination part 240. The specific processing content (steps S33 to S39) by the defect determination part 240 is the same as the processing content (steps S23 to S29) of the first determination processing except that a third threshold is used as the first dark part threshold in place of the first threshold, and a fourth threshold is used as the second dark part threshold in place of the second threshold. Thus, detailed description related to the second determination processing will be omitted.

The second captured image data used in the second determination processing is obtained under illumination light at a large irradiation angle as compared to the first captured image data used in the first determination processing. Thus, a shadow region attributable to the normal surface irregularity ns of the ceramic surface 6 is unlikely to occur in a captured image as compared to the first captured image data. Thus, in second minimum luminance image data generated based on Expression (2), and the second determination image data obtained by performing filter processing on the second minimum luminance image data, a dark part corresponding to the surface irregularity ns is further less likely to exist than in the first determination image data. Thus, in the second determination processing, false detection of the normal surface irregularity ns is further reduced than in the first determination processing.

By the way, a dark part for a defect such as the crack df1 having a small width and a large depth is still likely to be formed through generation of the second minimum luminance image data based on Expression (2) (refer to FIGS. 6A to 6D). However, the necessity to detect the defect already detected through the first determination processing again through the second determination processing is small, and the second determination processing is rather meaningful in detecting a defect not detected through the first determination processing. Therefore, the third threshold and the fourth threshold are set to be smaller than the first threshold and the second threshold, respectively. Thus, even if a defect such as the crack df1 having a small width and a large depth is not detected through the first determination processing, such a defect can be reliably detected by performing the second determination processing.

Results of the determination processing in the first determination processing and the second determination processing are provided from the defect determination part 240 to the integrated control part 210 as determination result data as appropriate. The integrated control part 210 controls, based on the description content of the determination result data, the display part 202 to display a defect determination result. The display can be achieved in various kinds of formats. For example, only the existence of a defect in an inspection target region may be displayed, and the position of the defect may be displayed based on labeling information. In addition, the size of the defect may be displayed based on the area (the number of pixels) of a dark part.

FIG. 15 illustrates a list of determination examples through the first determination processing and the second determination processing for the normal surface irregularity ns of the ceramic surface 6, the crack df1, and the scoop df3 (refer to FIGS. 3A to 3D, for example) based on the above description, and comprehensive determination contents based on the determination examples. Since the determination is performed for a chip in the same manner as that for a scoop, FIG. 15 representatively indicates a case of a scoop. In FIG. 15, "OK" means no detection as a defect, and "NG" means detection as a defect.

More specifically, FIG. 15 indicates, as for the first determination processing, the states of the normal surface irregularity ns, the crack df1, and the scoop df3 while any one of first illumination elements 121 (the irradiation direction D1) is turned on, the states of the normal surface irregularity ns, the crack df1, and the scoop df3 in a determination image expressed by the first determination image data generated based on the m pieces of first captured image data, and results of determination based on the states.

Similarly, FIG. 15 indicates, as for the second determination processing, the states of the normal surface irregularity ns, the crack df1, and the scoop df3 while any one of second illumination elements 131 (the irradiation direction D2) is turned on, the states of the normal surface irregularity ns, the crack df1, and the scoop df3 in a determination image expressed by the second determination image data generated based on the n pieces of second captured image data, and results of determination based on the states.

In addition, FIG. 15 indicates comprehensive (definitive) determination results based on the results of the first determination processing and the second determination processing.

First, as for the normal surface irregularity ns, even when a shadow region A' is formed in a first determination image by synthesizing shadow parts A generated when the individual first illumination elements 121 are sequentially turned on, the shadow region A' is normally smaller than a threshold region THa corresponding to the second threshold (naturally smaller than a region corresponding to the first threshold), and thus is not detected as a defect.

Since the angle $\theta 2$ of the irradiation direction D2 of the second illumination element 131 relative to the horizontal plane is larger than the angle $\theta 1$ of the irradiation direction D1 of the first illumination element 121 relative to the horizontal plane, no shadow region is normally formed at the surface irregularity ns in a second determination image. If formed, a shadow region is smaller than a threshold region THb corresponding to the fourth threshold (naturally smaller than a region corresponding to the third threshold).

Thus, a normal surface irregularity is not falsely detected as a defect through any of the first determination processing and the second determination processing.

Meanwhile, as for the crack df1, a shadow region B' is formed in the first determination image by synthesizing shadow parts B generated when the individual first illumination elements 121 are sequentially turned on, and there may be a case that the shadow region B' is smaller than the threshold region THa when the size of the shadow region B' is relatively small. In this case, the crack df1 is not detected as a defect through the first determination processing.

However, in a case of the crack df1, shadow parts D are generated when the individual second illumination elements 131 are sequentially turned on, and thus a shadow region D' is formed in the second determination image. Thus, If the threshold region THb is determined so that the shadow region D' is detected as a defect, the shadow region D' is detected as a defect through the second determination processing even when not detected as a defect through the first determination processing.

That is, the crack is detected as a defect at least through the second determination processing, even if it is not detected as a defect through the first determination processing. Needless to say, in the case that the shadow region B' of the crack is larger than the threshold region THa in the first determination processing, the crack is detected as a defect through the preceding first determination processing.

Additionally, as for the scoop df3, a shadow region C' is formed in the first determination image by synthesizing shadow parts C generated when the individual first illumination elements 121 are sequentially turned on. When the threshold region THa is determined so that the shadow region C' is detected as a defect, the scoop df3 is detected as a defect through the first determination processing.

Since the scoop df3 has a relatively large width, a shadow region is unlikely to be formed in the second determination image. Thus, though the scoop df3 is unlikely to be detected as a defect through the second determination processing, it is detected as a defect through the first determination processing, and thus is finally detected as a defect with no problem. This is the same for a chip.

Thus, according to the present configuration aspect, a scoop and a chip can be detected through the first determination processing, and a crack can be detected through the second determination processing even when not detected through the first determination processing. Moreover, a normal surface irregularity is not falsely detected as a defect. In other words, according to the present configuration aspect, highly accurate defect detection is achieved.

[Exemplary Image and Effect of Use of Minimum Luminance Image Data]

Figure 16:
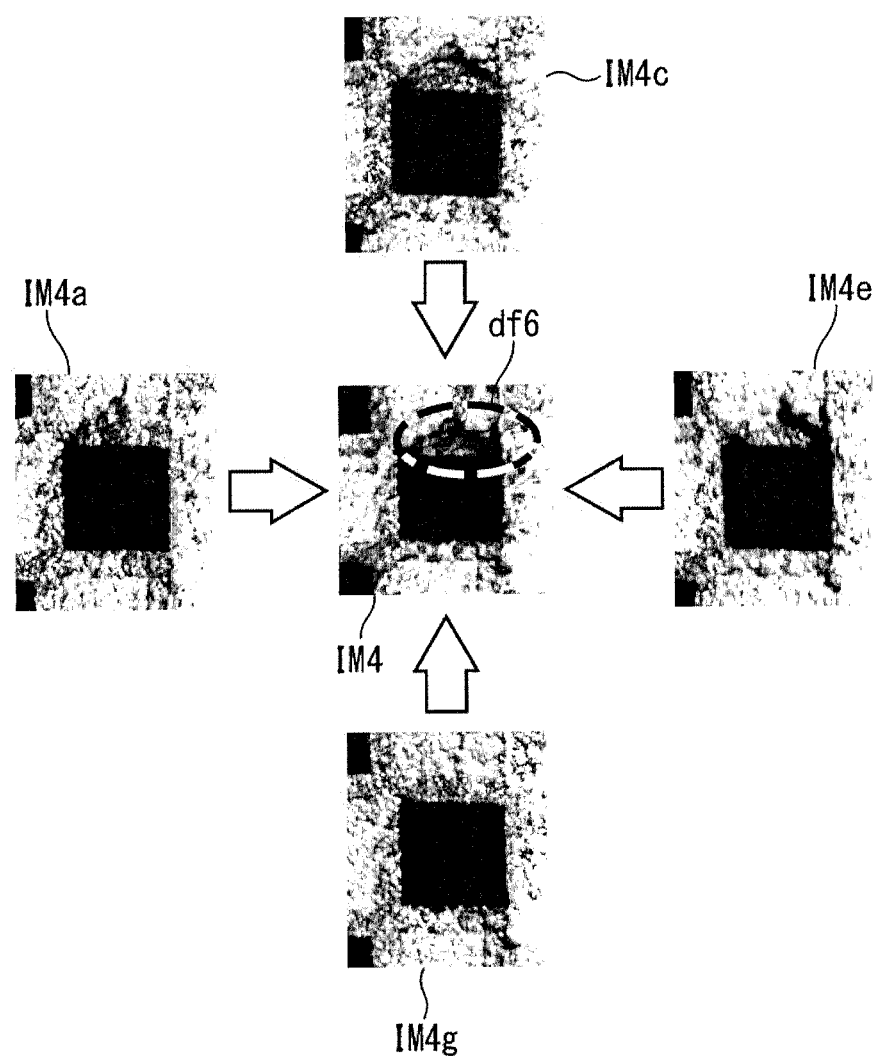
FIG. 16 is a diagram exemplarily illustrating various kinds of images generated through the process of defect inspection on the end face 1a of the honeycomb structural body 1.
Figure 17:
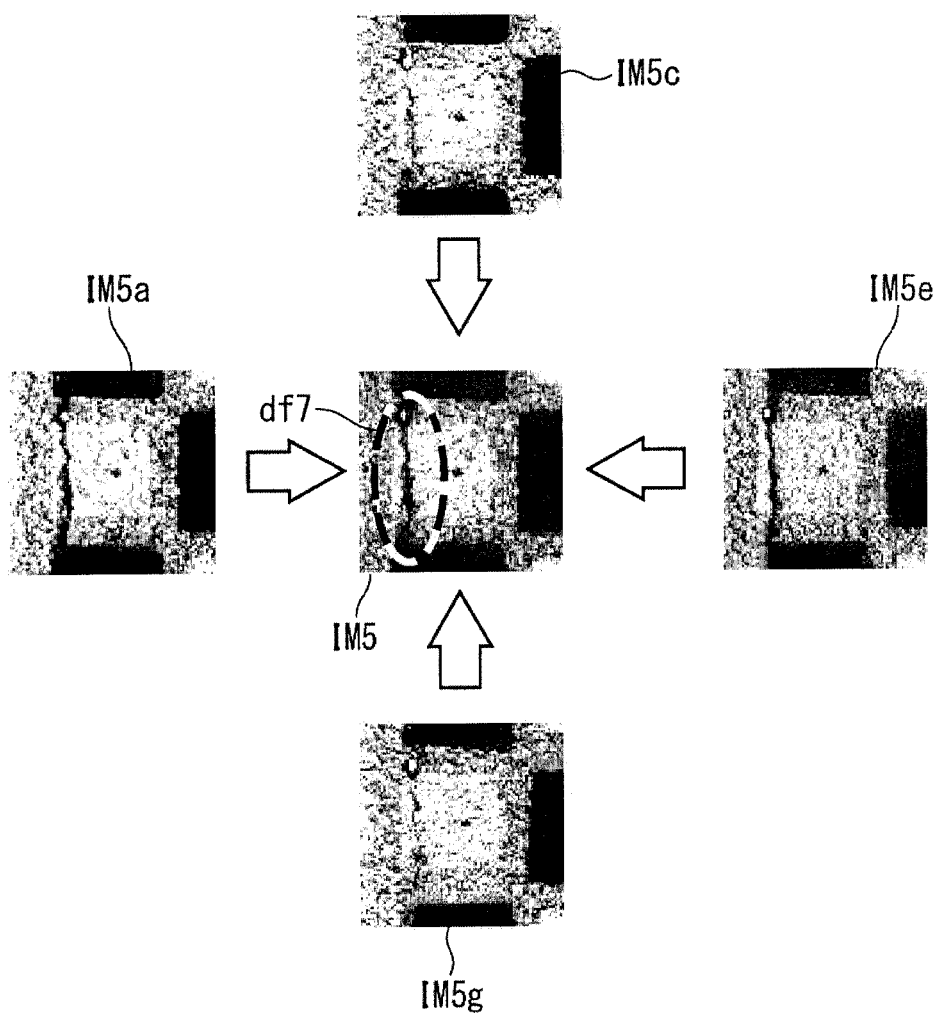
FIG. 17 is a diagram exemplarily illustrating various kinds of images generated through the process of defect inspection on the end face 1a of the honeycomb structural body 1.
Figure 18:
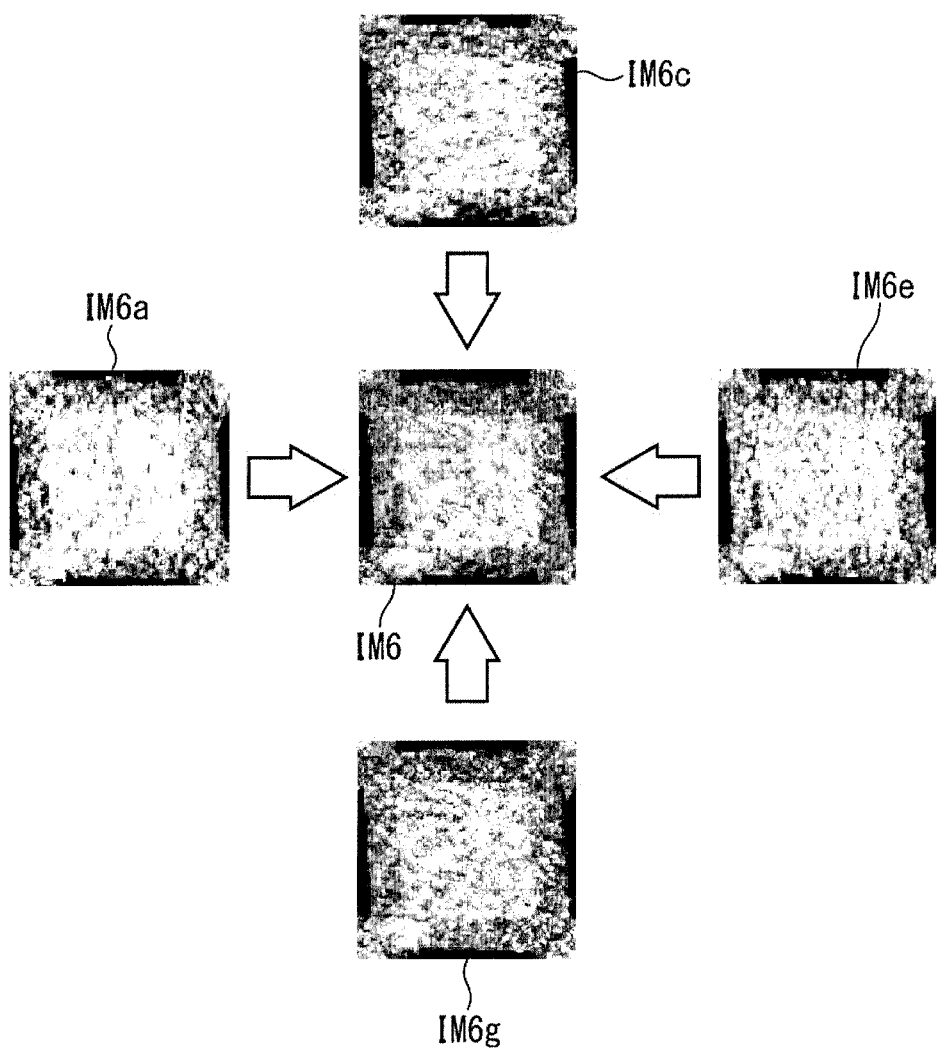
FIG. 18 is a diagram exemplarily illustrating various kinds of images generated through the process of defect inspection on the end face 1a of the honeycomb structural body 1.

FIGS. 16 to 18 are diagrams exemplarily illustrating various kinds of images generated through the process of defect inspection performed on the end face 1a of the honeycomb structural body 1 as an inspection target by using the defect inspecting apparatus 1000 including eight first illumination elements 121 and eight second illumination elements as illustrated in FIG. 8. All captured images included in FIGS. 16 to 18 are captured under irradiation with the first illumination elements 121 at the irradiation angle θ1 of 45°.

First, images IM4a, IM4c, IM4e, and IM4g illustrated in FIG. 16 are captured images of first captured image data obtained while the first illumination elements 121a, 121c, 121e, and 121g, respectively, are turned on near one first cell 3a. A minimum luminance image IM4 is expressed by first minimum luminance image data generated based on the four pieces of first captured image data and four pieces of first captured image data (not illustrated in FIG. 16) obtained while the remaining first illumination elements 121b, 121d, 121f, and 121h, respectively, are turned on.

Images IM5a, IM5c, IM5e, and IM5g illustrated in FIG. 17 are captured images of first captured image data obtained for part of the ceramic surface 6 of the end face 1a in the same manners as those of the four captured images illustrated in FIG. 16. A minimum luminance image IM5 is expressed by first minimum luminance image data generated based on the four pieces of first captured image data and four pieces of first captured image data (not illustrated in FIG. 17) obtained while the remaining first illumination elements 121b, 121d, 121f, and 121h, respectively, are turned on.

In addition, images IM6a, IM6c, IM6e, and IM6g illustrated in FIG. 18 are captured images of first captured image data obtained for the ceramic surface 6 having no defect but having only normal surface irregularities in the same manners as those of the four captured images illustrated in FIG. 16. A minimum luminance image IM6 is expressed by first minimum luminance image data generated based on the four pieces of second captured image data and four pieces of first captured image data (not illustrated in FIG. 18) obtained while the remaining first illumination elements 121b, 121d, 121f, and 121h, respectively, are turned on.

A dark part corresponding to a defect (scoop) df6 continuous with the first cell 3a is observed in the minimum luminance image IM4 illustrated in FIG. 16. The dark part corresponding to the defect df6 is not observed in IM4g but is observed in the image IM4c at the same position as that in the minimum luminance image IM4, and partially observed in the images IM4a and IM4e. However, the area of the dark part is larger in the minimum luminance image IM4 than in the image IM4c.

In the minimum luminance image IM5 illustrated in FIG. 17, a dark part corresponding to a defect (crack) df7 extending from one first cell 3a to another first cell 3a is observed. The dark part corresponding to the defect df7 is observed in the images IM5a and IM5e but unclear in the images IM5c and IM5g.

However, in the minimum luminance image IM6 illustrated in FIG. 18, no significant dark part is formed except for dark parts corresponding to the first cells 3a existing at four edges of the image.

Comparison of the minimum luminance images IM4 and IM5 illustrated in FIGS. 16 and 17 with the minimum luminance image IM6 illustrated in FIG. 18 indicates that, when a defect exists at the end face 1a, a dark part corresponding to the defect is clearly formed in the minimum luminance image, but no significant difference occurs in the minimum luminance image of the ceramic surface 6 on which no defect exists and only the normal surface irregularity ns is formed.

However, for example, the images IM5c and IM5g in FIG. 16 are captured images of a region in which the defect df7 exists, but have no significant difference from the minimum luminance image IM6 in FIG. 18.

These indicate that, in the case that existence of a defect is determined by using captured image data obtained under irradiation with illumination light in one irradiation direction, a defect potentially cannot be detected depending on the irradiation direction of the illumination light, but in the case that existence of a defect is determined by using minimum luminance image data generated from a plurality of pieces of captured image data obtained under irradiation with illumination light in mutually different irradiation directions, a defect can be reliably detected.

As described above, according to the present configuration aspect, a defect needed to be detected can be reliably detected without falsely detecting any irregularity on a normal ceramic surface as a defect, by using minimum luminance image data generated from a plurality of pieces of captured image data obtained with illumination light in irradiation directions different from each other, in determining existence of a defect.

(Second Configuration Aspect)

Figure 19:
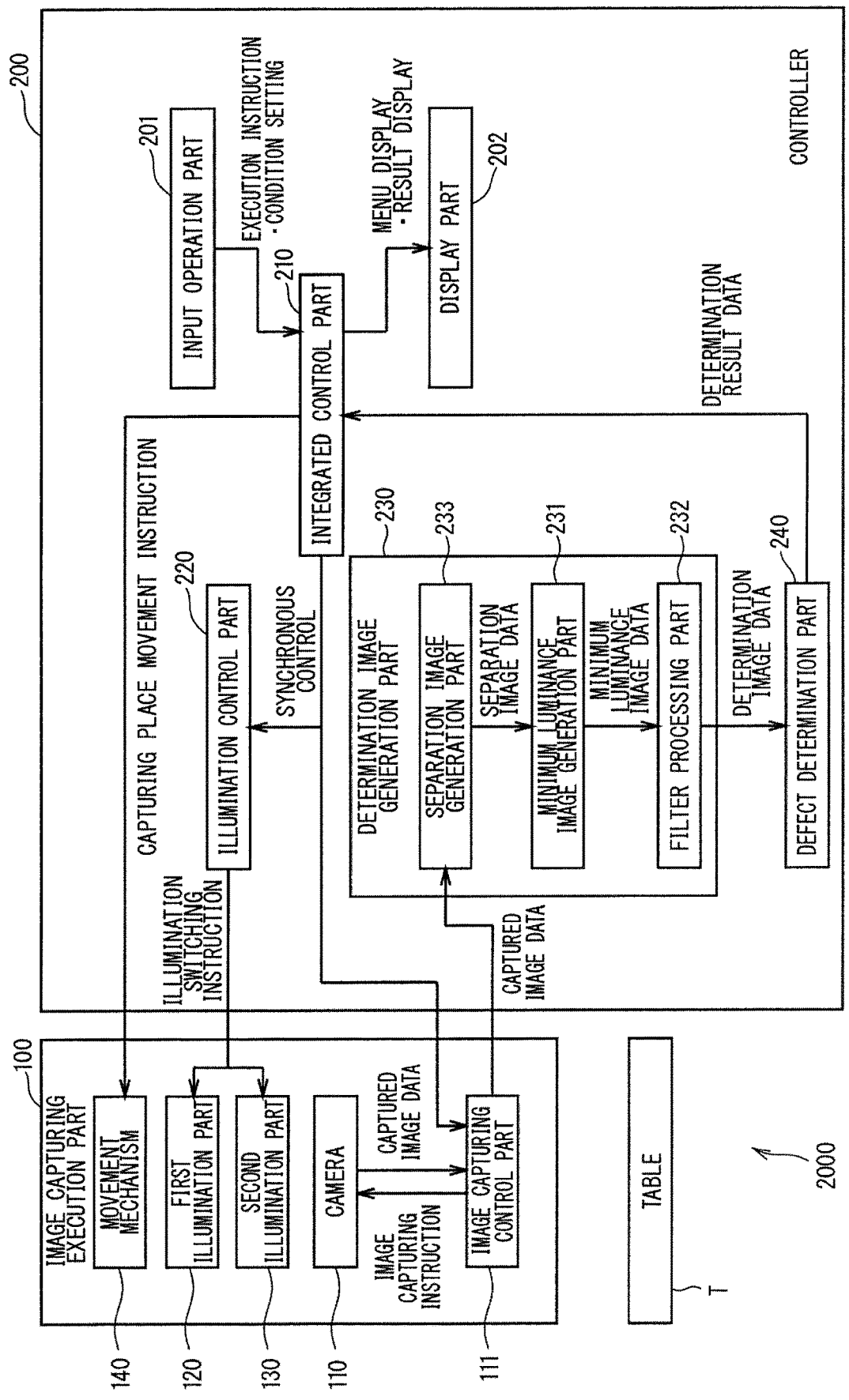
FIG. 19 is a block diagram illustrating the configuration of a defect inspecting apparatus 2000 according to a second configuration aspect.

FIG. 19 is a block diagram illustrating the configuration of a defect inspecting apparatus 2000 according to a second configuration aspect of the present embodiment. Components of the defect inspecting apparatus 2000 are mostly the same as the components of the defect inspecting apparatus 1000 according to the first configuration aspect, and thus any common part is denoted by the same reference sign and detailed description thereof is omitted, and any difference from the defect inspecting apparatus 1000 will be mainly described below.

Similarly to the defect inspecting apparatus 1000, the defect inspecting apparatus 2000 mainly includes: the table T on which the honeycomb structural body 1 is to be placed in a posture in which the end face 1a as an inspection target surface is horizontal; the image capturing execution part 100 configured to perform image capturing of the end face 1a of the honeycomb structural body 1 placed on the table T while irradiating the end face 1a with illumination light; and the controller 200 configured to perform control of the image capturing execution part 100 and defect determination based on a captured image obtained by the image capturing execution part 100.

The configuration and arrangement of the camera 110 and the configurations and arrangement of the first illumination part 120 and the second illumination part 130 included in the image capturing execution part 100 are substantially the same as configurations and arrangement in the first configuration aspect exemplarily illustrated in FIGS. 8 and 9 for a case of m=8 and n=8. That is, in order to have a capturing target in the vertically downward direction, the camera 110 is provided in a posture in which the lens thereof points vertically downward and the optical axis CX thereof is aligned with the vertical direction. The plurality of first illumination elements 121 and the plurality of second illumination elements are equiangularly spaced from each other around the camera 110 in a horizontal plane at the irradiation angles θ1 and θ2, respectively.

However, in the defect inspecting apparatus 2000, n=m, and the irradiation direction D2 of one second illumination element 131 is inevitably included in a vertical plane including the irradiation direction D1 of one first illumination element 121.

A wavelength band (first wavelength band) to which the wavelength of illumination light emitted from the first illumination elements 121 belongs and a wavelength band (second wavelength band) to which the wavelength of illumination light emitted from the second illumination elements 131 belongs are set to be different from each other. This is achieved by using, for example, the first illumination elements 121 configured to emit red light and the second illumination elements 131 configured to emit blue light or by using the opposite configuration. In this case, it is defined that the red light belongs to the wavelength band of emission wavelength of 600 nm to 800 nm, and the blue light belongs to the wavelength band of emission wavelength of 400 nm to 500 nm. Alternatively, this is also achieved by using, for example, the first illumination elements 121 configured to emit white light and the second illumination elements 131 configured to emit ultraviolet light or by using the opposite configuration. In this case, it is defined that the white light belongs to the wavelength band of emission wavelength of 300 nm to 800 nm, and the ultraviolet light belongs to the wavelength band of emission wavelength of 100 nm to 400 nm.

Accordingly, the camera 110 having excellent sensitivity to the first wavelength band to which the wavelength of illumination light emitted from the first illumination elements 121 belongs and the second wavelength band to which the wavelength of illumination light emitted from the second illumination elements 131 belongs is used.

In the defect inspecting apparatus 2000 according to the present configuration aspect, a pair of each first illumination element 121 and the corresponding second illumination element 131, the irradiation directions D1 and D2 thereof are included in an identical vertical plane simultaneously emits illumination light in an identical direction at the different irradiation angles θ1 and θ2 around the intersection point P between the optical axis CX of the camera 110 and the end face 1*a* (refer to FIG. 9). This means that, in the defect inspecting apparatus 2000 according to the present configuration aspect, illumination beams having wavelengths belonging to wavelength bands different from each other are emitted in a superimposing manner in an identical direction. In other words, the defect inspecting apparatus 2000 according to the present configuration aspect includes the m (for example, eight) pairs of first illumination elements 121 and second illumination elements 131. Accordingly, the camera 110 performs image capturing in a state in which such two illumination light beams are emitted in a superimposing manner.

The controller 200 differs from the controller 200 of the defect inspecting apparatus 1000 in that a separation image generation part 233 is additionally provided to the determination image generation part 230.

The separation image generation part 233 acquires captured image data generated by image capturing through the camera 110 and performs image separation processing of generating, from the captured image data, first separation image data mainly including a color component belonging to the first wavelength band, and second separation image data mainly including a color component belonging to the second wavelength band.

The first separation image data is intended to be generated as image data of an image formed by illumination light mainly emitted from the first illumination elements 121, and the second separation image data is intended to be generated as image data of an image formed by illumination light mainly emitted from the second illumination elements 131. In other words, the first separation image data is data intended to be generated as data corresponding to the first captured image data in the first configuration aspect, and the second separation image data is data intended to be generated as data corresponding to the second captured image data.

For example, in the case that illumination configured to emit red light is used as the first illumination elements 121 and illumination configured to emit blue light is used as the second illumination elements 131, the first separation image data is generated as data mainly including the R component, and the second separation image data is generated as data mainly including the B component. In such a case, the camera 110 preferably generates captured image data in the RGB format.

However, a component due to another type of light such as external light may be included in each separation image data unless the defect existence determination by the defect determination part 240 is affected.

Figure 20:
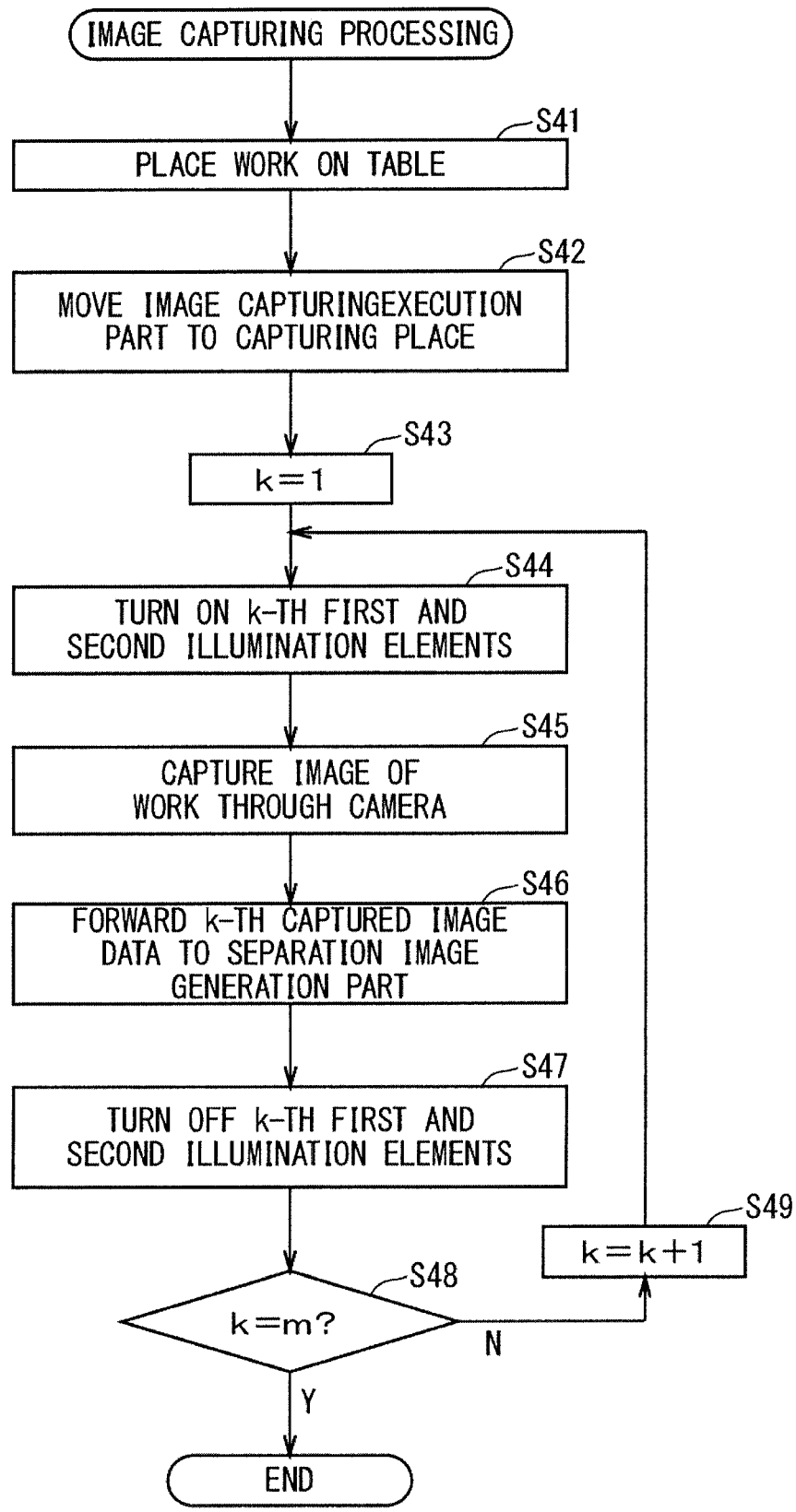
FIG. 20 is a diagram illustrating the procedure of image capturing processing performed by the defect inspecting apparatus 2000 for defect inspection.

FIG. 20 is a diagram illustrating the procedure of image capturing processing performed for defect inspection in the defect inspecting apparatus 2000 according to the present configuration aspect. In FIG. 20 and description related to the figure, similarly to the above description related to FIG. 10, the honeycomb structural body 1 as a defect inspection target is also referred to as a "work", and the end face 1*a* as an inspection target surface of the honeycomb structural body 1 is also referred to as a "work end face".

First, the work is placed on the table T (step S41), and subsequently, the image capturing execution part 100 is moved to a capturing place (step S42), which are the same as in the procedure of the defect inspecting apparatus 1000, and thus details thereof are omitted.

After the image capturing execution part 100 is disposed at the capturing place, the initial value of k=1 is set (step S43), the k-th first illumination element 121 belonging to the first illumination part 120 and the k-th second illumination element 131 belonging to the second illumination part 130 are simultaneously turned on (step S44). However, the irradiation directions of the first illumination element 121 and the second illumination element 131 being simultaneously turned on belong to an identical vertical plane. Then, the camera 110 captures an image of the work in such a turn-on state (step S45). Accordingly, captured image data as one piece of image data expressed in, for example, the RGB format is generated.

The k-th captured image data obtained through the image capturing is forwarded from the image capturing control part 111 to the separation image generation part 233 (step S46). Upon completion of the image capturing and the forwarding, the k-th first illumination element 121 and the second illumination elements 131 being turned on are turned off (step S47). Alternatively, the k-th first illumination element 121 and second illumination element 131 may be turned off immediately after the completion of the image capturing. Alternatively, all pieces of captured image data may be forwarded to the separation image generation part 233 upon completion of image capturing performed while the m-th first illumination element 121 and second illumination element 131 are turned on.

When k=m does not hold (NO at step S48), in other words, when there are any first illumination element 121 and any second illumination element 131 yet to be turned on, k=k+1 is set (step S49), and step S44 and the following processing are repeated.

When k=m holds (YES at step S48), in other words, when all of the m first illumination elements 121 and second illumination elements 131 are sequentially turned on and image capturing through the camera 110 is subsequently performed in each turn-on state, the image capturing processing ends.

As a result, image capturing through the camera 110 is subsequently performed when each pair of the first illumination element 121 and the second illumination element 131 is sequentially turned on, and m pieces of captured image data are obtained.

Figure 21:
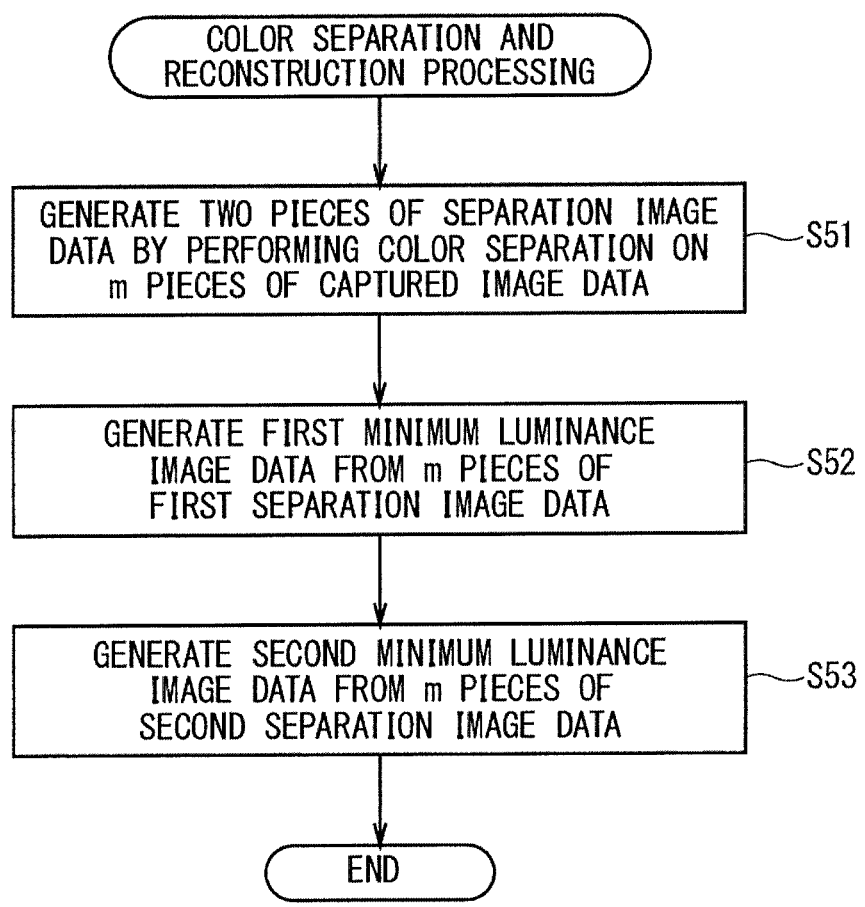
FIG. 21 is a diagram illustrating the procedure of color separation and reconstruction processing.

FIG. 21 is a diagram illustrating the procedure of color separation and reconstruction processing performed at the defect inspecting apparatus 2000 according to the present configuration aspect, before the defect determination processing.

In the present configuration aspect, each of the m pieces of captured image data is obtained in a state that two illumination light beams having mutually different wavelengths and irradiation angles are emitted in a superimposing manner, as described above. The color separation and reconstruction processing is processing of generating, based on the m pieces of captured image data, the first minimum luminance image data and the second minimum luminance image data, similarly to those in the first configuration aspect.

First, the separation image generation part 233 performs color separation to generate two pieces of separation image data, sequentially on the m pieces of captured image data forwarded from the image capturing control part 111 (step S51).

For example, in the case that the first illumination elements 121 emit red light, the second illumination elements 131 emit blue light, and the captured image data is obtained in the RGB format, it is a preferable that the first separation image data is generated by extracting only the R component from the captured image data to generate image data (R image data) and converting the R image data into luminance data, and the second separation image data is generated by extracting only the B component from the captured image data to generate image data (B image data) and converting the B image data into luminance data.

However, the image data used to generate the first separation image data may include a color component other than the R component and the image data used to generate the second separation image data may include a color component other than the B component unless the determination by the defect determination part 240 is not affected, for example, when the pixel value is equal to or smaller than a predetermined threshold. In addition, a component attributable to external light may be superimposed.

The first separation image data and the second separation image data generated at the separation image generation part 233 practically correspond to first captured image data obtained by performing image capturing through the camera 110 while only one first illumination element 121 is turned on, and second captured image data obtained by performing image capturing through the camera 110 while only one second illumination element 131 is turned on, respectively.

When m pieces of the first separation image data and m pieces of the second separation image data are generated as a result of the color separation by the separation image generation part 233, the minimum luminance image generation part 231 generates first minimum luminance image data from the former based on Expression (1) (step S52), and generates second minimum luminance image data from the latter based on Expression (2) (step S53).

Processing performed after the first minimum luminance image data and the second minimum luminance image data are obtained, specifically, the filter processing and the defect determination processing are performed in the same manner as in the first configuration aspect.

Thus, in the present configuration aspect, similarly to the first configuration aspect, a defect needed to be detected can be reliably detected without falsely detecting any irregularity of a normal ceramic surface as a defect, by using the minimum luminance image data generated from a plurality of pieces of captured image data obtained with different irradiation directions of illumination light, in determining existence of a defect.

Moreover, in the present configuration aspect, since illumination light from the first illumination element and illumination light from the second illumination element, which are separately emitted in the first configuration aspect, are simultaneously emitted, a time taken for image capturing is reduced as compared to the first configuration aspect.

Modification of First Embodiment

Figure 23:
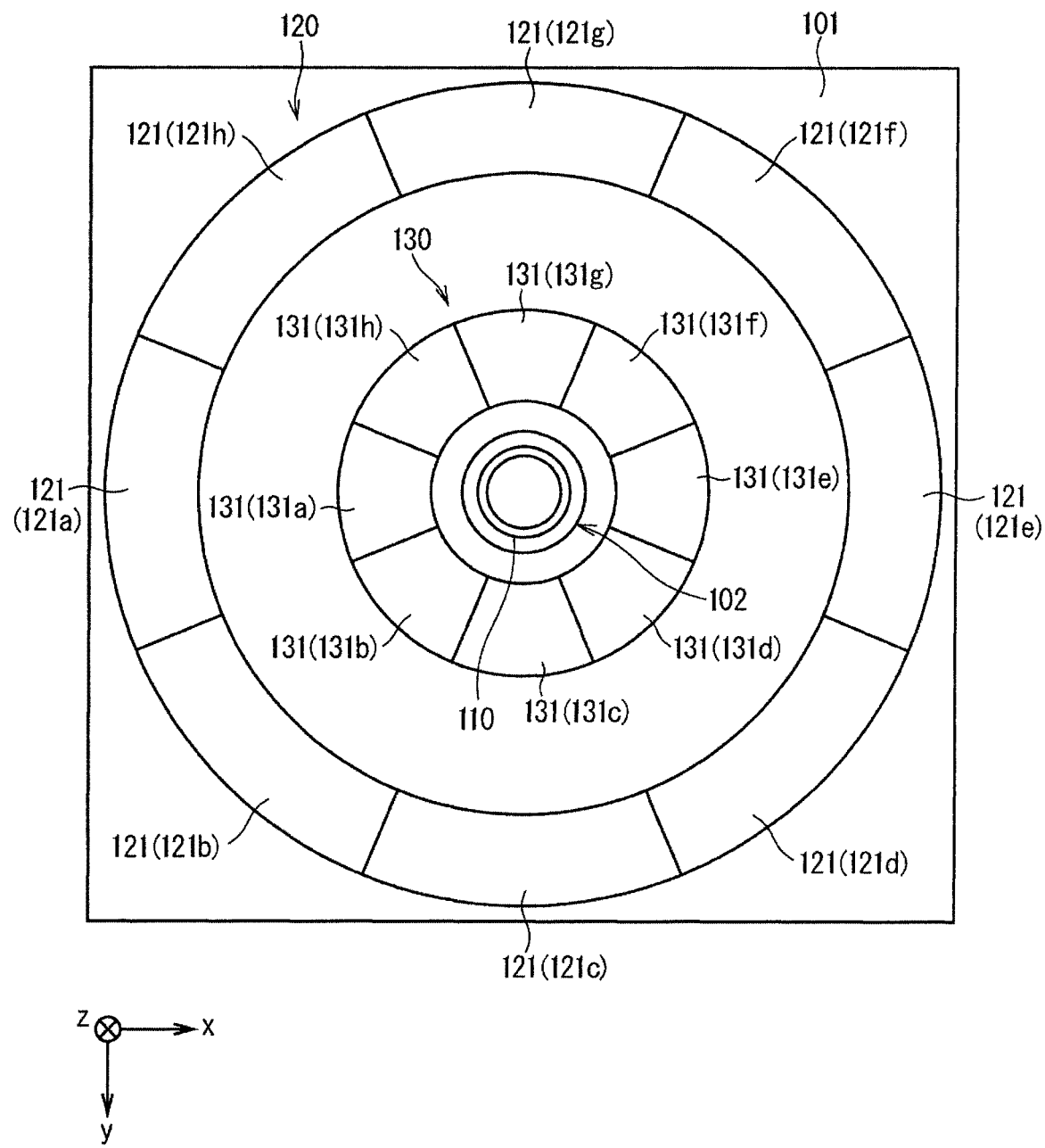
FIG. 23 is a diagram illustrating a modification of the arrangement and configurations of the first illumination part 120 and the second illumination part 130.

FIGS. 22 and 23 are each a diagram illustrating a modification of the arrangement and configurations of the first illumination part 120 and the second illumination part 130. In FIG. 8, m=n=8, and the A1-A1' section is a symmetric plane of the first illumination elements 121a, the first illumination elements 121e, the second illumination element 131a, and the second illumination element 131e, but this is not essential in a case of the defect inspecting apparatus 1000 according to the first configuration aspect. For example, as illustrated in FIG. 22, the arrangement of the first illumination elements 121 in the first illumination part 120 and the arrangement of the second illumination elements 131 in the second illumination part 130 may be set so that the A2-A2' section as a symmetric plane of the first illumination element 121a and the first illumination element 121e and the A3-A3' section as a symmetric plane of the second illumination element 131a and the second illumination element 131e have a predetermined angle therebetween.

In FIG. 8, the first illumination elements 121 and the second illumination elements 131 are discretely arranged in the first illumination part 120 and the second illumination part 130, respectively, but this is not essential. For example, as illustrated in FIG. 23, the first illumination part 120 and the second illumination part 130 may be each arranged in a ring shape around the camera 110, and m equally spaced regions and n equally spaced regions (in FIG. 23, m=n=8) thereof may be used as the first illumination elements 121 and the second illumination elements 131.

Alternatively, the first illumination elements 121 or the second illumination elements 131 may be discretely arranged as exemplarily illustrated in FIG. 8 in one of the first illumination part 120 and the second illumination part 130, and may be arranged in a ring shape as exemplarily illustrated in FIG. 23 in the other illumination part.

In the configuration exemplarily illustrated in FIG. 8, the first illumination elements 121 and the second illumination elements 131 are each arranged in one plane, but do not need to be in an identical plane as long as the irradiation directions are equiangularly spaced and the illuminance of illumination light from the individual first illumination elements 121 and second illumination elements 131 at an irradiation angle and a capturing place is the same.

In the first configuration aspect, image capturing performed while the second illumination elements 131 are turned on is performed after image capturing performed while the first illumination elements 121 are turned on, but this order may be opposite. In this case, the second determination processing may be performed earlier than the first determination processing.

There may exist a part in a lattice pattern referred to as a joining part at the end face 1a depending on the structure of the honeycomb structural body 1, and in some cases, a bright part (part visually recognized as white in an image) corresponding to the joining part may exist in a determination image depending on the material of the honeycomb structural body 1 (for example, when the material is SiC). When the honeycomb structural body 1 is made of a plurality of parts (unit bodies) referred to as honeycomb segments, the joining part is a site at which the honeycomb segments are joined with each other.

In the above-described embodiment, a rectangular dark part existing corresponding to the first cell 3a in the determination image is excluded from targets of the determination processing through the opening mask processing, but when the bright part exists in the determination image, the bright part may be excluded from targets of the determination processing through the same mask processing in addition to the dark part exclusion through the opening mask processing. Namely, the arrangement position and size of the joining part existing at the end face 1a are known, and thus, similarly to the opening mask processing, the filter processing part 232 can exclude the bright part corresponding to the joining part from the determination image by performing, based on this information input in advance, for example, pattern matching, cell region expansion-contraction processing, and binarization processing using a maximum luminance value image.

In the above-described embodiment, the detection target is a defect existing as a concave portion at the end face 1a of the honeycomb structural body 1, but the defect inspection method in the above-described embodiment is applicable to a case in which the detection target is a defect (for example, a protrusion) existing as a convex portion at the end face 1a of the honeycomb structural body 1.

Specifically, in the above-described embodiment, the determination image generation part 230 generates first (second) minimum luminance image data in which a minimum value among luminance values of a plurality of pieces of first (second) captured image data or a plurality of pieces of first (second) separation image data at an identical pixel position is set as a luminance value at the pixel position, and generates first (second) determination image data based on the first (second) minimum luminance image data, but instead, generates first (second) maximum luminance image data in which a maximum value among luminance values of a plurality of pieces of first (second) captured image data or a plurality of pieces of first (second) separation image data at an identical pixel position is set as a luminance value at the pixel position, and generates first (second) determination image data based on the first (second) maximum luminance image data. In this case, the first (second) maximum luminance image data is an image obtained by virtually superimposing regions in which the luminance value is high in the pieces of first (second) captured image data. Accordingly, the first (second) maximum luminance image data is data in which a region having a high luminance value attributable to a convex defect is enhanced.

Then, when a bright pixel region exists in an area equal to or larger than a predetermined bright part threshold in the determination image expressed by each of the first determination image data and the second determination image data, the defect determination part 240 determines that a convex defect exists at the existence position of the bright pixel region. Accordingly, a convex defect existing on the outer surface of a ceramic body and needed to be detected can be reliably detected without falsely detecting an irregularity of a normal ceramic surface as a defect.

In the defect detection method in the above-described embodiment, a plurality of pieces of captured image data between which a shadow region is formed differently are acquired by performing image capturing when each of a plurality of illumination elements configured to emit illumination light in irradiation directions different from each other is turned on, and minimum luminance image data is generated based on the plurality of pieces of captured image data. Thus, a plurality of times of image capturing are essential to obtain one piece of minimum luminance image data, but image capturing for obtaining one piece of minimum luminance image data can be performed only once depending on the configurations of the first illumination part 120 and the second illumination part 130.

For example, the wavelength bands of illumination light emitted from the m first illumination elements 121 are set to be different from each other, the wavelength bands of illumination light emitted from the n second illumination elements 131 are set to be different from each other, first image capturing is performed while the m first illumination elements 121 are simultaneously turned on, and subsequently, second image capturing is performed while the n second illumination elements 131 are simultaneously turned on. Although each image capturing is performed while a plurality of illumination light beams are emitted in a superimposing manner, the wavelength band and the irradiation direction are different between the illumination light beams. Thus, a plurality of pieces of separation image data generated through color separation of the above-obtained two pieces of captured image data into (m or n) pieces for each wavelength band of illumination light practically correspond to a plurality of pieces of captured image data in the first configuration aspect or a plurality of pieces of separation image data in the second configuration aspect. In other words, the generated plurality of pieces of separation image data can be subjected to the same filter processing and the same defect determination processing as those in the above-described first configuration aspect. In such a case, existence of a defect can be determined only through two times of image capturing.

In addition, in the case that n=m is set as in the second configuration aspect and the wavelength bands of illumination light emitted from the m first illumination elements 121 and the m second illumination elements 131 are set to be different from each other, only one image capturing can be performed while all the first illumination elements 121 and all the second illumination elements 131 are simultaneously turned on, and captured image data obtained through the image capturing can be subjected to color separation for each wavelength band of illumination light, in other words, into 2 m pieces of separation image data, thereby determining existence of a defect.

Second Embodiment

<Measures for Enlargement of Inspection Target Region>

The method of defect inspection using the defect inspecting apparatus 1000 or 2000 described in the first embodiment has no limitation on the size of the honeycomb structural body 1 as an inspection target in principle. Namely, defect inspection can be performed on the honeycomb structural body 1 in any size by the method according to the first embodiment as long as the image capturing execution part 100 (in particular, the first illumination part 120 and the second illumination part 130) of the defect inspecting apparatus 1000 or 2000 is configured to be suitable for the size of the honeycomb structural body 1. Alternatively, even if the inspection target region is small as compared to the size of the end face 1a of the honeycomb structural body 1, defect inspection can be performed on the entire end face 1a by repeating defect inspection a plurality of times while moving the inspection target region.

In such a case, the number of repetitions of inspection on the one honeycomb structural body 1 is smaller and the inspection time is decreased as the inspection target region is larger, specifically, as the view angle (capturing range) of the camera 110 is increased. However, in reality, when defect inspection is performed by the method according to the first embodiment with the enlarged inspection target region, problems as described below become significant.

[Problem Attributable to Distance Between Illumination Element and Irradiated Position]

Figure 24:
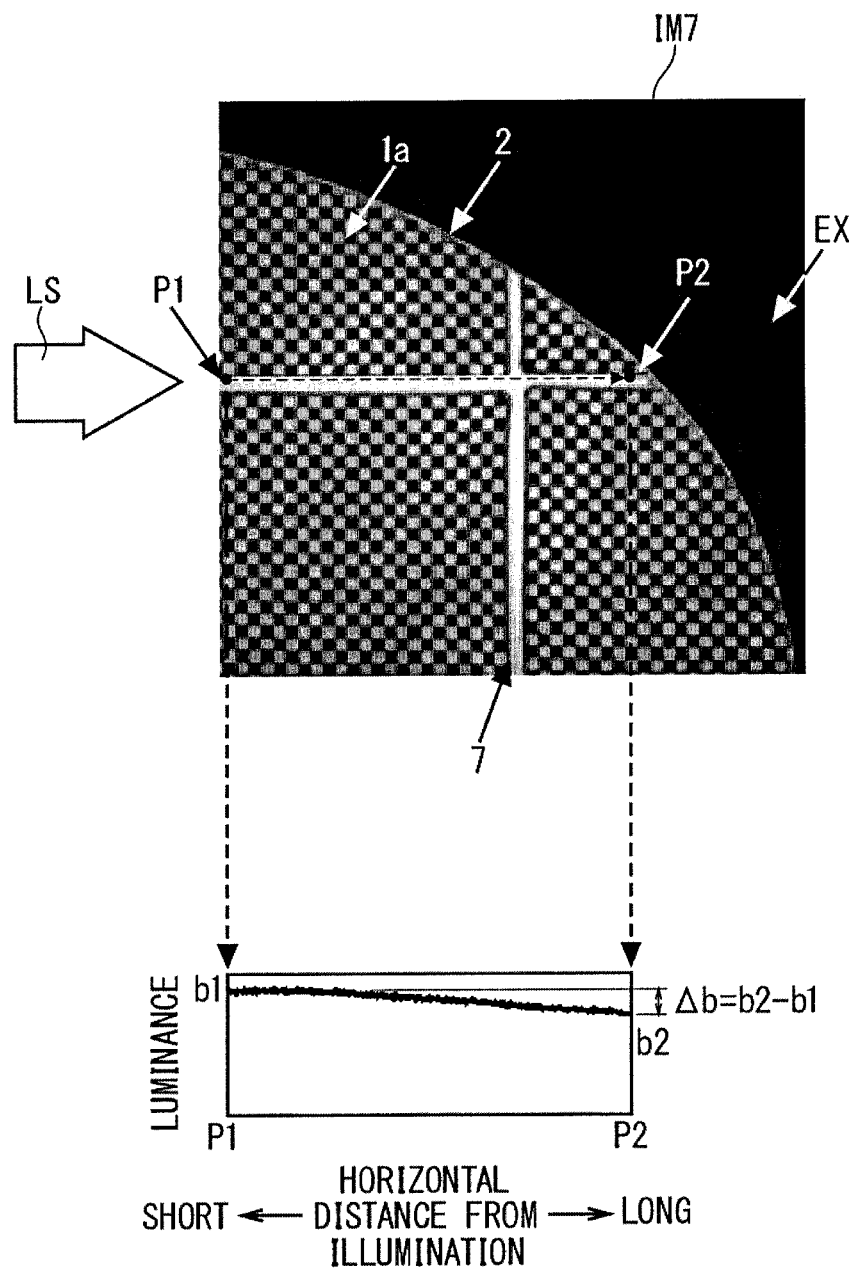
FIG. 24 is a diagram illustrating a captured image IM7 near an outer wall 2 of the honeycomb structural body 1 when the end face 1a of the honeycomb structural body 1 is irradiated with illumination light Ls in an oblique direction at a predetermined angle.

FIG. 24 is a diagram illustrating a captured image IM7 near the outer wall 2 of the honeycomb structural body 1 when the end face 1a of the honeycomb structural body 1 is irradiated with illumination light Ls at a predetermined angle in an oblique direction (from the left side in the figure). The honeycomb structural body 1 includes a joining part 7 forming a lattice pattern at the end face 1a. Then, in the case illustrated in FIG. 24, a component (horizontal component) parallel to the end face 1a among the incident directions (optical axis directions) of the illumination light Ls matches with the extension direction of one joining part 7 on the end face 1a.

In the captured image IM7, a position closer to the illumination light source is captured further on the left side, and a position further away from the illumination light source is captured further on the right side. The illuminance of illumination light is inversely proportional to the square of the distance from a light source, and thus, difference in luminance occurs between two places to which the distance from illumination light in the captured image IM7 is different, even when no difference is present in the surface state between both places.

For example, both of two points P1 and P2 separated from each other along the horizontal component of the illumination light Ls as illustrated in FIG. 24 are points on the joining part 7, and thus the luminance is expected to be constant between both points, but in reality, a luminance difference $\Delta b = b2 - b1$ occurs between the former luminance b1 and the latter luminance b2.

If the inspection target region (capturing range) is enlarged to reduce the number of repetitions of inspection and the inspection time, the influence of the luminance difference on defect inspection processing cannot be ignored. Thus, when the inspection target region is enlarged, measures against this point are needed.

When the intersection point between the optical axis L1 of each illumination element and the end face 1a coincides with the intersection point P between the optical axis CX of the camera 110 and the end face 1a as in the defect inspecting apparatus 1000 or 2000 used in the first embodiment (refer to FIG. 9), it can be regarded, as for the vicinity of the intersection point P, that the distance to each illumination element is practically identical. In other words, it is regarded that the illuminance of each illumination element is identical at the vicinity. Thus, in the case that the size of the honeycomb structural body 1 is not much large and the end face 1a is disposed within the vicinity, luminance difference between captured images attributable to difference in the distance to each illumination element can be practically ignored.

However, when the view angle (the capturing range) of the camera 110 is enlarged (specifically, when a wider-angle lens is employed in the camera 110) to enlarge the inspection target region, influence of difference in the distance from each illumination element to an irradiated position on the luminance at the irradiated position becomes significant in the vicinity of an end part of the view angle of the camera 110 in a captured image by the camera 110.

FIGS. 25A to 25C are diagrams for description of the influence of difference in the distance from the illumination element to the irradiated position.

FIG. 25A illustrates a situation in which the end face 1a of the honeycomb structural body 1 is obliquely irradiated with two of illumination light Ln and illumination light Lf in directions symmetric to each other with respect to the normal direction (direction into the figure) of the end face 1a. The illumination light Ln is emitted from an illumination element close to a certain part in the vicinity of an arbitrary end (hereinafter simply referred to as an end part) fv1 in the view angle (capturing range) of the camera 110, and the illumination light Lf is emitted from an illumination element far from the end part fv1. Although FIG. 25A illustrates the two illumination light beams together for description, but the illumination light beams are not simultaneously emitted in reality.

FIGS. 25B and 25C are cross-sectional views schematically illustrating situations when the vicinity of a defect (scoop) df8 included in the end part fv1 is irradiated with the illumination light Ln and the illumination light Lf, respectively.

At irradiation with the illumination light Ln, as illustrated in FIG. 25B, part of the end face 1a at which the defect df8 is not present and most of the defect df8 are an irradiated region RE11a of the illumination light Ln, and part of a slant face of the defect df8 is a shadow region RE12a. Similarly, at irradiation with the illumination light Lf, as illustrated in FIG. 25C, part of the end face 1a at which the defect df8 is not present and most of the defect df8 are an irradiated region RE11b of the illumination light Lf, and part of a slant face of the defect df8 is a shadow region RE12b.

If the illumination light Ln and the illumination light Lf have the same illuminance at the end part fv1, the luminance in the two irradiated regions RE11a and RE11b is the same between two pieces of captured image data obtained by image capturing through the camera 110 under irradiation with each illumination light, and the luminance in the two shadow regions RE12a and RE12b are the same therebetween. Furthermore, it can be said that, in the defect inspect method according to the first embodiment, it is assumed that the luminance is the same in at least the two irradiated regions RE11a and RE11b.

However, when the illumination light Ln and the illumination light Lf at the end part fv1 have illuminance difference therebetween attributable to difference in the distance to the light source, the luminance is not the same between the irradiated regions RE11a and RE11b nor between the shadow regions RE12a and RE12b. In some cases, the luminance value of the shadow region RE12a formed by the illumination light Ln for which the distance to the light source is short is larger than the luminance value of the irradiated region RE11b formed by the illumination light Lf for which the distance to the light source is long. For example, the shadow regions RE12 are not reflected in the determination image in some cases. In such a case, it is difficult to accurately perform defect inspection. In order to maintain the accuracy of defect inspection, measures such as equalization of the luminance levels of the irradiated regions RE11a and RE11b, for example, are needed. Thus, in the case that the inspection target region is enlarged, measures are needed for this point.

[Problem Attributable to Relation Between Irradiation Angle of Illumination Light and View Angle]

Figure 26A:
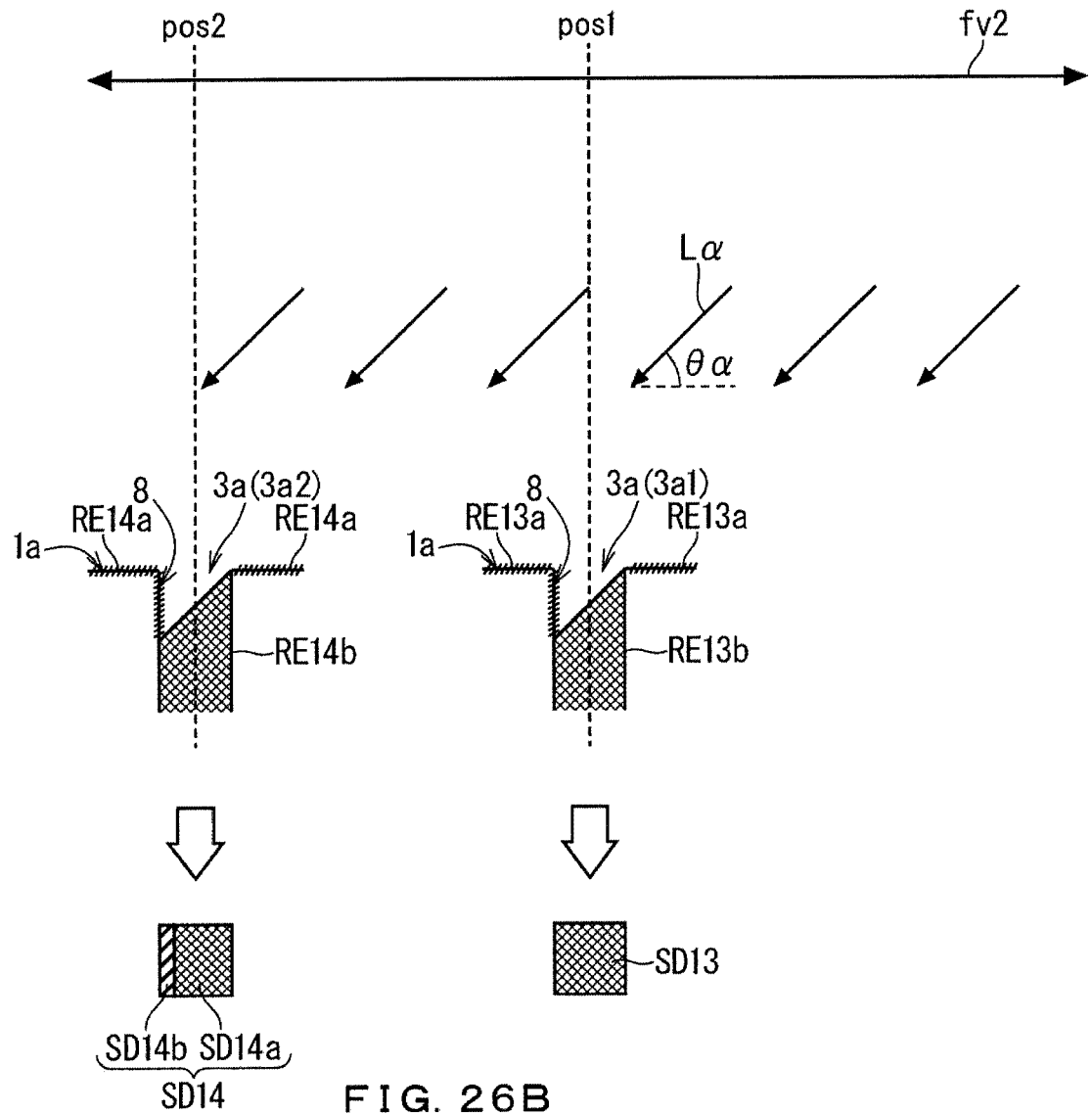
FIGS. 26A and 26B are diagrams for description of the influence of the relation between the irradiation angle of illumination light and the view angle on a captured image.
Figure 26B:
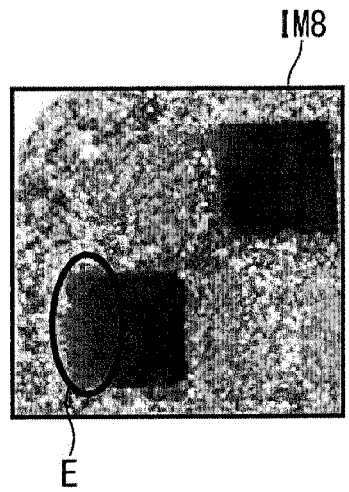

The influence of enlargement of the view angle (capturing range) of the camera 110 to enlarge the inspection target region also appears in the relation between the irradiation angle of illumination light and the view angle. FIGS. 26A and 26B are diagrams for description of the influence of the relation between the irradiation angle of illumination light and the view angle on a captured image.

FIG. 26A illustrates a case in which image capturing through the camera 110 is performed while the end face 1a of the honeycomb structural body 1 is irradiated with illumination light Lα obliquely at a predetermined angle (irradiation angle) θα relative to the horizontal plane. In this case, the first cell 3a (hereinafter also referred to as a central part cell 3a1) having a rectangular opening exists directly below a central part pos1 of a view angle fv2 of the camera 110, and the first cell 3a (hereinafter also referred to as an end part cell 3a2) exists directly below an end part pos2 of the view angle fv2. For simplification of description, the illuminance of the illumination light Lα is constant in the view angle fv2.

At irradiation with the illumination light Lα in such a manner, part of the end face 1a at which the first cell 3a (3a1, 3a2) is not present becomes irradiated regions RE13a and RE14a of the illumination light Lα, which also include part of a wall surface 8 of the first cell 3a (3a1, 3a2) near the end face 1a. The range of the wall surface 8 included in the irradiated regions RE13a and RE14a is larger as the irradiation angle θα of the illumination light Lα is larger.

Since the illumination light Lα does not reach the other part of the wall surface 8 and a deep part of the first cell 3a (3a1, 3a2), these parts become shadow regions RE13b and RE14b.

In other words, the irradiation state of the illumination light Lα is the same between the central part cell 3a1 and the end part cell 3a2.

However, the central part cell 3a1 and the end part cell 3a2 have difference as described below in formation of an image in a captured image obtained when image capturing through the camera 110 is performed in such an irradiation state.

First, an image of the central part cell 3a1 is a rectangular dark part SD13 having a luminance value of substantially zero.

However, an image of the end part cell 3a2 is mostly a dark part SD14a having a luminance value of substantially zero, similarly to the dark part SD13, but also includes a weak dark part SD14b having a luminance slightly larger than that of the dark part SD14a (slightly brighter enough to be visually recognized) and having a predetermined width. This corresponds to reflection of part of the wall surface 8 included in the irradiated region RE14a. This reflection is more significant as the irradiation angle θα is larger.

That is, difference in dark part area occurs between the image of the central part cell 3a1 and the image of the end part cell 3a2. Thus, when the determination image (determination image data) is generated based on a captured image (captured image data) including such reflection, such failure that correct recognition is not performed may potentially occur, despite that a total dark part SD14 of the dark part SD14a and the weak dark part SD14b needs to be recognized as a cell region attributable to the first cell 3a. FIG. 26B is a diagram exemplarily illustrating such a determination image IM8. In the determination image IM8, a weak dark part as reflection of the wall surface 8 exists at part E.

Such failure becomes significant when the view angle fv2 is increased to enlarge the inspection target region. Thus, measures are needed for this point when the inspection target region is enlarged.

<Defect Inspecting Apparatus>

Figure 27:
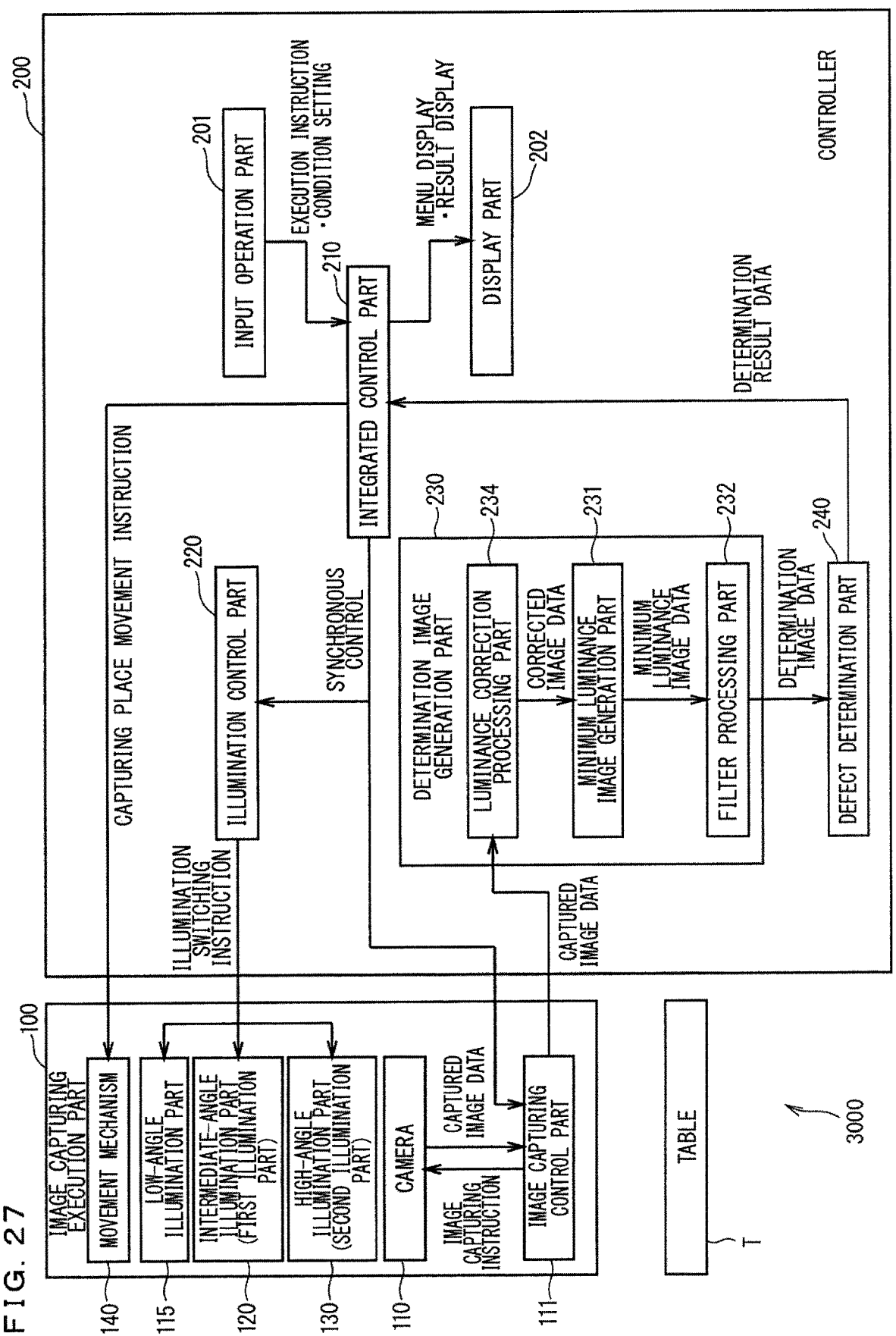
FIG. 27 is a block diagram illustrating the configuration of a defect inspecting apparatus 3000 according to a second embodiment.

FIG. 27 is a block diagram illustrating the configuration of the defect inspecting apparatus 3000 according to the present embodiment. Components of the defect inspecting apparatus 3000 are mostly the same as the components of the defect inspecting apparatus 1000 according to the first embodiment, and thus any common part is denoted by the same reference sign and detailed description thereof is omitted, and any difference from the defect inspecting apparatus 1000 will be mainly described below.

As illustrated in FIG. 27, similarly to the defect inspecting apparatus 1000, the defect inspecting apparatus 3000 mainly includes: the table T on which the honeycomb structural body 1 is to be placed in a posture in which the end face 1a as an inspection target surface is horizontal; the image capturing execution part 100 configured to perform image capturing of the end face 1a through the camera 110 while irradiating the end face 1a of the honeycomb structural body 1 placed on the table T with illumination light; and the controller 200 configured to perform control of the image capturing execution part 100 and defect determination based on a captured image obtained by the image capturing execution part 100.

However, the defect inspecting apparatus 3000 according to the present embodiment is intended to be able to accurately perform defect inspection in a large inspection target region as compared to a case in which the defect inspecting apparatus 1000 according to the first embodiment is used. In the present embodiment, the relation that the inspection target region of the inspecting apparatus 3000 is larger than that of the inspecting apparatus 1000 according to the first embodiment is derived from comparison based on assumption that the distance (camera distance) between the camera 110 and the end face 1a of the honeycomb structural body 1 as an inspection target surface is substantially identical between the apparatuses, or that the camera distance is shorter for the inspecting apparatus 3000 than for the inspecting apparatus 1000. This is because, although the image capturing target range is enlarged with increase of the camera distance in the inspecting apparatus 1000 according to the first embodiment, problems such as size increase of the inspecting apparatus 1000 and decrease of the image resolution occur in such a case, which is not preferable.

To cope with such enlargement of the inspection target region, the camera 110 having lens specifications that allow image capturing of a range wider than that of the camera 110 used in the defect inspecting apparatus 1000 is used. The lens specifications of the actual camera 110 may be determined based on an inspection condition (such as the size of the inspection region at one inspection).

Figure 28:
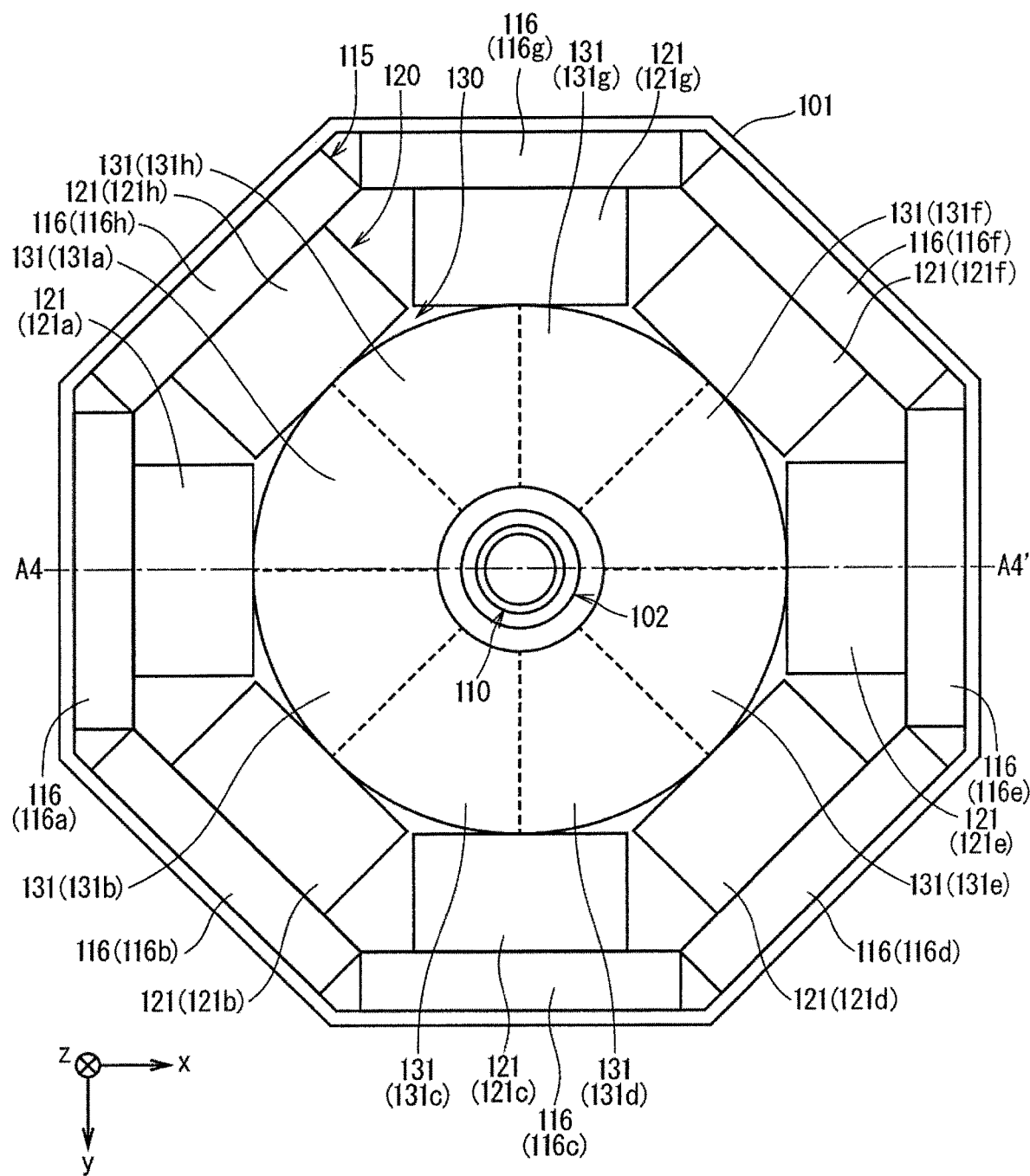
FIG. 28 is a lower surface diagram of a main part of the image capturing execution part 100.
Figure 29:
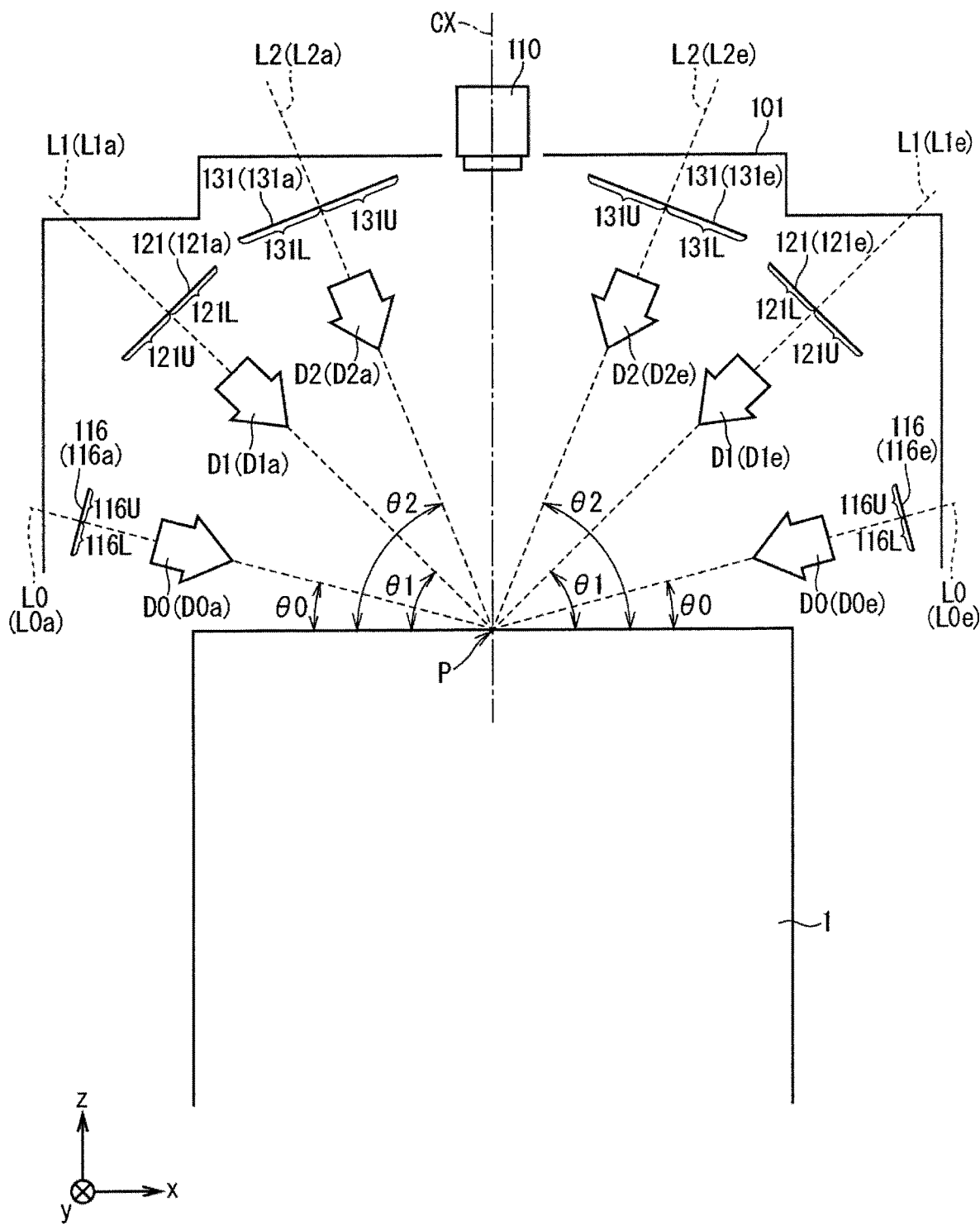
FIG. 29 is a cross-sectional view taken along line A4-A4' in FIG. 28.

FIG. 28 is a lower surface diagram of a main part of the image capturing execution part 100 (when the image capturing execution part 100 is viewed upward from below in the vertical direction), and FIG. 29 is a cross-sectional view taken along line A4-A4' in FIG. 28. The A4-A4' section in FIG. 28 is a vertical section including the optical axis CX of the camera 110, is a symmetric plane of a low-angle illumination element 116$a$, a low-angle illumination element 116$e$, an intermediate-angle illumination element 121$a$, and an intermediate-angle illumination element 121$e$ to be described later, is a surface passing between a high-angle illumination element 131$a$ and a high-angle illumination element 131$b$, and is also a plane passing between a high-angle illumination element 131$e$ and a high-angle illumination element 131$f$. However, in FIG. 29, for convenience of illustration, the A4-A4' section passes through the high-angle illumination element 131$a$ and the high-angle illumination element 131$e$.

In addition, to facilitate understanding, FIG. 29 additionally illustrates the honeycomb structural body 1 placed on the table T which itself is not illustrated in FIG. 29. FIGS. 28 and 29 include right-handed xyz coordinates having the z axial direction along the vertical direction, having an x axial direction along the right-left direction in FIG. 28, and having a y axial direction along the up-down direction in the figure. Accordingly, FIG. 29, which illustrates the A4-A4' section in FIG. 28, is a zx cross-sectional view.

The configurations and arrangement of the table T and the camera 110 in the defect inspecting apparatus 3000 according to the present embodiment are substantially the same as those in the defect inspecting apparatus 1000 exemplarily illustrated in FIGS. 8 and 9. Namely, at inspection, the honeycomb structural body 1 is placed on the table T (not illustrated) so that the end face 1$a$ as an inspection target surface is a horizontal upper surface as illustrated in FIG. 29. In the image capturing execution part 100, the camera 110 is provided in a posture in which the lens thereof points vertically downward and the optical axis CX thereof is aligned with the vertical direction to have a capturing target in the vertically downward direction. Accordingly, the camera 110 can perform image capturing in a predetermined range centered at an intersection point P between the optical axis CX and the end face 1$a$.

In the image capturing execution part 100 of the defect inspecting apparatus 1000 according to the first embodiment, the two illumination parts of the first illumination part 120 and the second illumination part 130 are provided around the camera 110, but in the defect inspecting apparatus 3000 according to the present embodiment, three illumination parts of a low-angle illumination part 115, an intermediate-angle illumination part 120, and a high-angle illumination part 130 are arranged around the camera 110 on the lower surface of the support body 101 included in the image capturing execution part 100 by appropriate disposition means (not illustrated). Similarly to the defect inspecting apparatus 1000, the camera 110 is inserted into the opening 102 provided to the support body 101 at least at image capturing, and the support body 101 on which the camera 110 and each illumination part are disposed is movable by the movement mechanism 140.

More specifically, the intermediate-angle illumination part 120 and the high-angle illumination part 130 correspond to the first illumination part 120 and the second illumination part 130 of the defect inspecting apparatus 1000 according to the first embodiment, respectively. Hereinafter, to facilitate understanding, components of the intermediate-angle illumination part 120 and the high-angle illumination part 130 are denoted by reference signs identical to those of the corresponding components of the first illumination part 120 and the second illumination part 130.

That is to say, the intermediate-angle illumination part 120 has a configuration in which m1 (m1≥4) intermediate-angle illumination elements 121 of the same performance, each having the irradiation angle $\theta 1$ (preferably, $\theta 1=30°$ to $60°$) are equiangularly spaced around the camera 110 in a horizontal plane. FIGS. 28 and 29 exemplarily illustrate a case of m1=8. In other words, FIGS. 28 and 29 exemplarily illustrate a case in which the eight intermediate-angle illumination elements 121 (121$a$ to 121$h$) are provided. FIGS. 28 and 29 also exemplarily illustrate, as each intermediate-angle illumination element 121, bar illumination in which a large number of LED elements are arrayed in a rectangular shape.

The high-angle illumination part 130 has a configuration in which m2 (m2≥4) high-angle illumination elements 131 of the same performance, each having the irradiation angle $\theta 2$ (preferably, $\theta 2=60°$ to $85°$) are equiangularly spaced around the camera 110 in a horizontal plane. However, more specifically, FIGS. 28 and 29 exemplarily illustrate a case with m2=8 in which the high-angle illumination part 130 is provided as ring illumination in which a large number of LED elements are concentrically arrayed in a ring shape as in the modification of the first embodiment illustrated in FIG. 23, and regions obtained by equally dividing the ring illumination into eight are used as the respective high-angle illumination elements 131 (131$a$ to 131$h$).

In this manner, m1=m2=8 holds in FIGS. 28 and 29, but m1=m2 is not essential, and m1≠m2 may hold. In FIG. 28, the arrangement positions of the individual intermediate-angle illumination elements 121 are shifted from the arrangement positions of the individual high-angle illumination elements 131 in a direction around the camera 110 in the horizontal plane (circumferential direction) by 22.5°, but this is not essential, and the arrangement positions of the individual intermediate-angle illumination elements 121 may coincide with the arrangement positions of the individual high-angle illumination elements 131 in the circumferential direction as illustrated in FIG. 8.

Besides, as described above, the defect inspecting apparatus 3000 according to the present embodiment includes the low-angle illumination part 115 in addition to the intermediate-angle illumination part 120 and the high-angle illumination part 130.

FIGS. 28 and 29 exemplarily illustrate a configuration in which the low-angle illumination part 115 includes eight low-angle illumination elements 116 (116$a$, 116$b$, 116$c$, 116$d$, 116$e$, 116$f$, 116$g$, and 116$h$). In this case, these eight low-angle illumination elements 116 each have a longitudinal direction along the horizontal direction and are arranged to separate from each other by 45° in a horizontal plane and each attached in a tilt posture to the support body 101, as exemplarily illustrated with the low-angle illumination elements 116$a$ and 116$e$ in FIG. 29. Similarly to the intermediate-angle illumination element 121, FIGS. 28 and 29 exemplarily illustrate, as each low-angle illumination element 116, bar illumination in which a large number of LED elements are arrayed in a rectangular shape.

More specifically, an irradiation direction D0 of each low-angle illumination element 116 has a predetermined angle θ0 smaller than the angle θ1 relative to the horizontal plane, and the intersection point between an optical axis L0 thereof and the end face 1a coincides with the intersection point P between the optical axis CX of the camera 110 and the end face 1a, similarly to the optical axis L1 of the intermediate-angle illumination element 121 and the optical axis L2 of the high-angle illumination element. Accordingly, the eight low-angle illumination elements 116 can irradiate substantially identical regions centered at the intersection point P with illumination light at the same irradiation angle θ0 in mutually different directions separated from each other by 45° in the horizontal plane.

The plurality of low-angle illumination elements 116, the plurality of intermediate-angle illumination elements (first illumination elements) 121, and the plurality of high-angle illumination elements (second illumination element) 131 are separated from each other in different planes parallel to the end face 1a as an inspection target surface.

The irradiation angle θ0 of each low-angle illumination element 116 is preferably 5° to 30°, and is, for example, 15°.

In the first embodiment, the irradiation angle θ1 of the first illumination element 121 being smaller than 30° is not preferable because a shadow region occurring at the normal surface irregularity ns of the ceramic surface 6 increases and the surface irregularity ns is highly likely to be falsely detected as a defect. However, in the present embodiment, while the irradiation angle θ1 is maintained for the intermediate-angle illumination elements 121 corresponding to the first illumination elements 121, the low-angle illumination part 115 having the irradiation angle θ0 smaller than θ1 is provided separately from the intermediate-angle illumination part 120, for enlarging the inspection target region is enlarged. As described later, the determination processing using determination image data attributable to captured image data obtained through image capturing by using the low-angle illumination part 115 employs a threshold different from that of the determination processing using determination image data attributable to captured image data obtained through image capturing by using the intermediate-angle illumination part 120. Thus, the above-described false detection problem does not occur.

The number of low-angle illumination elements 116 provided to the low-angle illumination part 115 is not limited to eight, but typically, m0 (m0≥4) low-angle illumination elements 116 of the same performance, each having the irradiation angle θ0 may be provided at positions equiangularly spaced from each other around the camera 110 in the horizontal plane.

In FIG. 28, the arrangement positions of the individual low-angle illumination elements 116 coincide with the arrangement positions of the individual intermediate-angle illumination elements 121 in the circumferential direction in the horizontal plane, but this is not essential, and their arrangement positions may be shifted from each other, like the relation between the arrangement positions of the intermediate-angle illumination elements 121 and the arrangement positions of the high-angle illumination elements 131.

Similarly to the defect inspecting apparatus 1000 according to the first embodiment, in the defect inspecting apparatus 3000 according to the present embodiment, m0 pieces of captured image data (low-angle captured image data) are obtained by subsequently image capturing through the camera 110 each time the m0 (for example, eight) low-angle illumination elements 116 provided to the low-angle illumination part 115 are sequentially turned on. Similarly, m1 pieces of captured image data (intermediate-angle captured image data) are obtained by subsequently image capturing each time the m1 (for example, eight) intermediate-angle illumination elements 121 provided to the intermediate-angle illumination part 120 are sequentially turned on. In addition, m2 pieces of captured image data (high-angle captured image data) are obtained by subsequently image capturing each time the m2 (for example, eight) high-angle illumination elements 131 provided to the high-angle illumination part 130 are sequentially turned on.

Figure 30:
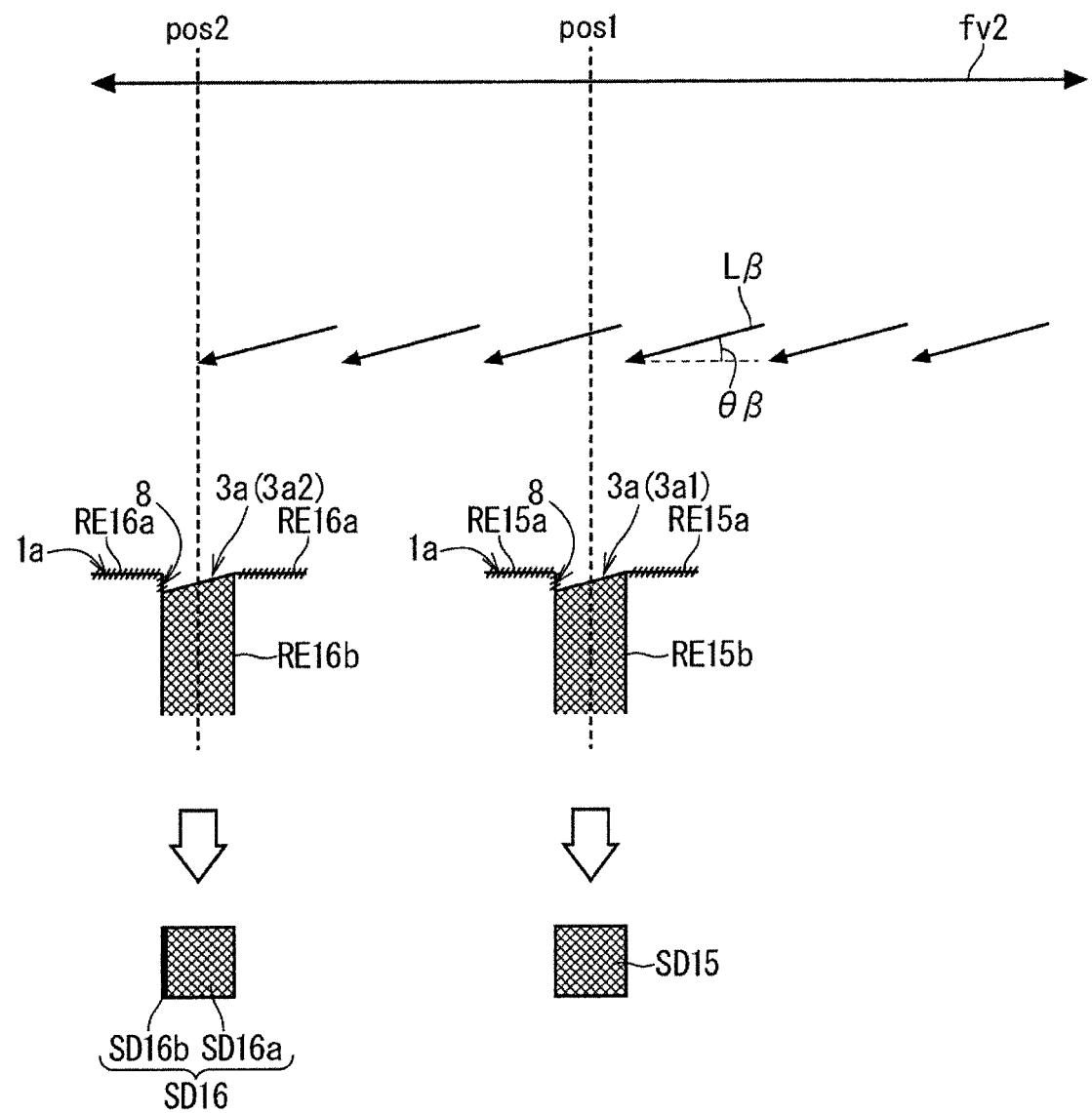
FIG. 30 is a diagram for description of the relation between illumination light emitted from a low-angle illumination part 115 and the view angle.

One of the reason that the defect inspecting apparatus 3000 includes the low-angle illumination part 115 is to prevent failure along with reflection of the wall surface 8 of the first cell 3a in a captured image, which is attributable to the enlargement of the inspection target region as described above. FIG. 30 is a diagram for description of the relation between illumination light emitted from the low-angle illumination part 115 and the view angle.

FIG. 30 illustrates a case in which image capturing is performed through the camera 110 while the end face 1a of the honeycomb structural body 1 is irradiated with illumination light Lβ from a low-angle illumination element 116 obliquely at a predetermined angle (irradiation angle) θ0=θβ (<θα) relative to the horizontal plane. It is supposed that the view angle fv2 of the camera 110 and the arrangement positions of the central part cell 3a1 and the end part cell 3a2 in this case are the same as those in the case illustrated in FIG. 26A.

At irradiation with the illumination light Lβ in such a manner, part of the end face 1a at which the first cell 3a (3a1, 3a2) is not present becomes irradiated regions RE15a and RE16a of the illumination light Lβ, which also include part of the wall surface 8 of the first cell 3a (3a1, 3a2) near the end face 1a. The other part of the wall surface 8 and a deep part of the first cell 3a (3a1, 3a2) become shadow regions RE15b and RE16b.

However, an irradiation angle θβ of the illumination light Lβ is smaller than the irradiation angle θα of the illumination light Lα in the case of FIG. 26A, and thus the range of the wall surface 8 included in the irradiated regions RE13a and RE14a decreases as compared to that in the case of irradiation with the illumination light Lα.

The appearance of images of the central part cell 3a1 and the end part cell 3a2 in a captured image obtained in image capturing through the camera 110 in such an irradiation state is compared with that in the case of FIG. 26A as described below.

First, similarly to the case of FIG. 26A, the image of the central part cell 3a1 is a rectangular dark part SD15 having a luminance value of substantially zero.

The image of the end part cell 3a2 is mostly a dark part SD16a having a luminance value of substantially zero like the dark part SD15. Similarly to the case of FIG. 26A, a weak dark part SD16b attributable to reflection of the wall surface 8 is formed, but the range of the formation is sufficiently small as compared to the dark part SD16a and negligible in effect in terms of the accuracy of inspection.

This means that determination image data with which a cell region can be correctly recognized can be obtained by performing image capturing by using the low-angle illumination part 115.

In addition to such provision of the low-angle illumination part 115, the upper and lower halves of each illumination element of each illumination part provided to the image capturing execution part 100 are individually dimmable in the defect inspecting apparatus 3000 according to the present embodiment.

Specifically, the upper and lower halves of each low-angle illumination element 116 are a dimming unit 116U and a dimming unit 116L that are individually dimmable, respectively. Specifically, the light quantities of the dimming unit 116U and the dimming unit 116L are individually adjustable. Similarly, an upper dimming unit 121U and a lower dimming unit 121L of each intermediate-angle illumination element 121 are individually dimmable. In addition, an upper dimming unit 131U and a lower dimming unit 131L of each high-angle illumination element 131 are individually dimmable.

Thus, the low-angle illumination elements 116 (116a to 116h), the intermediate-angle illumination elements 121 (121a to 121h), and the high-angle illumination elements 131 (131a to 131h) are each arranged as a whole so that the respective optical axes L0, L1, and L2 pass through the intersection point P between the optical axis CX of the camera 110 and the end face 1a of the honeycomb structural body 1, but the optical axis of each dimming unit is shifted from the intersection point P. Specifically, the optical axes of the dimming units 116L, 121L, and 131L pass through the front side of the intersection point P, and the optical axes of the dimming units 116U, 121U, and 131U pass through the back side of the intersection point P.

Dimming of each dimming unit is performed under control by the illumination control part 220. An LED element having a directivity angle half width of 5° to 30° approximately (for example, 12° when the distance from each illumination element to the intersection point P is 180 mm approximately) is preferably used to individually and excellently perform dimming. However, when the distance from the illumination to the intersection point P is long, the directivity angle half width is preferably small because illumination light spreads before reaching an inspection object. When the distance from the illumination to the intersection point P is short, the directivity angle half width is preferably large.

Figure 31:
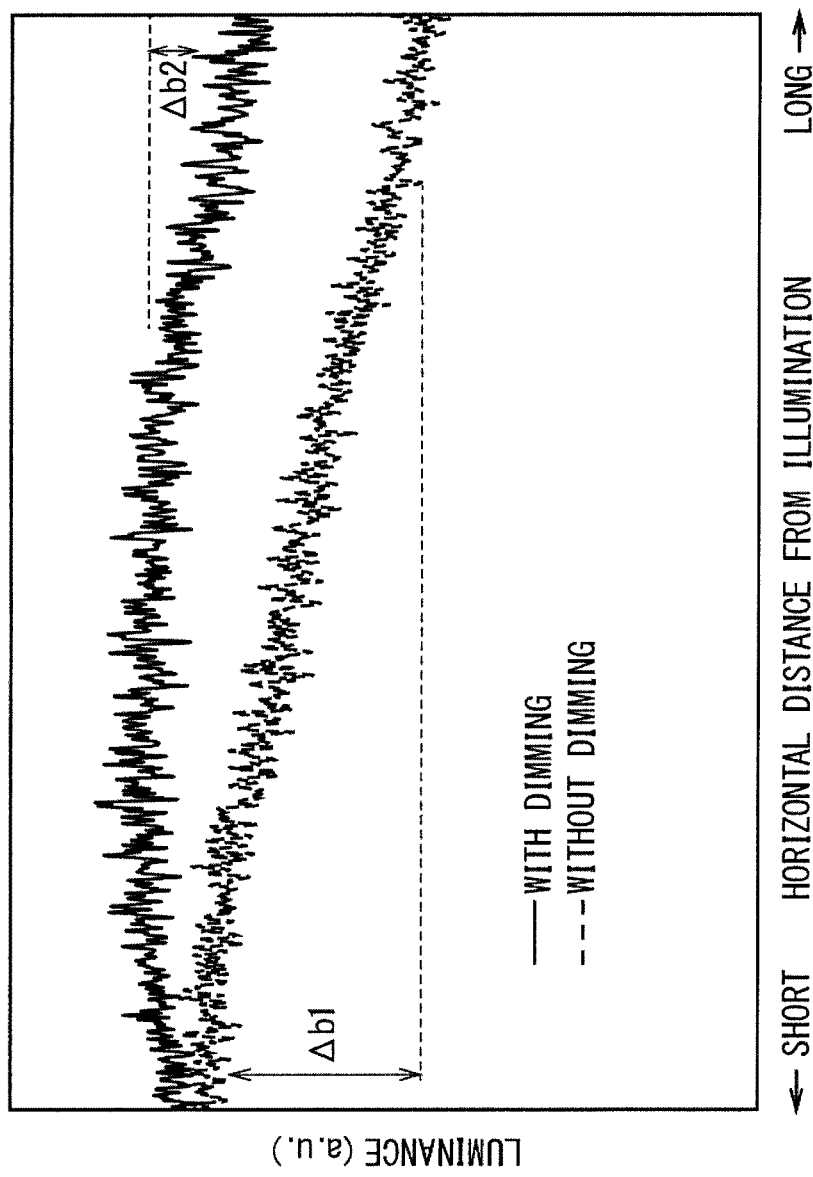
FIG. 31 is a diagram for description of the effect of dimming of each dimming unit.

FIG. 31 is a diagram for description of the effect of dimming (individual dimming) of each dimming unit. Specifically, FIG. 31 is a diagram illustrating the relation between the horizontal distance from the illumination (light source) and the luminance (luminance distribution) when image capturing of a uniform flat surface is performed while the flat surface is irradiated with illumination light from one low-angle illumination element 116 in an oblique direction.

As described above, the illuminance of illumination light is inversely proportional to the square of the distance from a light source. Thus, when individual dimming of the dimming units 116L and 116U is not performed, the luminance monotonically decreases as the horizontal distance from the illumination (light source) is larger as illustrated with "without dimming" in FIG. 31. In the case of "without dimming" in FIG. 31, luminance difference Δb1 occurs at both ends of the capturing range (view angle). This is the same also in the case that one illumination element is only dimmable as a whole and individual dimming cannot be performed.

On the other hand, FIG. 31 illustrates, with "with dimming", an example in which individual dimming is performed by the dimming units 116L and 116U, thereby to increase the luminance on a side far from the illumination as compared to that in the case of "without dimming", while the luminance on a side close to the illumination is kept substantially the same as that in the case of "without dimming". Specifically, dimming is performed to relatively increase the light quantity of the upper dimming unit 116U of each low-angle illumination element 116 as compared to the light quantity of the lower dimming unit 116L.

In such a case, the luminance between the side close to the illumination and the middle in the capturing range is substantially constant or slightly larger closer to the middle, and the luminance difference Δb2 at both ends of the capturing range is smaller than the luminance difference Δb1 in the case of "without dimming".

In the defect inspecting apparatus 3000 according to the present embodiment, luminance difference in accordance with difference in the distance from each illumination element in the capturing range can be reduced by performing such individual dimming in advance before inspection for all of the low-angle illumination elements 116, the intermediate-angle illumination elements 121, and the high-angle illumination elements 131.

Specific methods and requirements of the individual dimming are not particularly limited, but, for example, criteria are set for the lowest luminance or the luminance difference Δb2, and dimming is performed to satisfy the criteria.

Instead of dimming based on luminance distribution in a captured image, illuminance in the capturing range may be directly measured by predetermined measurement means, and individual dimming may be performed based on its distribution (illuminance distribution).

The following describes the controller 200. In the defect inspecting apparatus 3000 according to the present embodiment, similarly to the defect inspecting apparatus 1000 according to the first embodiment, the controller 200 is implemented by a computer such as a general-purpose personal computer. Namely, the controller 200 mainly includes the input operation part 201 and the display part 202, and also includes functional components implemented through an execution of an operation program, stored in a storage part (not illustrated) such as a hard disk provided to the computer, by a control part (not illustrated) including a CPU, a ROM, and a RAM provided to the computer.

However, it is clear from comparison between FIG. 7 and FIG. 27 that the controller 200 of the defect inspecting apparatus 3000 according to the present embodiment differs from the controller 200 of the defect inspecting apparatus 1000 according to the first embodiment in that a luminance correction processing part 234 is additionally provided to the determination image generation part 230.

The luminance correction processing part 234 acquires captured image data generated by image capturing through the camera 110 (low-angle captured image data, intermediate-angle captured image data, high-angle captured image data), and performs luminance correction processing of correcting luminance distribution of the captured image data.

In general, the luminance correction processing at the luminance correction processing part 234 is processing performed to equalize the luminance level at the end face 1a of the honeycomb structural body 1 between the pieces of low-angle captured image data, between the pieces of intermediate-angle captured image data, and between the pieces of high-angle captured image data to prevent generation of failure attributable to the difference in distance from the illumination (light source) as described based on FIGS. 25A to 25C before obtaining minimum luminance image data (m0 pieces of low-angle minimum luminance image data, m1 pieces of intermediate-angle minimum luminance image data, and m2 pieces of high-angle minimum luminance image data) from m0 pieces of low-angle captured image data, m1 pieces of intermediate-angle captured image data, and m2 pieces of high-angle captured image data, respectively, to generate determination image data (low-angle determination image data, intermediate-angle determination image data, and high-angle determination image data). Schematically, in this processing, the opened first cell 3a, the joining part 7, or a normal part at which no defect or the like exists at the end face 1a is set as a reference part (base part), and the luminance at the reference part is equalized between the pieces of captured image data.

The luminance correction processing also has an effect of reducing luminance difference attributable to difference in the distance from the illumination light in the view angle, which still remains through the above-described individual dimming of each dimming unit.

In the defect inspecting apparatus 3000 according to the present embodiment, corrected image data (m0 pieces of low-angle corrected image data, m1 pieces of intermediate-angle corrected image data, and m2 pieces of high-angle corrected image data) generated based on each piece of captured image data through the luminance correction processing by the luminance correction processing part 234 is used to generation of minimum luminance image data (low-angle minimum luminance image data, intermediate-angle minimum luminance image data, high-angle minimum luminance image data) by the minimum luminance image generation part 231.

Details of the luminance correction processing by the luminance correction processing part 234 will be described later.

<Defect Inspection Processing>

The following description of the defect inspection processing performed by the defect inspecting apparatus 3000 is mainly made on any difference from the defect inspecting apparatus 1000 according to the first embodiment.

[Image Capturing Processing]

Figure 32:
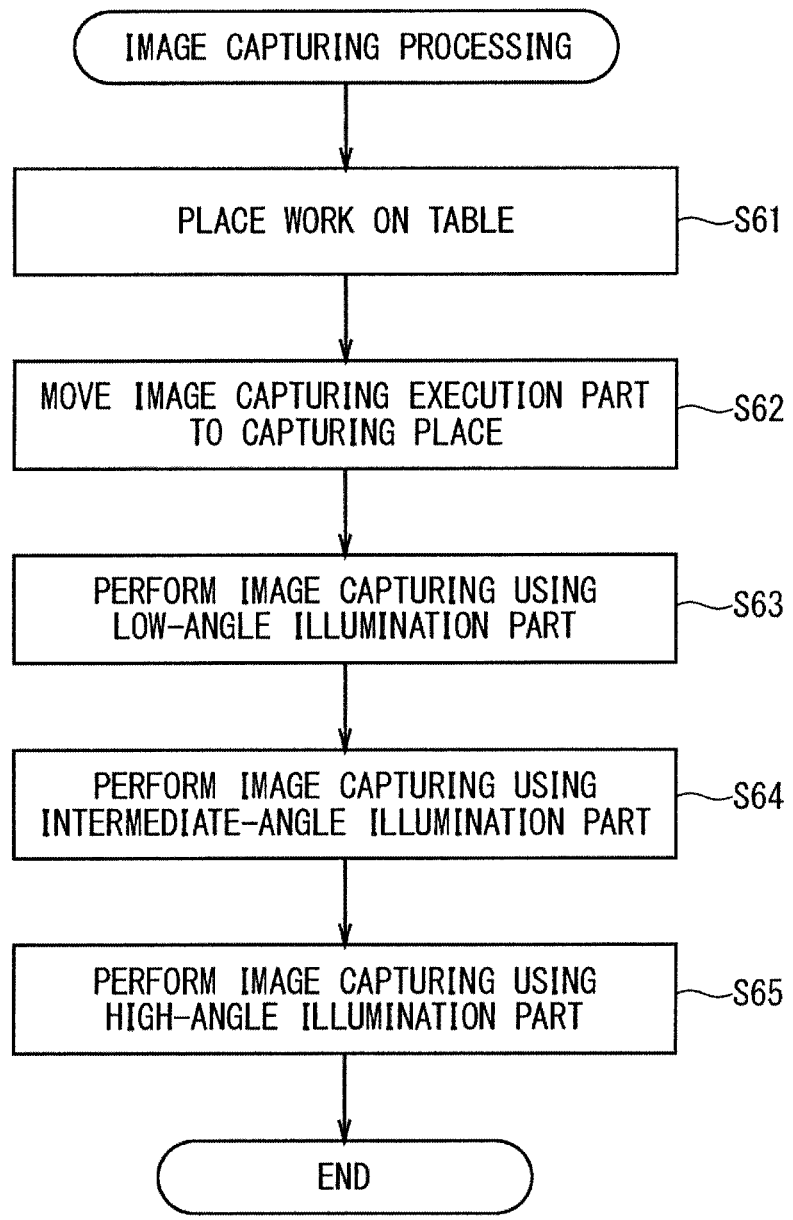
FIG. 32 is a diagram illustrating a schematic procedure of image capturing processing performed in defect inspection using the defect inspecting apparatus 3000.

FIG. 32 is a diagram illustrating a schematic procedure of the image capturing processing performed in defect inspection using the defect inspecting apparatus 3000.

In the image capturing processing, first, similarly to the first embodiment, a work (honeycomb structural body 1 as a defect inspection target) is placed on the table T in a posture in which an end face thereof is an upper surface (step S61), and after the placement, when an execution instruction of a defect inspection is provided through the input operation part 201, the movement mechanism 140 is driven to move the image capturing execution part 100 (more specifically, the camera 110 and the support body 101 supporting the low-angle illumination part 115, the intermediate-angle illumination part 120, and the high-angle illumination part 130) to a capturing place (step S62).

In this case, similarly to the first embodiment, the work may be positioned when placing on the table T, or the posture of the camera 110 may be adjusted in the horizontal plane, so that the cells 3 of the work (the first cells 3a in appearance) are arrayed in the longitudinal and transverse axial directions in the capturing range of the camera 110, which is defined in a rectangular shape. However, even when the array direction of the cells 3 is slightly tilted relative to the longitudinal and transverse axial directions in the capturing range of the camera 110, the determination processing can be performed with no problem by performing correction with the tilt taken into account as necessary at the determination processing.

Similarly to the first embodiment, a sensor configured to sense that the work is placed on the table T may be provided, and the integrated control part 210 may emit, in response to a sensing signal from the sensor, a predetermined control signal for sequentially executing the image capturing processing and the following determination processing to each component of the defect inspecting apparatus 3000.

After the image capturing execution part 100 is disposed at the capturing place, image capturing using the low-angle illumination part 115 (step S63), image capturing using the intermediate-angle illumination part 120 (step S64), and image capturing using the high-angle illumination part (step S130) are sequentially performed. As described above, such image capturing is performed after individual dimming of each illumination element is performed in advance to reduce luminance difference in the capturing range.

Figure 33:
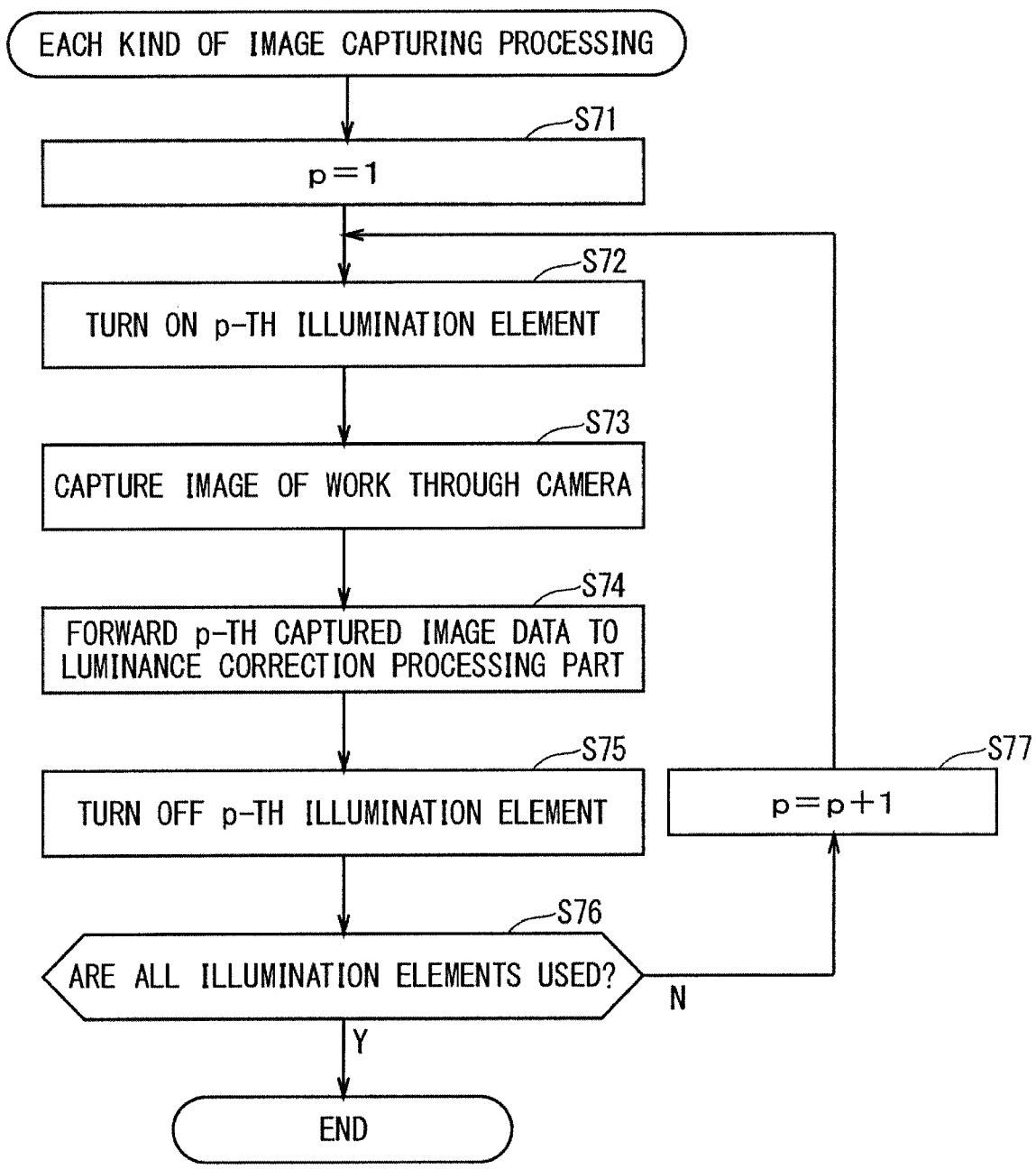
FIG. 33 is a diagram illustrating a specific procedure of image capturing processing.

FIG. 33 is a diagram illustrating a specific procedure of each kind of image capturing processing. The procedure of each kind of image capturing processing is the same as the procedures of the image capturing processing using the first illumination part 120 and the image capturing processing using the second illumination part 130 in the first embodiment, which are individually illustrated in FIG. 10.

Namely, in each kind of image capturing processing, the initial value of p=1 is set (step S71), and sequential image capturing through the camera 110 is performed while all the illumination elements are sequentially turned on.

Specifically, the p-th illumination element (low-angle illumination element 116, intermediate-angle illumination element 121, or high-angle illumination elements 131) belonging to each illumination part (the low-angle illumination part 115, the intermediate-angle illumination part 120, or the high-angle illumination part 130) is turned on (step S72), and the camera 110 captures an image of the work in such a turn-on state (step S73). The p-th captured image data (low-angle captured image data, intermediate-angle captured image data, or high-angle captured image data) obtained through the image capturing is forwarded from the image capturing control part 111 to the luminance correction processing part 234 (step S74), and subjected to determination processing to be described later. Upon completion of the image capturing and the forwarding, the p-th illumination element (low-angle illumination element 116, intermediate-angle illumination element 121, or high-angle illumination element 131) being turned on is turned off (step S75). Alternatively, the p-th illumination element may be turned off immediately after the completion of the image capturing. Alternatively, all pieces of captured image data (low-angle captured image data, intermediate-angle captured image data, or high-angle captured image data) may be forwarded to the minimum luminance image generation part 231 when all the illumination elements of each illumination part are used for image capturing and the last image capturing is completed.

When not all the illumination elements are used (NO at step S76), in other words, when there is any illumination element yet to be turned on, p=p+1 is set (step S77), and step S72 and the following processing are repeated.

When all the illumination elements are used (YES at step S76), the image capturing processing using the illumination part ends.

[Luminance Correction Processing]

Figure 34:
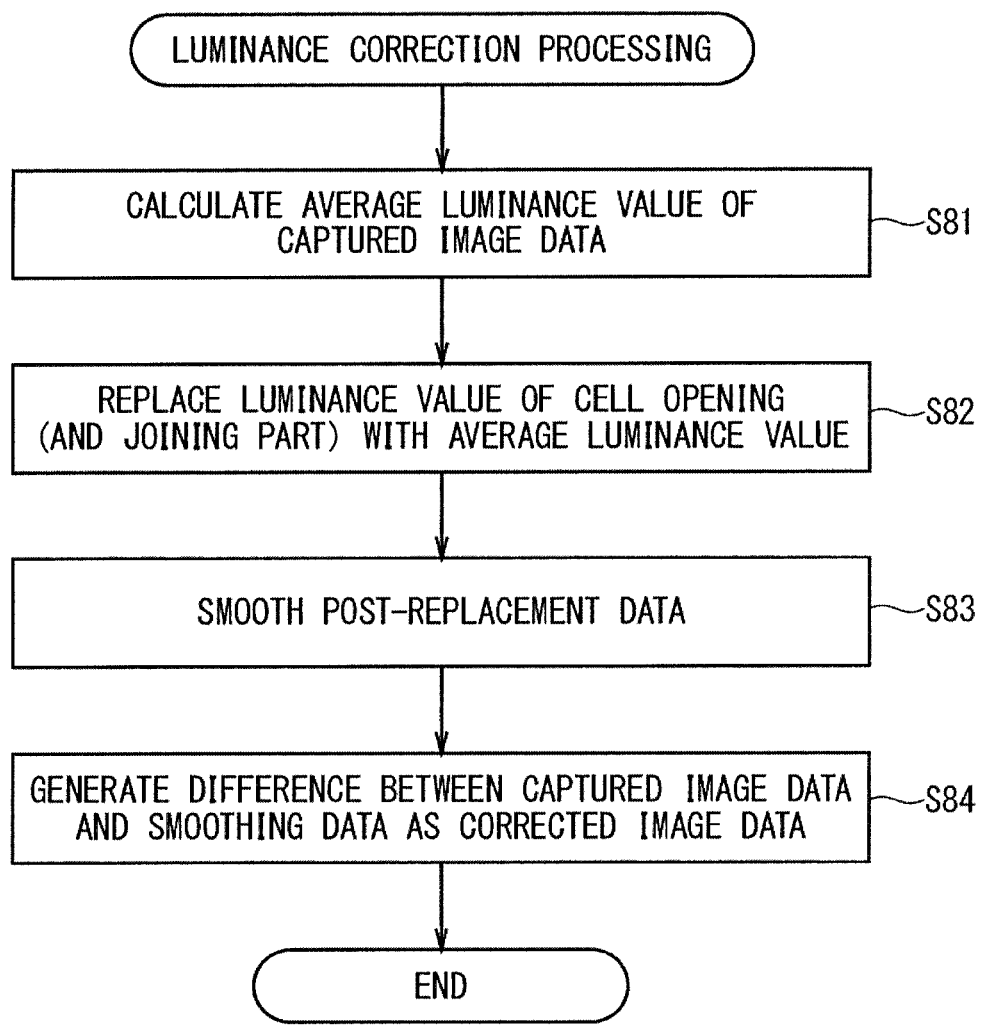
FIG. 34 is a diagram illustrating a schematic procedure of luminance correction processing performed by a luminance correction processing part 334 in defect inspection using the defect inspecting apparatus 3000.

FIG. 34 is a diagram illustrating a schematic procedure of luminance correction processing (low-angle correction processing, intermediate-angle correction processing, and high-angle correction processing) performed by luminance correction processing part 334 in defect inspection using the defect inspecting apparatus 3000. FIGS. 35A to 35D are diagrams exemplarily illustrating the processing content of the luminance correction processing.

Figure 35A:
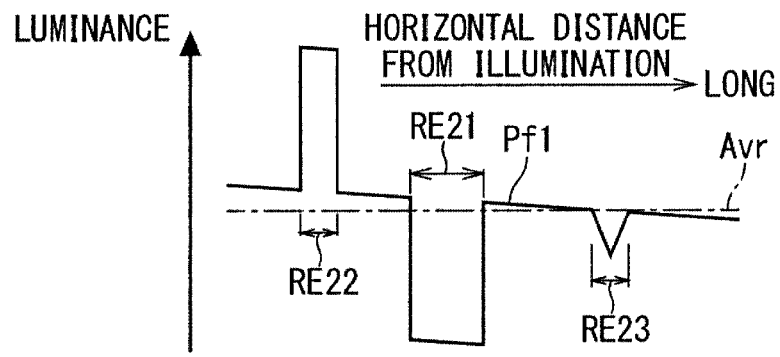
FIGS. 35A to 35D are diagrams exemplarily illustrating the processing content of luminance correction processing.

In this description, it is assumed that captured image data has luminance distribution pf1 as illustrated in FIG. 35A. Specifically, a pixel region RE21 having a luminance value significantly smaller than that in its surroundings represents an image of the first cell 3a as an opening, a pixel region RE22 having a luminance value significantly larger than that in its surroundings represents an image of the joining part 7, and a pixel region RE23 having a luminance value slightly smaller than that in its surroundings represents an image of a defect (typically, a scoop) formed at the end face 1a. Hereinafter, a part other than these pixel regions RE21, RE22, and RE23 is referred to as a base part. The negative slope of the luminance distribution pf1 in the figure as a whole, including the base part, indicates luminance difference remaining even through individual dimming. The joining part 7 may not exist depending on the configuration of the honeycomb structural body 1 as an inspection target.

In the luminance correction processing, first, an average value (average luminance value) Avr of the luminance value at each pixel is calculated for captured image data that provides such luminance distribution pf1 (step S81). In FIG. 35A, the average luminance value Avr is illustrated with a dashed line.

Figure 35B:
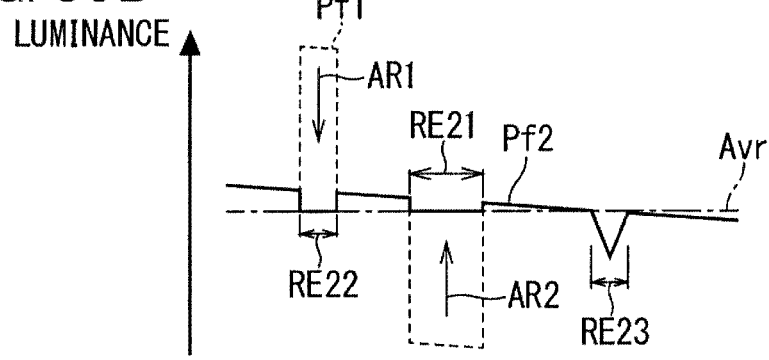

After the average luminance value Avr is obtained, the luminance value of the first cell 3a such as the pixel region RE21 and the luminance value of the joining part 7 such as the pixel region RE22 when it exists are replaced with the average luminance value Avr (step S82). FIG. 35B illustrates luminance distribution pf2 of image data (post-replacement data) after the replacement, and also illustrates the luminance distribution pf1 with a dashed line. The arrangement positions and sizes of the first cell 3a and the joining part 7 are known, and thus the positions of pixels of their images can be specified and the replacement can be easily performed.

Figure 35C:
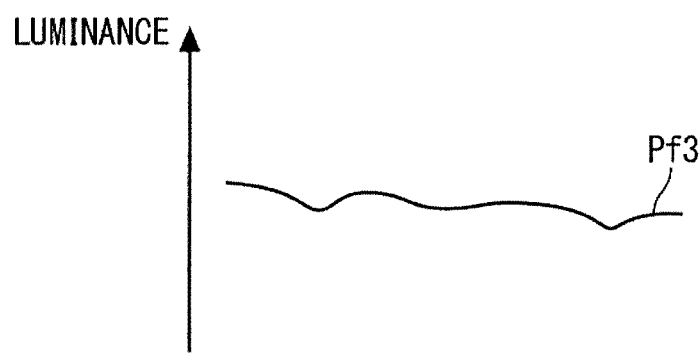

Subsequently after the replacement is performed, smoothing processing is performed on the post-replacement data to generate smoothing data (step S83). A well-known method is applicable to the smoothing processing. FIG. 35C illustrates luminance distribution pf3 of the obtained smoothing data.

The luminance distribution pf3 provided by the smoothing data has a negative slope in the figure like the luminance distribution pf1 provided by captured image data subjected to the luminance correction processing. In other words, the luminance distribution pf3 provided by the smoothing data obtained by temporarily generating the post-replacement data and smoothing the post-replacement data indicates rough distribution tendency of the luminance of the other part except for parts such as the first cell 3a and the joining part 7, which are known singular points in the luminance distribution pf1.

The luminance value in the smoothing data derived from captured image data for which the distance from an illumination element used for image capturing is short tends to be, as a whole, larger than the luminance value in the smoothing data derived from captured image data for which the distance from the illumination element is long.

Figure 35D:
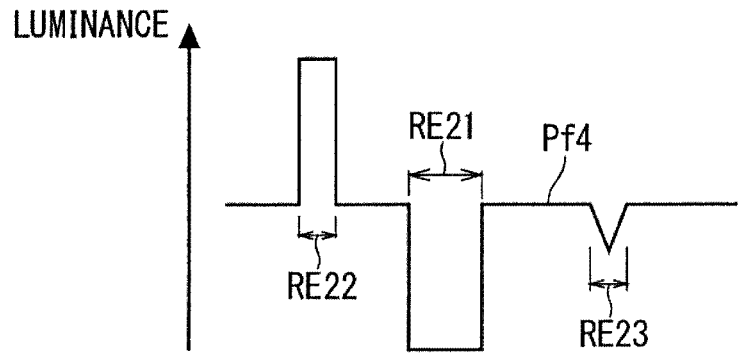

After the smoothing data is obtained, the difference between the original captured image data that provides the luminance distribution pf1 and the smoothing data is generated as corrected image data (step S84). FIG. 35D illustrates luminance distribution pf4 of the obtained corrected image data. More specifically, the corrected image data is obtained by calculating difference in the luminance value at an identical pixel position between the captured image data and the smoothing data for all pixel positions.

As illustrated in FIG. 35D, similarly to the original captured image data illustrated in FIG. 35A, the luminance distribution pf4 represented by the corrected image data includes the pixel region RE21 corresponding to the first cell 3a, the pixel region RE22 corresponding to the joining part 7, and the pixel region RE23 corresponding to a defect (typically, a scoop) formed at the end face 1a. The luminance value at the base part other than these pixel regions is substantially constant. This is the effect of subtracting, from the original captured image data, the luminance value of the smoothing data, which tends to have a negative slope in the figure like the original captured image data.

Since the luminance value of the base part is substantially constant in this manner, the difference in the luminance value attributable to the distance from the illumination element used for image capturing is eliminated from the corrected image data.

In addition, since the smoothing data of the luminance value in accordance with the distance from the illumination element is subtracted from the original captured image data, the luminance of the base part, which is a normal (without a defect) part of the end face 1a, and is irradiated by all the illumination elements in the same manner in each of the low-angle illumination part 115, the intermediate-angle illumination part 120, and the high-angle illumination part 130, can be regarded as the same level (substantially identical) between the pieces of low-angle corrected image data, between the pieces of intermediate-angle corrected image data, and between the pieces of high-angle corrected image data. Accordingly, the luminance value difference due to the difference between the distances from mutually different illumination elements is also eliminated.

[Determination Processing]

The defect inspecting apparatus 3000 according to the present embodiment performs low-angle determination processing based on m0 pieces of low-angle corrected image data obtained through the luminance correction processing as described above, intermediate-angle determination processing based on m1 pieces of intermediate-angle corrected image data, and high-angle determination processing based on m2 pieces of high-angle corrected image data.

First, each piece of corrected image data (low-angle corrected image data, intermediate-angle corrected image data, and high-angle corrected image data) is subjected to the minimum luminance image generation part 231 and used to generate minimum luminance image data (low-angle minimum luminance image data, intermediate-angle minimum luminance image data, high-angle minimum luminance image data) (refer to FIG. 27). The generation of the corrected image data is similar to the generation of the first minimum luminance image data at step S21 of the first determination processing illustrated in FIG. 11 and the generation of the second minimum luminance image data at step S31 of the second determination processing illustrated in FIG. 14.

Then, the minimum luminance image data generated by the minimum luminance image generation part 231 is subjected to filter processing by the filter processing part 232. Determination image data (low-angle determination image data, intermediate-angle determination image data, and high-angle determination image data) is generated through the filter processing (refer to FIG. 27). The filter processing is similar to the filter processing at step S22 of the first determination processing illustrated in FIG. 11 and step S32 of the second determination processing illustrated in FIG. 14.

Then, defect existence determination processing is performed by the defect determination part 240 by using the obtained determination image data (refer to FIG. 27).

Figure 36:
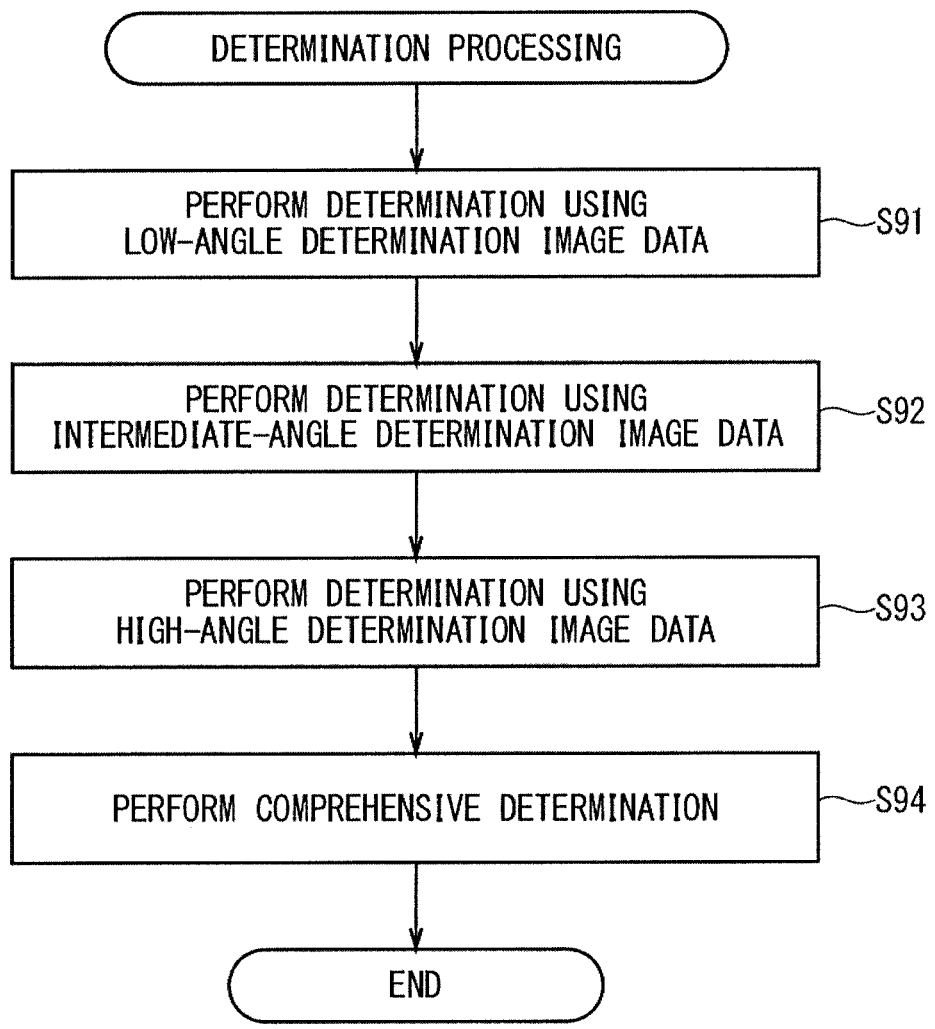
FIG. 36 is a diagram illustrating the process of determination processing performed by a defect determination part 240.

FIG. 36 is a diagram illustrating the process of the determination processing performed by the defect determination part 240. As illustrated in FIG. 36, in the defect inspecting apparatus 3000 according to the present embodiment, determination (steps S91 to S93) based on the low-angle determination image data, the intermediate-angle determination image data, and the high-angle determination image data generated by the filter processing part 232 is sequentially performed. Each kind of determination processing is referred to as low-angle determination processing, intermediate-angle determination processing, and high-angle determination processing.

When the determination image includes a bright part corresponding to the joining part 7, the opening mask processing is performed also on the bright part as in the modification of the first embodiment described above.

When the inspection target is the vicinity of the outer wall 2 of the honeycomb structural body 1 as illustrated in the captured image IM7 in FIG. 24, an image of a part corresponding to an external space (work background) EX of the honeycomb structural body 1 is a dark part in an inspection captured image, and thus the opening mask processing is performed also on the dark part corresponding to the external space EX. This is the same when a captured image including a dark part corresponding to such an external space is subjected to inspection in the first embodiment.

It is clear from comparison between FIGS. 26A and 30 that, when the irradiation angle of illumination light is small, the arrangement position and size of an image of a rectangular dark part (cell region) corresponding to the first cell 3a in a captured image are likely to coincide with those of the actual first cell 3a at any position in the view angle. This can be utilized such that the pattern of a dark part corresponding to the first cell 3a, which is described in the low-angle minimum luminance image data is used as a mask pattern in the opening mask processing.

The process of specific processing of each determination processing is similar to those of the processing at step S23 and later in FIG. 11 and the processing at step S23 and later in FIG. 14. In particular, the content of the intermediate-angle determination processing is identical to that of the first determination processing illustrated in FIG. 11, and the content of the high-angle determination processing is identical to that of the second determination processing illustrated in FIG. 14.

The execution procedure of the low-angle determination processing performed before these processes is the same as those of the first determination processing (intermediate-angle determination processing) and the second determination processing (high-angle determination processing). However, in the low-angle determination processing, a threshold (first dark part threshold) used for determination corresponding to steps S23 and S33 is set to a value larger than the first threshold in the first determination processing (intermediate-angle determination processing), and a threshold (second dark part threshold) used for determination corresponding to steps S27 and S37 is set to a value larger than the second threshold in the first determination processing (intermediate-angle determination processing).

This is due to enlargement of the view angle of the camera 110 to enlarge the inspection target region. Specifically, this takes into account possibility that, in the intermediate-angle determination processing based on the intermediate-angle captured image data obtained by using the intermediate-angle illumination part 120, scoop-chip detection, which is intended in the first determination processing in the first embodiment as determination processing identical thereto, cannot be sufficiently performed.

In other words, when the relatively large honeycomb structural body 1 is inspected in the defect inspecting apparatus 3000 according to the present embodiment, a defect such as a scoop or a chip having a relatively small depth is detected through the low-angle determination processing, a crack having a large depth is detected through the high-angle determination processing, and a defect having a depth therebetween is detected through the intermediate-angle determination processing.

Similarly to the first embodiment, existence of a defect is comprehensively determined based on results of the determination processing in the low-angle determination processing, the intermediate-angle determination processing, and the high-angle determination processing (step S94). A result of the determination is provided as determination result data from the defect determination part 240 to the integrated control part 210 as appropriate. When a defect is determined to exist at any place of the inspection target region through at least one of the low-angle determination processing, the intermediate-angle determination processing, and the high-angle determination processing, the defect determination part 240 determines that a defect exists at the inspection target region.

The integrated control part 210 controls, based on the description content of the determination result data, the display part 202 to display a defect determination result. Various kinds of display formats are employable. For example, only the existence or non-existence of a defect in an inspection target region may be displayed, and the position of the defect may be displayed based on labeling information. In addition, the size of the defect may be displayed based on the area (the number of pixels) of a dark part.

As described above, in the present embodiment, similarly to the first embodiment, a defect needed to be detected can be reliably detected without falsely detecting any irregularity of a normal ceramic surface as a defect, by using the minimum luminance image data generated from a plurality of pieces of captured image data obtained with different irradiation directions of illumination light, in determining existence of a defect.

In particular, in the defect inspecting apparatus according to the present embodiment, the low-angle illumination part having an irradiation angle of illumination light smaller than the irradiation angle at the first illumination part is provided in addition to the intermediate-angle illumination part and the high-angle illumination part corresponding to the first illumination part and the second illumination part in the defect inspecting apparatus according to the first embodiment, and the determination processing based on the low-angle captured image data obtained through image capturing using the low-angle illumination part is performed in addition to the determination processing using the intermediate-angle illumination part and the high-angle illumination part corresponding to the first determination processing and the second determination processing in the first embodiment, thereby accurately performing inspection in an inspection target region larger than that of the defect inspecting apparatus according to the first embodiment.

Thus, the defect inspecting apparatus according to the present embodiment can perform preferable inspection in an inspection target region having an area several ten times larger than that of the defect inspecting apparatus according to the first embodiment in some cases in the comparison where the distance from the camera to the end face of the honeycomb structural body is substantially constant. In such a case, the inspection can be accurately performed for an extremely large inspection target region without increase in the size of the defect inspecting apparatus. For example, when the inspection target region of the defect inspecting apparatus according to the first embodiment is a square region of 10 mm×10 mm=100 mm² and the inspection target region of the defect inspecting apparatus according to the present embodiment is a square region of 60 mm×60 mm=3600 mm², the latter inspection target region is 36 times larger than the former inspection target region.

Modification of Second Embodiment

In the above-described second embodiment, image capturing using the low-angle illumination part 115, image capturing using the intermediate-angle illumination part 120, and image capturing using the high-angle illumination part 130 are performed in the stated order as illustrated in FIG. 32, but this order may be changed. In this case, the order of the corresponding determination processing illustrated in FIG. 36 may be changed.

When the size of the honeycomb structural body 1 is relatively small, image capturing using the low-angle illumination part 115 and the series of processing up to the following low-angle determination processing based on the low-angle captured image data obtained through the image capturing may be omitted at defect inspection using the defect inspecting apparatus 3000, as long as the accuracy of inspection is maintained. In other words, the defect inspecting apparatus 3000 may be used as the defect inspecting apparatus 1000 according to the first embodiment.

Similarly to the inspection method according to the first embodiment, the inspection method according to the second embodiment is applicable to detection of a defect existing as a convex portion (for example, a protrusion) at the end face 1a of the honeycomb structural body 1.

Specifically, in the above-described second embodiment, the determination image generation part 230 generates low-angle (intermediate-angle, high-angle) minimum luminance image data in which a minimum value among luminance values of a plurality of low-angle (intermediate-angle, high-angle) corrected image data at an identical pixel position is set as a luminance value at the pixel position and generates low-angle (intermediate-angle, high-angle) determination image data based on the low-angle (intermediate-angle, high-angle) minimum luminance image data, but instead, may generate low-angle (intermediate-angle, high-angle) maximum luminance image data in which a maximum value among luminance values of the plurality of low-angle (intermediate-angle, high-angle) corrected image data at an identical pixel position is set as a luminance value at the pixel position and generate the low-angle (intermediate-angle, high-angle) determination image data based on the low-angle (intermediate-angle, high-angle) maximum luminance image data. In this case, the low-angle (intermediate-angle, high-angle) maximum luminance image data is an image obtained by virtually superimposing regions having high luminance values in the pieces of low-angle (intermediate-angle, high-angle) captured image data. Thus, the low-angle (intermediate-angle, high-angle) maximum luminance image data is data in which a region having a high luminance value attributable to a convex defect is enhanced.

Then, when a bright pixel region exists in an area equal to or larger than a predetermined bright part threshold in a determination image represented by each of the low-angle determination image data, the intermediate-angle determination image data, and the high-angle determination image data, the defect determination part 240 determines that a convex defect exists at the existence position of the bright pixel region. Accordingly, a convex defect existing on the outer surface of a ceramic body and needed to be detected can be reliably detected without falsely detecting an irregularity of a normal ceramic surface as a defect.

In the above-described second embodiment, individual dimming of each dimming unit is possible at each of the low-angle illumination elements 116, the intermediate-angle illumination elements 121, and the high-angle illumination elements 131, but the function of individual dimming may be omitted from the high-angle illumination elements 131 and further, from the intermediate-angle illumination elements 121 as well. This is because the distance dependency of the luminance is most significant at the low-angle illumination elements 116 and substantially constant luminance is likely to be obtained in the view angle without individual dimming as the irradiation angle increases as in the intermediate-angle illumination elements 121 and the high-angle illumination elements 131.

In the above-described second embodiment, each of the low-angle illumination elements 116, the intermediate-angle illumination elements 121, and the high-angle illumination elements 131 includes two dimming units, but instead, may include a larger number of dimming units that are each individually dimmable.

<Other Modifications>

In the above-described embodiments, the inspection target is the end face 1a of the honeycomb structural body 1, but inspection by the defect inspecting apparatuses 1000 and 2000 is applicable to a macroscopically horizontal ceramic surface (surface of a ceramic body) having minute irregularities in an aspect similar to the above-described aspect.

In the above-described embodiments, a honeycomb structural body including a quadrangular prism-shaped cell (square in section) is exemplarily described as an inspection target, but a honeycomb structural body including a hexagonal column cell (hexagonal in section) may be an inspection target, or honeycomb structural bodies including cells having a pentagonal column shape, an octagonal column shape, and various other kinds of shapes may be inspection targets.

The invention claimed is:

1. A defect inspecting apparatus configured to inspect existence of a defect on an end face of a sealed honeycomb structural body, the apparatus comprising:
    a table on which a sealed honeycomb structural body as an inspection target is to be placed;
    an image capturing part configured to capture an image of an inspection target region as at least part of said end face which is an inspection target surface of said sealed honeycomb structural body placed on said table in a normal direction of said inspection target region;
    one or more illumination parts including four or more illumination elements configured to irradiate said inspection target region with illumination light obliquely at an identical irradiation angle in respective irradiation directions different from each other and equiangularly spaced from each other around said image capturing part;
    a determination image generation part configured to generate determination image data for determining existence of a defect in said inspection target region based on captured image data acquired by said image capturing part; and a defect determination part configured to determine existence of a defect in said inspection target region based on said determination image data, wherein said plurality of illumination elements are sequentially turned on and off, said image capturing part generates a plurality of pieces of captured image data by capturing an image of said inspection target region when each of said plurality of illumination elements is turned on, and said determination image generation part generates minimum luminance image data in which a minimum value among luminance values of said plurality of pieces of captured image data at an identical pixel position is set as a luminance value at the pixel position and then generates said determination image data as binarized data based on said minimum luminance image data; and said defect determination part determines that a defect exists in said inspection target region when a dark part exists in an area equal to or larger than a predetermined second dark part threshold in said determination image data in which a dark part corresponding to an opening in said inspection target region is excluded and a bright part corresponding to any joining part and a dark part corresponding to outside of said sealed honeycomb structural body, if any, are additionally excluded.

2. The defect inspecting apparatus according to claim 1, wherein said determination image generation part further includes a luminance correction processing part configured to correct the luminance values of said plurality of pieces of captured image data so that the levels of luminance at a reference part previously defined in each of said plurality of pieces of captured image data are equivalent among said plurality of pieces of captured image data, and generates said minimum luminance image data based on said plurality of pieces of captured image data the luminance values of which are corrected by said luminance correction processing part.

3. The defect inspecting apparatus according to claim 2, wherein said one or more illumination parts include:

a low-angle illumination part including, as said plurality of illumination elements, a plurality of low-angle illumination elements each configured to irradiate said inspection target region with illumination light at an irradiation angle of 5° to 30° inclusive;

an intermediate-angle illumination part including, as said plurality of illumination elements, a plurality of intermediate-angle illumination elements each configured to irradiate said inspection target region with illumination light at an irradiation angle of 30° to 60° inclusive; and a high-angle illumination part including, as said plurality of illumination elements, a plurality of high-angle illumination elements each configured to irradiate said inspection target region with illumination light at an irradiation angle of 60° to 85° inclusive.

4. The defect inspecting apparatus according to claim 3, wherein said image capturing part generates a plurality of pieces of low-angle captured image data by performing, for all of said plurality of low-angle illumination elements, image capturing of said inspection target region when each of said plurality of low-angle illumination elements is turned on, generates a plurality of pieces of intermediate-angle captured image data by performing, for all of said plurality of intermediate-angle illumination elements, image capturing of said inspection target region when each of said plurality of intermediate-angle illumination elements is turned on, and generates a plurality of pieces of high-angle captured image data by performing, for all of said plurality of high-angle illumination elements, image capturing of said inspection target region when each of said plurality of high-angle illumination elements is turned on, said plurality of pieces of low-angle captured image data, said plurality of pieces of intermediate-angle captured image data, said plurality of pieces of high-angle captured image data are said plurality of pieces of captured image data different from each other, said determination image generation part generates, as said minimum luminance image data, low-angle minimum luminance image data in which a minimum value among luminance values of said plurality of pieces of low-angle captured image data at an identical pixel position is set as a luminance value at the pixel position, intermediate-angle minimum luminance image data in which a minimum value among luminance values of said plurality of pieces of intermediate-angle captured image data at an identical pixel position is set as a luminance value at the pixel position, and high-angle minimum luminance image data in which a minimum value among luminance values of said plurality of pieces of high-angle captured image data at an identical pixel position is set as a luminance value at the pixel position, and generates said determination image data by generating low-angle determination image data based on said low-angle minimum luminance image data, generating intermediate-angle determination image data based on said intermediate-angle minimum luminance image data, and generating high-angle determination image data based on said high-angle minimum luminance image data; and said defect determination part determines existence of a defect in said inspection target region based on all of said low-angle determination image data, said intermediate-angle determination image data, and said high-angle determination image data.

5. The defect inspecting apparatus according to claim 3, wherein said plurality of low-angle illumination elements each include at least two dimming units individually dimmable.

6. The defect inspecting apparatus according to claim 5, wherein said plurality of low-angle illumination elements, said plurality of intermediate-angle illumination elements, and said plurality of high-angle illumination elements are supported by one support body, and said plurality of low-angle illumination elements, said plurality of intermediate-angle illumination elements, and said plurality of high-angle illumination elements are disposed in respective planes different from each other.

7. The defect inspecting apparatus according to claim 1, wherein said one or more illumination parts include:

a first illumination part including, as said plurality of illumination elements, a plurality of first illumination elements each configured to irradiate said inspection target region with illumination light at a first irradiation angle of 30° to 60° inclusive; and a second illumination part including, as said plurality of illumination elements, a plurality of second illumination elements each configured to irradiate said inspection target region with illumination light at a second irradiation angle of 60° to 85° inclusive.

8. The defect inspecting apparatus according to claim 7, wherein
said image capturing part generates a plurality of pieces of first captured image data by performing, for all of said plurality of first illumination elements, image capturing of said inspection target region when each of said plurality of first illumination elements is turned on, and generates a plurality of pieces of second captured image data by performing, for all of said plurality of second illumination elements, image capturing of said inspection target region when each of said plurality of second illumination elements is turned on,
said plurality of pieces of first captured image data and said plurality of pieces of second captured image data are said plurality of pieces of captured image data different from each other,
said determination image generation part generates, as said minimum luminance image data, first minimum luminance image data in which a minimum value among luminance values of said plurality of pieces of first captured image data at an identical pixel position is set as a luminance value at the pixel position and second minimum luminance image data in which a minimum value among luminance values of said plurality of pieces of second captured image data at an identical pixel position is set as a luminance value at the pixel position, and generates said determination image data by generating first determination image data based on said first minimum luminance image data and generating second determination image data based on said second minimum luminance image data; and
said defect determination part determines existence of a defect in said inspection target region based on both of said first determination image data and said second determination image data.

9. The defect inspecting apparatus according to claim 7, wherein the number of said plurality of first illumination elements is equal to the number of said plurality of second illumination elements and the first and second illumination elements are arranged so that a vertical plane including an irradiation direction of each of said first illumination elements always includes an irradiation direction of one of said second illumination elements,
said plurality of first illumination elements emit illumination light belonging to a first wavelength band, and said plurality of second illumination elements emit illumination light belonging to a second wavelength band different from said first wavelength band,
each pair of said first and said second illumination elements having irradiation directions included in an identical vertical plane is simultaneously turned on and off,
said image capturing part generates said plurality of pieces of captured image data by capturing an image of said inspection target region when each pair of said first and second illumination elements is turned on,
the defect inspecting apparatus further includes a separation image generation part configured to generate a plurality of pieces of first separation image data and a plurality of pieces of second separation image data by performing color separation of each of said plurality of pieces of captured image data based on said first wavelength band and said second wavelength band,
said determination image generation part generates, as said minimum luminance image data, first minimum luminance image data in which a minimum value among luminance values of said plurality of pieces of first separation image data at an identical pixel position is set as a luminance value at the pixel position and second minimum luminance image data in which a minimum value among luminance values of said plurality of pieces of second separation image data at an identical pixel position is set as a luminance value at the pixel position, and generates said determination image data by generating first determination image data based on said first minimum luminance image data and generating second determination image data based on said second minimum luminance image data; and
said defect determination part determines existence of a defect in said inspection target region based on both of said first determination image data and said second determination image data.

10. The defect inspecting apparatus according to claim 7, wherein said plurality of first illumination elements and said plurality of second illumination elements are supported by one support body, and
said plurality of first illumination elements are arranged in one plane, and said plurality of second illumination elements are arranged in another plane.

11. The defect inspecting apparatus according to claim 1, wherein said plurality of illumination elements included in each of said one or more illumination parts are eight illumination elements.

12. A method of inspecting existence of a defect on an end face of a sealed honeycomb structural body, the method comprising:
a placement step of placing a sealed honeycomb structural body as an inspection target on a predetermined table;
an image capturing step of generating a plurality of pieces of captured image data by capturing, through predetermined image capturing means, an image of an inspection target region as at least part of said end face which is an inspection target surface of said sealed honeycomb structural body placed on said table in a normal direction of said inspection target region;
a determination image generation step of generating determination image data for determining existence of a defect in said inspection target region based on said plurality of pieces of captured image data; and
a defect determination step of determining existence of a defect in said inspection target region based on said determination image data, wherein
in said image capturing step, said plurality of pieces of captured image data are generated by sequentially turning on and off four or more illumination elements that are provided to one or more illumination parts, are configured to emit illumination light obliquely at an identical irradiation angle in respective irradiation directions different from each other, and are equiangularly spaced from each other around said image capturing means, and capturing an image of said inspection target region when each of said plurality of illumination elements is turned on, and
in said determination image generation step, minimum luminance image data in which a minimum value among luminance values of said plurality of pieces of captured image data at an identical pixel position is set as a luminance value at the pixel position is generated, and then said determination image data is generated as binarized data based on said minimum luminance image data; and in said defect determination step, it is determined that a defect exists in said inspection target region when a dark part exists in an area equal to or larger than a predetermined second dark part threshold in said determination image data in which a dark part corresponding to an opening in said inspection target region is excluded and a bright part corresponding to any joining part and a dark part corresponding to outside of said sealed honeycomb structural body, if any, are additionally excluded.

13. The defect inspecting method according to claim 12, wherein said determination image generation step further includes a luminance correction processing step of correcting luminance values of said plurality of pieces of captured image data so that the levels of luminance at a reference part previously defined in each of said plurality of pieces of captured image data are equivalent in said plurality of pieces of captured image data; and in said determination image generation step, said minimum luminance image data is generated based on said plurality of pieces of captured image data the luminance values of which are corrected through said luminance correction processing step.

14. The defect inspecting method according to claim 13, wherein said one or more illumination parts include:

a low-angle illumination part including, as said plurality of illumination elements, a plurality of low-angle illumination elements each configured to irradiate said inspection target region with illumination light at an irradiation angle of 5° to 30° inclusive;

an intermediate-angle illumination part including, as said plurality of illumination elements, a plurality of intermediate-angle illumination elements each configured to irradiate said inspection target region with illumination light at an irradiation angle of 30° to 60° inclusive; and a high-angle illumination part including, as said plurality of illumination elements, a plurality of high-angle illumination elements each configured to irradiate said inspection target region with illumination light at an irradiation angle of 60° to 85° inclusive.

15. The defect inspecting method according to claim 14, wherein in said image capturing step, a plurality of pieces of low-angle captured image data is generated by performing, for all of said plurality of low-angle illumination elements, image capturing of said inspection target region when each of said plurality of low-angle illumination elements is turned on, a plurality of pieces of intermediate-angle captured image data is generated by performing, for all of said plurality of intermediate-angle illumination elements, image capturing of said inspection target region when each of said plurality of intermediate-angle illumination elements is turned on, and a plurality of pieces of high-angle captured image data is generated by performing, for all of said plurality of high-angle illumination elements, image capturing of said inspection target region when each of said plurality of high-angle illumination elements is turned on, said plurality of pieces of low-angle captured image data, said plurality of pieces of intermediate-angle captured image data, said plurality of pieces of high-angle captured image data are said plurality of pieces of captured image data different from each other, in said determination image generation step, low-angle minimum luminance image data in which a minimum value among luminance values of said plurality of pieces of low-angle captured image data at an identical pixel position is set as a luminance value at the pixel position, intermediate-angle minimum luminance image data in which a minimum value among luminance values of said plurality of pieces of intermediate-angle captured image data at an identical pixel position is set as a luminance value at the pixel position, and high-angle minimum luminance image data in which a minimum value among luminance values of said plurality of pieces of high-angle captured image data at an identical pixel position is set as a luminance value at the pixel position are generated as said minimum luminance image data, said determination image data is generated by generating low-angle determination image data based on said low-angle minimum luminance image data, generating intermediate-angle determination image data based on said intermediate-angle minimum luminance image data, and generating high-angle determination image data based on said high-angle minimum luminance image data; and in said defect determination step, existence of a defect in said inspection target region is determined based on all of said low-angle determination image data, said intermediate-angle determination image data, and said high-angle determination image data.

16. The defect inspecting method according to claim 14, wherein said plurality of low-angle illumination elements each include at least two dimming units individually dimmable, and luminance difference in accordance with difference between distances from said plurality of low-angle illumination elements in a capturing range of said predetermined image capturing means is reduced by individually dimming said at least two dimming units in advance before image capturing by said predetermined image capturing means in said image capturing step.

17. The defect inspecting method according to claim 12, wherein said one or more illumination parts include:

a first illumination part including, as said plurality of illumination elements, a plurality of first illumination elements each configured to irradiate said inspection target region with illumination light at a first irradiation angle of 30° to 60° inclusive; and a second illumination part including, as said plurality of illumination elements, a plurality of second illumination elements each configured to irradiate said inspection target region with illumination light at a second irradiation angle of 60° to 85° inclusive.

18. The defect inspecting method according to claim 17, wherein in said image capturing step, a plurality of pieces of first captured image data is generated by performing, for all of said plurality of first illumination elements, image capturing of said inspection target region when each of said plurality of first illumination elements is turned on, and a plurality of pieces of second captured image data is generated by performing, for all of said plurality of second illumination elements, image capturing of said inspection target region when each of said plurality of second illumination elements is turned on, said plurality of pieces of first captured image data and said plurality of pieces of second captured image data are said plurality of pieces of captured image data different from each other, in said determination image generation step, first minimum luminance image data in which a minimum value among luminance values of said plurality of pieces of first captured image data at an identical pixel position is set as a luminance value at the pixel position and second minimum luminance image data in which a minimum value among luminance values of said plurality of pieces of second captured image data at an identical pixel position is set as a luminance value at the pixel position are generated as said minimum luminance image data, and said determination image data is generated by generating first determination image data based on said first minimum luminance image data and generating second determination image data based on said second minimum luminance image data; and in said defect determination step, existence of a defect in said inspection target region is determined based on both of said first determination image data and said second determination image data.

19. The defect inspecting method according to claim 17, wherein the number of said plurality of first illumination elements is equal to the number of said plurality of second illumination elements and the first and second illumination elements are arranged so that a vertical plane including an irradiation direction of each of said first illumination elements always includes an irradiation direction of one of said second illumination elements, and then said plurality of first illumination elements emit illumination light belonging to a first wavelength band and said plurality of second illumination elements emit illumination light belonging to a second wavelength band different from said first wavelength band, each pair of said first and said second illumination elements having irradiation directions included in an identical vertical plane is simultaneously turned on and off, in said image capturing step, said plurality of pieces of captured image data is generated by capturing an image of said inspection target region when each pair of said first and second illumination elements is turned on, the defect inspecting method further includes a separation image generation step of generating a plurality of pieces of first separation image data and a plurality of pieces of second separation image data by performing color separation of each of said plurality of pieces of captured image data based on said first wavelength band and said second wavelength band, in said determination image generation step, first minimum luminance image data in which a minimum value among luminance values of said plurality of pieces of first separation image data at an identical pixel position is set as a luminance value at the pixel position and second minimum luminance image data in which a minimum value among luminance values of said plurality of pieces of second separation image data at an identical pixel position is set as a luminance value at the pixel position are generated as said minimum luminance image data, and said determination image data is generated by generating first determination image data based on said first minimum luminance image data and generating second determination image data based on said second minimum luminance image data; and in said defect determination step, existence of a defect in said inspection target region is determined based on both of said first determination image data and said second determination image data.

20. The defect inspecting method according to claim 12, wherein said plurality of illumination elements provided to each of said one or more illumination parts are eight illumination elements.

* * * * *